United States Patent
Mutalik et al.

(10) Patent No.: US 11,070,292 B2
(45) Date of Patent: Jul. 20, 2021

(54) MULTIPLE UPSTREAM SPLIT SUPPORT IN A FIBER-DEEP HFC NETWORK

(71) Applicant: ARRIS Enterprises LLC, Suwanee, GA (US)

(72) Inventors: Venkatesh G. Mutalik, Middletown, CT (US); John Ulm, Pepperell, MA (US); Marcel F. Schemmann, Maria Hoop (NL)

(73) Assignee: ARRIS Enterprises LLC, Suwanee, GA (US)

( * ) Notice: Subject to any disclaimer, the term of this patent is extended or adjusted under 35 U.S.C. 154(b) by 0 days.

(21) Appl. No.: 16/725,893

(22) Filed: Dec. 23, 2019

(65) Prior Publication Data

US 2020/0213008 A1  Jul. 2, 2020

Related U.S. Application Data

(63) Continuation of application No. 15/431,102, filed on Feb. 13, 2017, now Pat. No. 10,615,875.

(60) Provisional application No. 62/294,369, filed on Feb. 12, 2016, provisional application No. 62/300,763, filed on Feb. 26, 2016, provisional application No. 62/300,483, filed on Feb. 26, 2016.

(51) Int. Cl.
*H04B 10/2575* (2013.01)
*H04L 12/28* (2006.01)
*H04N 7/22* (2006.01)
*H04L 5/14* (2006.01)

(52) U.S. Cl.
CPC . *H04B 10/25753* (2013.01); *H04B 10/25751* (2013.01); *H04L 5/14* (2013.01); *H04L 12/2885* (2013.01); *H04N 7/22* (2013.01)

(58) Field of Classification Search
CPC ........ H04B 10/25753; H04B 10/25751; H04N 7/22; H04L 12/2885; H04L 5/14
USPC .................................................. 398/115–117
See application file for complete search history.

(56) References Cited

U.S. PATENT DOCUMENTS

| 5,911,019 | A  | * | 6/1999 | Cohen ................. | H04B 10/272 385/147 |
| 2008/0310838 | A1 | * | 12/2008 | Blauvelt .......... | H04B 10/25751 398/43 |
| 2010/0014868 | A1 | * | 1/2010 | McGlynn ......... | H04B 10/25759 398/115 |
| 2015/0222449 | A1 | * | 8/2015 | Salinger ............. | H04L 27/0002 370/419 |
| 2017/0099100 | A1 | * | 4/2017 | Bush ................. | H04Q 11/0005 |

* cited by examiner

*Primary Examiner* — Casey L Kretzer
(74) *Attorney, Agent, or Firm* — Chernoff, Vilhauer, McClung & Stenzel, LLP

(57) ABSTRACT

Systems and methods for achieving full duplex bidirectional transmission across coaxial cable in a hybrid fiber-coaxial cable TV network. Some preferred systems and method will attenuate reflections propagated within the coaxial cable. Other preferred systems may echo-cancel reflections propagated within the coaxial cable.

5 Claims, 51 Drawing Sheets

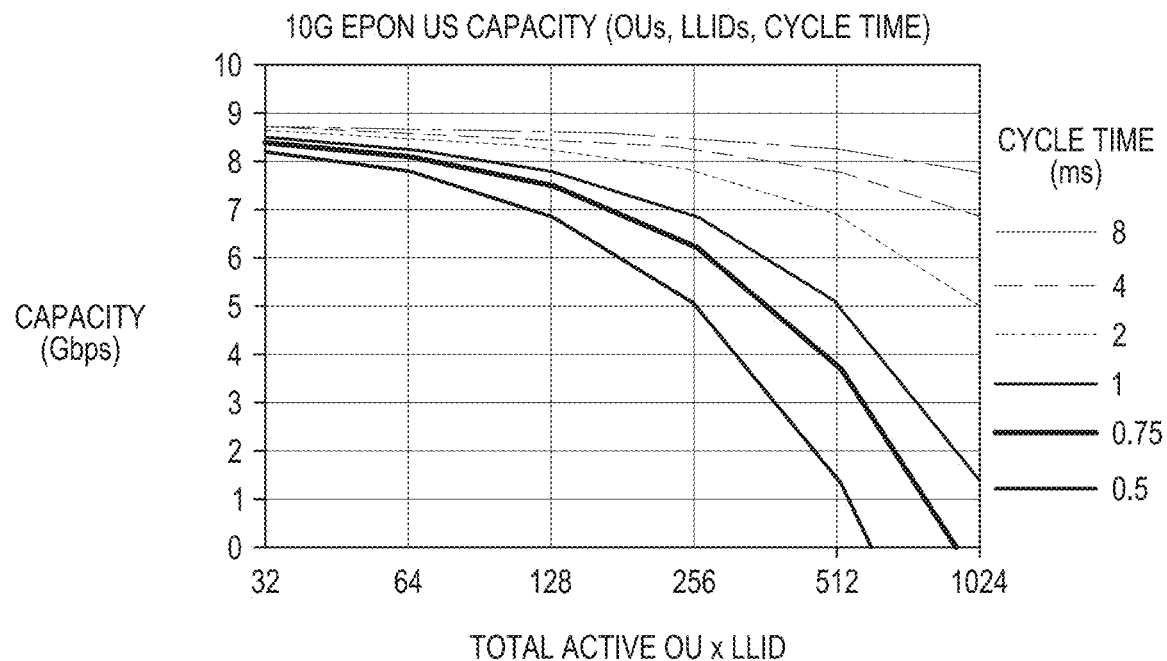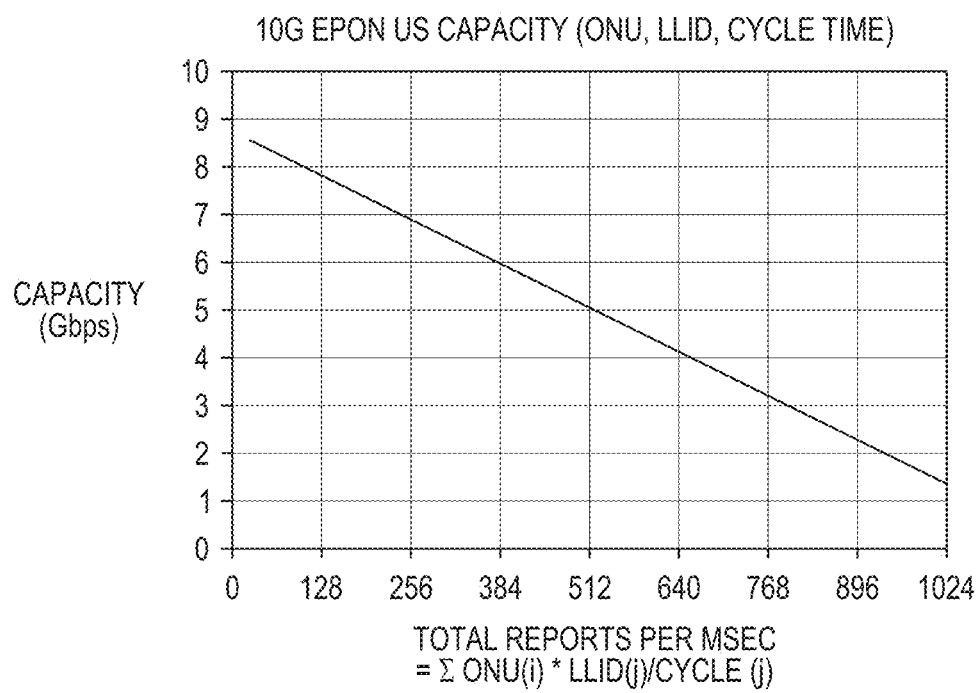
FIG. 24

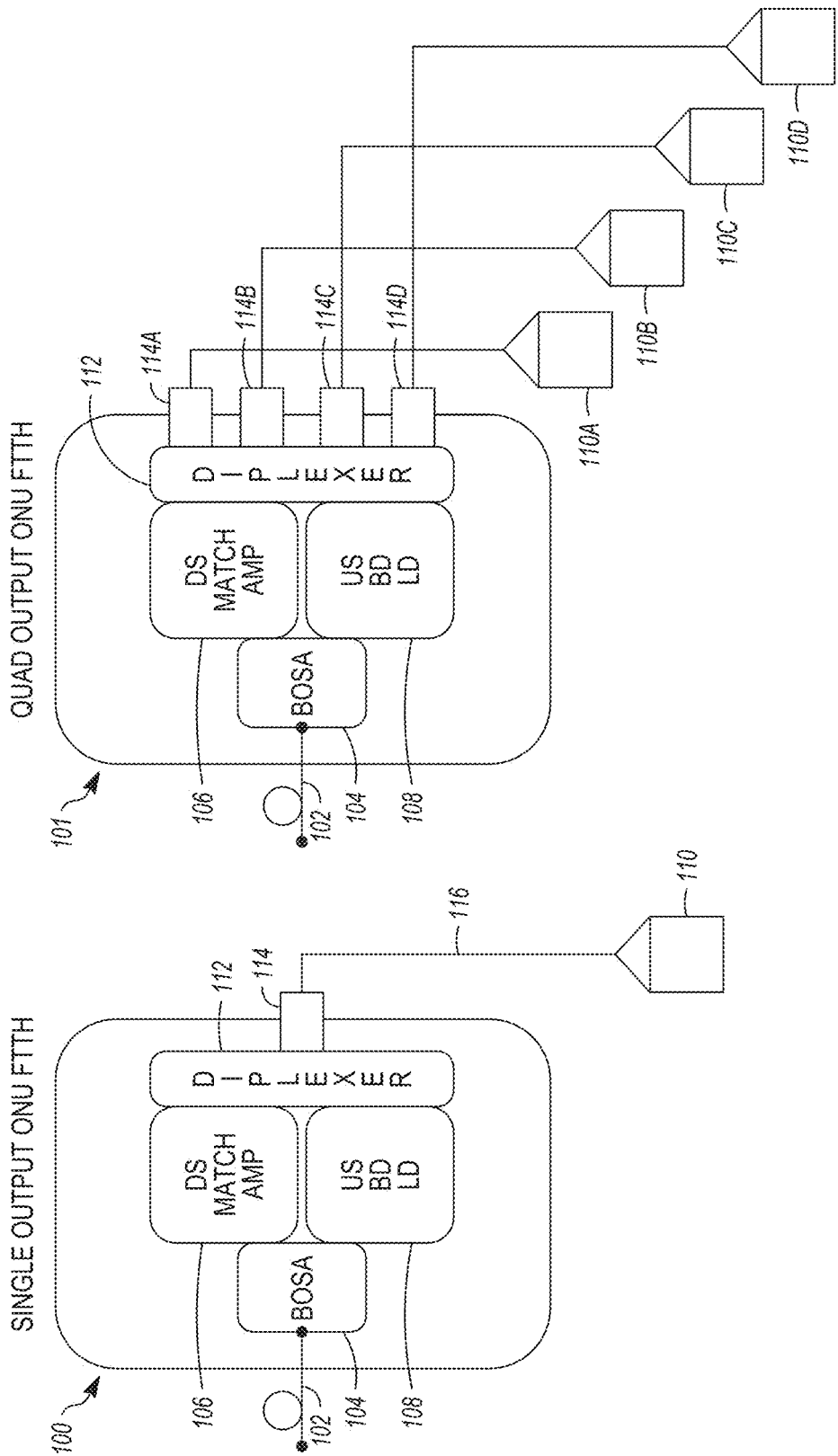

MULTIPLE UPSTREAM SPLIT SUPPORT IN A FIBER-DEEP HFC NETWORK

CROSS-REFERENCE TO RELATED APPLICATIONS

This application claims the benefit under 35 U.S.C. § 119(e) of priority to the filing dates of U.S. Provisional Application No. 62/294,369 filed on Feb. 12, 2016, U.S. Provisional Application No. 62/300,763 filed on Feb. 26, 2016, and U.S. Provisional Application No. 62/300,483 filed on Feb. 26, 2016.

BACKGROUND OF THE INVENTION

Cable TV (CATV) systems were initially deployed as video delivery systems that, in their most basic form received video signals at a cable head end, processed the signals for transmission, and broadcast them to homes via a tree-and-branch coaxial cable network. In order to deliver multiple TV channels concurrently, early CATV systems assigned 6 MHz blocks of frequency to each channel and Frequency Division Multiplexed (FDM) the channels onto the coaxial cable RF signals. Electrical amplifiers were inserted along the transmission path to boost the signal, and splitters and taps were deployed to deliver the signals to individual homes.

As the reach of the systems increased, the signal distortion and operational costs of long chains of electrical amplifiers became problematic, hence over time larger segments of the coaxial cable in the tree-and-branch transmission network were replaced with fiber optic cables, creating a Hybrid Fiber Coax (HFC) network. The HFC network uses optical fiber to deliver the RF broadcast content from the head end to the remaining segments of coaxial cable in the network neighborhood transmission network, which in turn delivers it to the subscribers. Optical nodes in the network acted as optical to electrical converters to provide the fiber-to-coax interfaces.

Over the years, HFC is continually evolving to push fiber deeper in to the network. Eventually, it will reach the point where it becomes a Fiber to the Premise (FTTP) architecture, but this may take decades at an economical pace. FTTP is happening today in new Greenfield deployments, yet there are significant operational challenges to make this transformation in existing HFC infrastructure, a.k.a. Brownfields.

Simultaneously, the HFC network is evolving to deliver an increasing amount of content to subscribers, as well as provide data (e.g., Internet) services at ever-higher speeds. Such data services are IP packet-based services, but are propagated on the HFC network as additional frequency blocks that use FDM to share the spectrum along with video services. Unlike broadcast video, each IP stream is unique. Thus, the amount of spectrum required for data services is a function of the number of data users and the amount of content they are downloading. With the rise of the Internet video, this spectrum is growing at 50% compound annual growth rate and putting significant pressure on the available bandwidth. Pressure on the available bandwidth has further increased with the advent of narrowcast video services such as video-on-demand (VOD), which changes the broadcast video model as users can select an individual program to watch and use VCR-like controls to start, stop, and fast-forward. In this case, as with data service, each user requires an individual program stream.

Unlike broadcast video, data services require a two-way connection. Therefore, the cable plant must provide a functional return path, i.e. data communication between the CATV head end and subscribers includes a downstream path that delivers video and data to subscribers, along with a return path that delivers data from the subscribers to the head end. To prevent interference between the upstream and downstream signals when transmitted over HFC network, separate ranges of bandwidth were dedicated to these upstream and downstream signals respectively, such that a smaller, low-frequency range of the total transmission spectrum (for the upstream signal) was "split" from a larger, higher frequency range (for the downstream signal). As can easily be appreciated, as more video content and faster data services are provided via the HFC network over time, the "split" between the upstream and downstream paths must change. Historically, HFC systems have supported several different splits, including 42, 55 and 65 MHz splits. The DOCSIS 3.0 standard introduced a 85 MHz split, but this split not been widely deployed due to the difficulties of moving legacy services (e.g. STB control channel, FM channels) from existing 54-108 MHz spectrum reserved for downstream content. Moreover, the DOC SIS 3.1 standard further contemplates a significant increase in upstream spectrum, and associated capacity, with the option of a 204 MHz upstream split with the corresponding downstream spectrum starting at 258 MHz. This however exacerbates the difficulties arising from supporting legacy downstream services in the 54-258 MHz range.

Rather than migrate to new architectures, such as fiber-to-the-premises (FTTP) where fiber replaces all portions of the CATV network, many existing CATV providers have tended to squeeze as much content and services as possible over the existing CATV architecture. However, the capacity of the existing HFC architecture is limited, and this solution will be adequate for only so long.

What is desired, therefore, are improved methods and systems for transmitting the breadth of content contemplated by the DOCSIS 3.1 standard over an HFC network while simultaneously providing support for legacy downstream service.

SUMMARY OF THE DISCLOSURE

In a first embodiment, a system may include one or more ONUs together delivering respective upstream and downstream content to each of a plurality of subscribers in a single service group, and from a common optical input signal. The one or more ONUs together configure the upstream and downstream content delivered to a first subscriber to have a first split, and configure the upstream and downstream content delivered to a second subscriber to have a second split different than the first split.

In a second embodiment, a method may comprise delivering content to a first subscriber using a first coaxial length from an ONU associated with the first subscriber, and over a first temporal interval, while delivering content to a second subscriber using a second coaxial length from an ONU associated with the second subscriber, and also over the first temporal interval. The method may then deliver at least one of FTTLA, FTTC, and FTTH to the first subscriber over a second temporal interval subsequent to the first temporal interval, by replacing at least a portion of the first coaxial length with a fiber optic connection. During the second temporal interval, the second subscriber continues to receive content over the second coaxial length from the ONU associated with the second subscriber.

In a third embodiment, an ONU may have an input that receives an optical signal propagating upstream and downstream CATV content, and at least one output that delivers the upstream and downstream content to a first subscriber in a service group comprising a plurality of subscribers. The ONU may also have a split-setting element that configures the split between the upstream and downstream content to the first subscriber in a manner independent of the split between upstream and downstream content to at least one other of the plurality of subscribers.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

For the purpose of illustrating embodiments described below, there are shown in the drawings example constructions of the embodiments; however, the embodiments are not limited to the specific methods and instrumentalities disclosed.

It is noted that while the accompanying figures serve to illustrate embodiments of concepts that include the claimed invention, and explain various principles and advantages of those embodiments, the concepts displayed are not necessary to understand the embodiments of the present invention, as the details depicted in the figures would be readily apparent to those of ordinary skill in the art having the benefit of the description herein.

FIG. 24 shows the results of a simulated Kramer analysis.

FIG. 34A shows a single-output ONU having a customizable split between upstream and downstream signals.

FIG. 34B shows a multi-output ONU having customizable splits between upstream and downstream signals for each output.

Figure 36B:
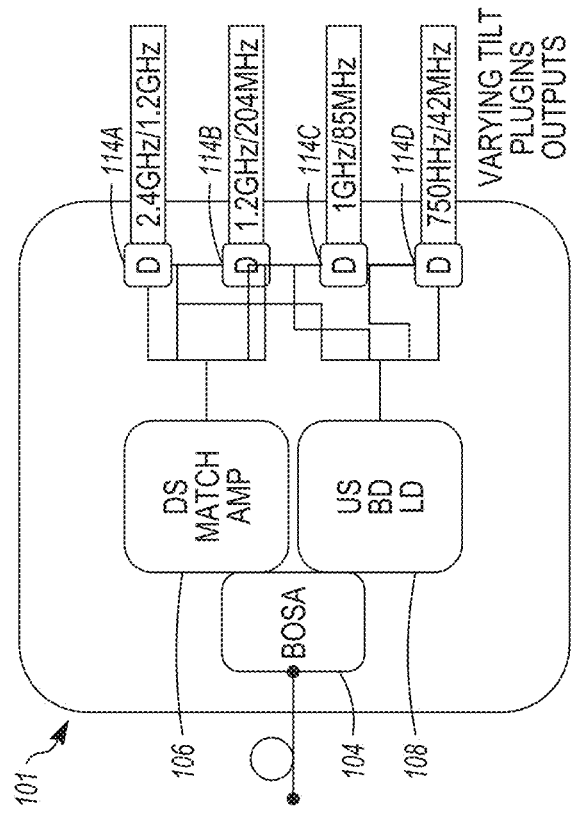
FIG. 36B shows a multi-output ONU having receptacles for plug-in diplexers.
Figure 36A:
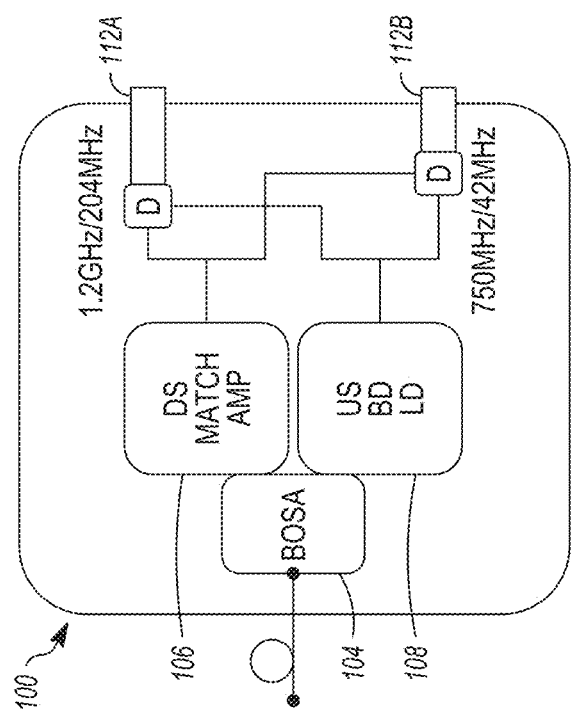
FIG. 36A shows an ONU with an integrated diplexer.
Figure 37B:
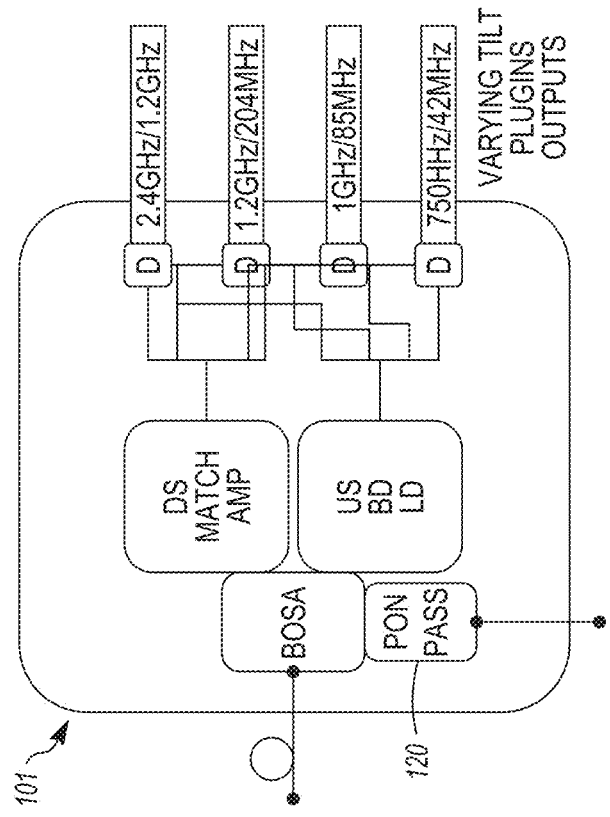
Figure 37A:
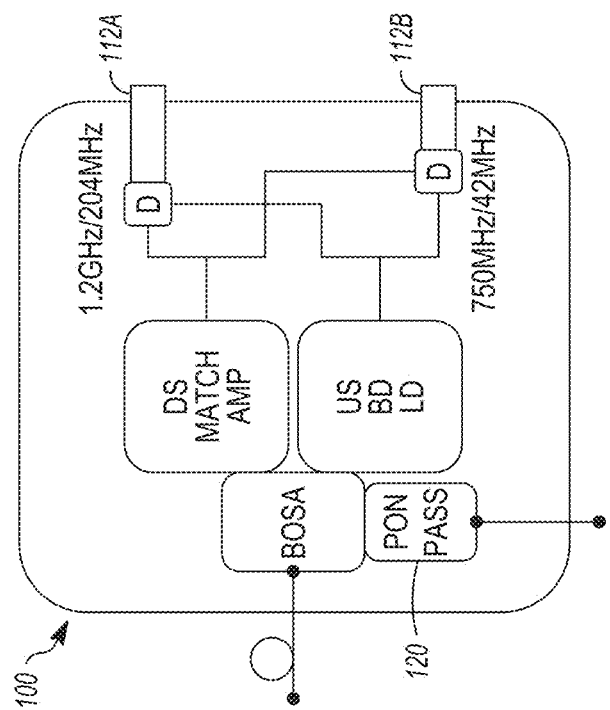

FIGS. 37A and 37B each show an ONU of FIGS. 36A and 36B, respectively, having a PON-pass through element.

Figure 38:
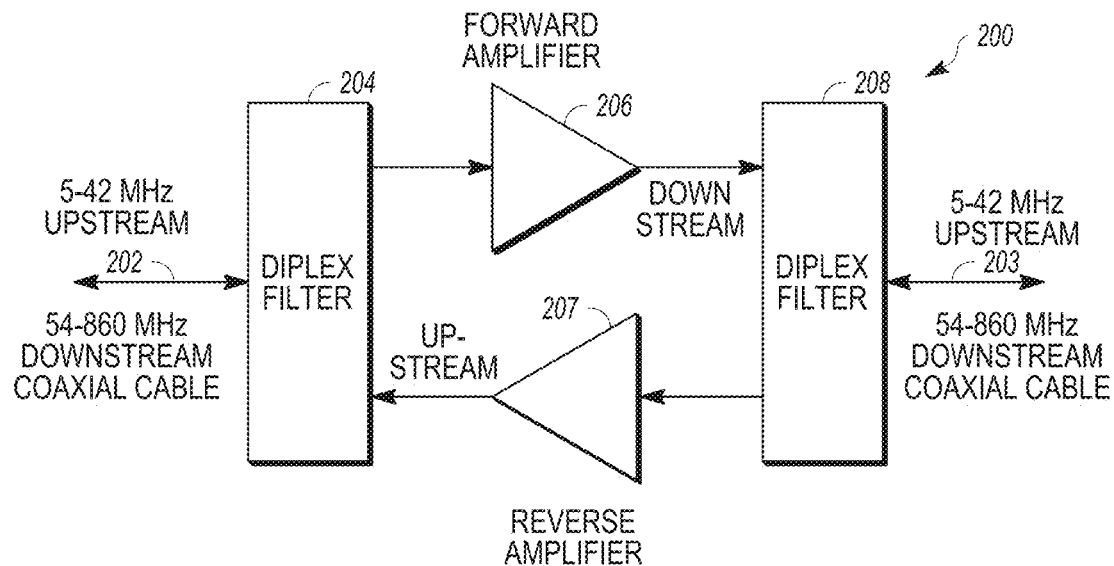

FIG. 38 shows an RF amplifier used in a coaxial network having two diplex filters.

Figure 39:
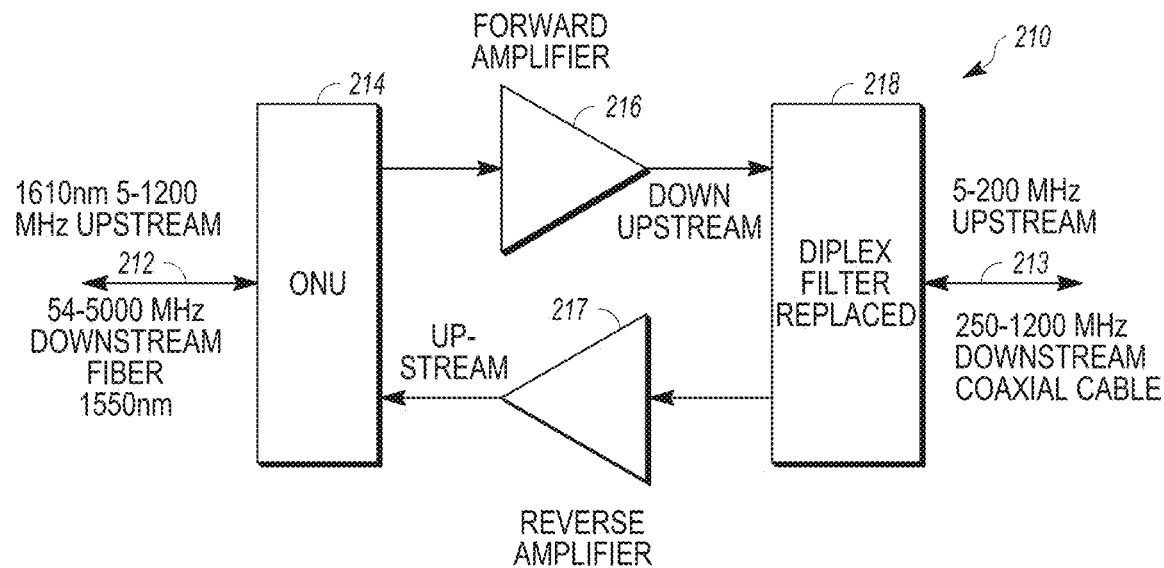

FIG. 39 shows and alternate amplifier that replaces one of the diplex filters in the amplifier of FIG. 38 with an ONU.

Figure 40:
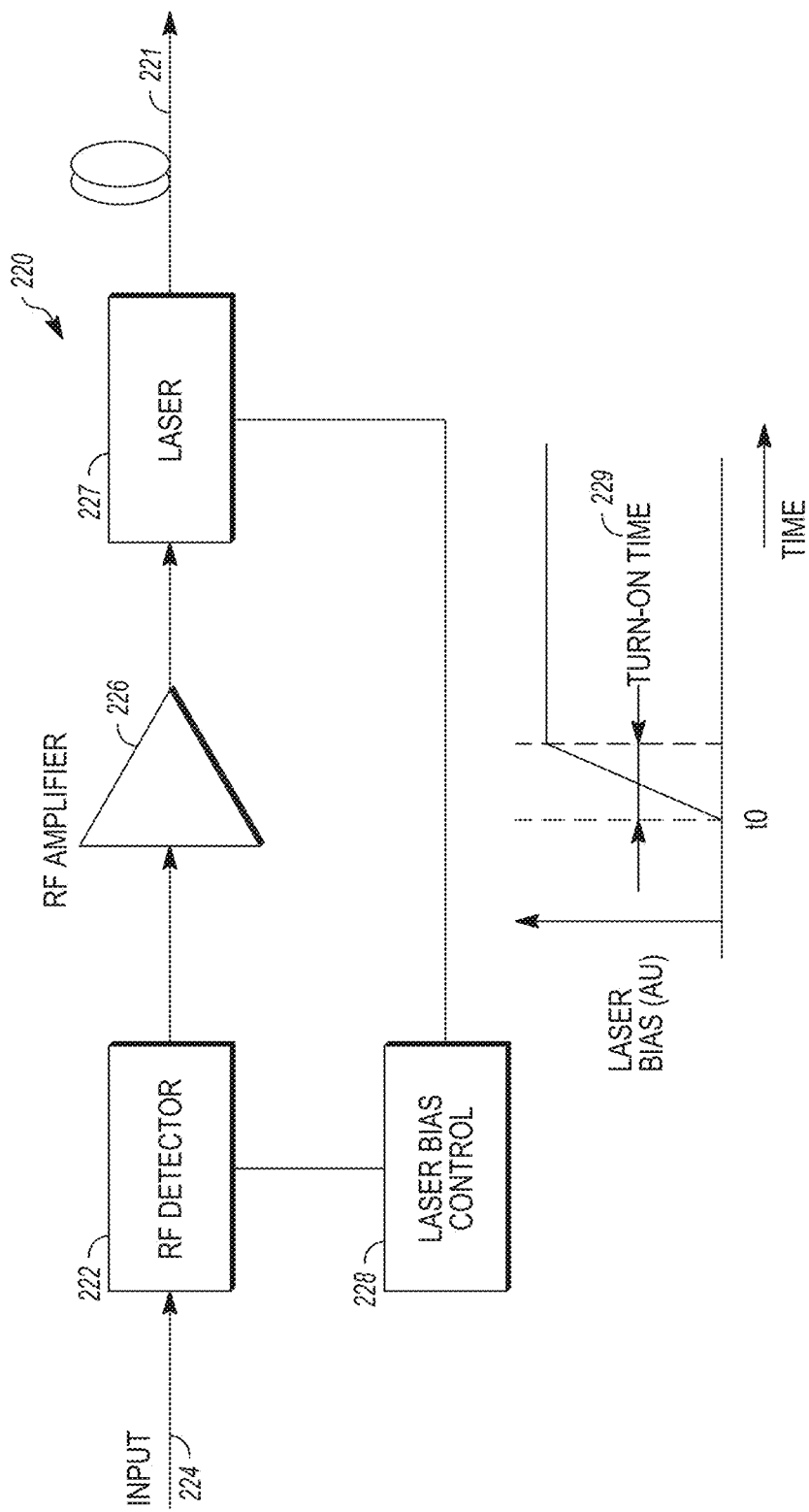

FIG. 40 shows an ONU upstream burst detection system and laser bias control.

Figure 41A:
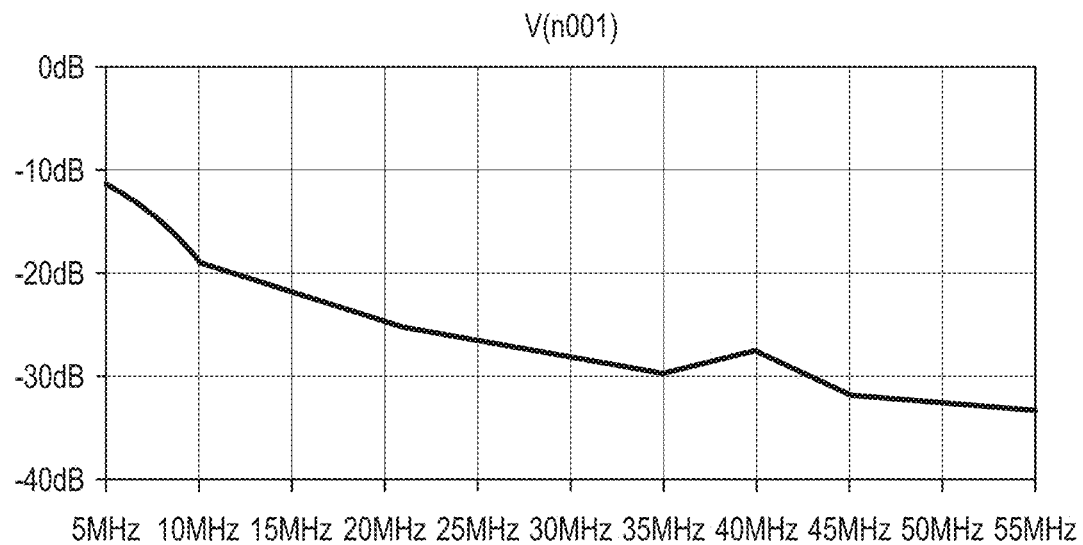
Figure 41B:
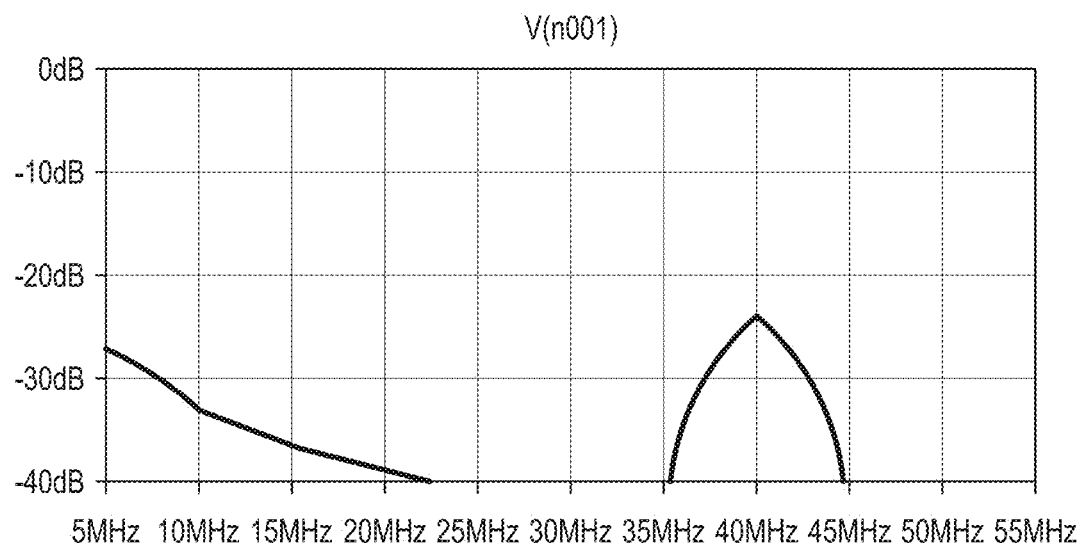

FIGS. 41A and 41B show respective output spectra for different rise time of the laser shown in FIG. 40.

Figure 42:
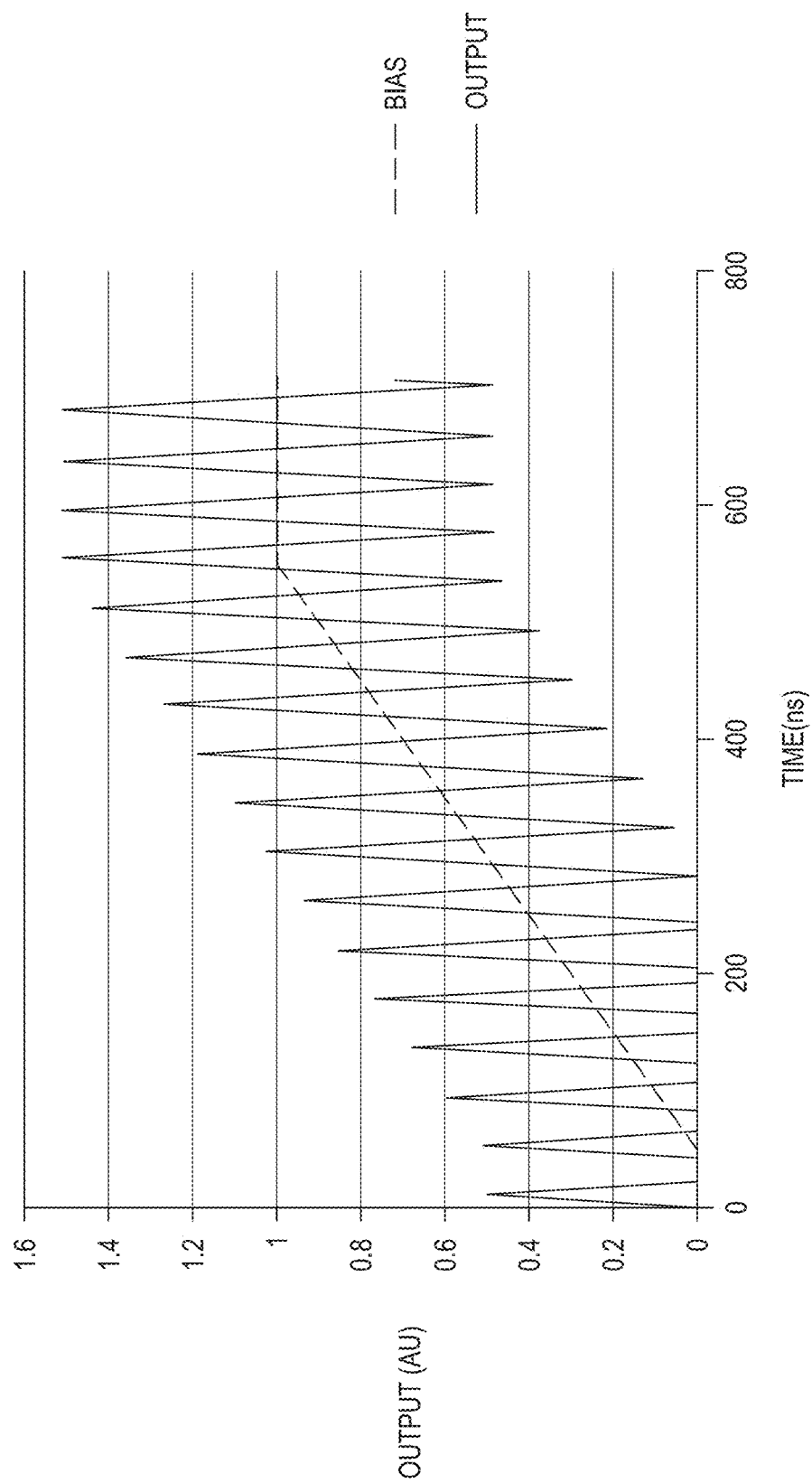

FIG. 42 shows the output when the ONU of FIG. 39 turns on in 500 ns following detection of an RF input signal.

Figure 43:
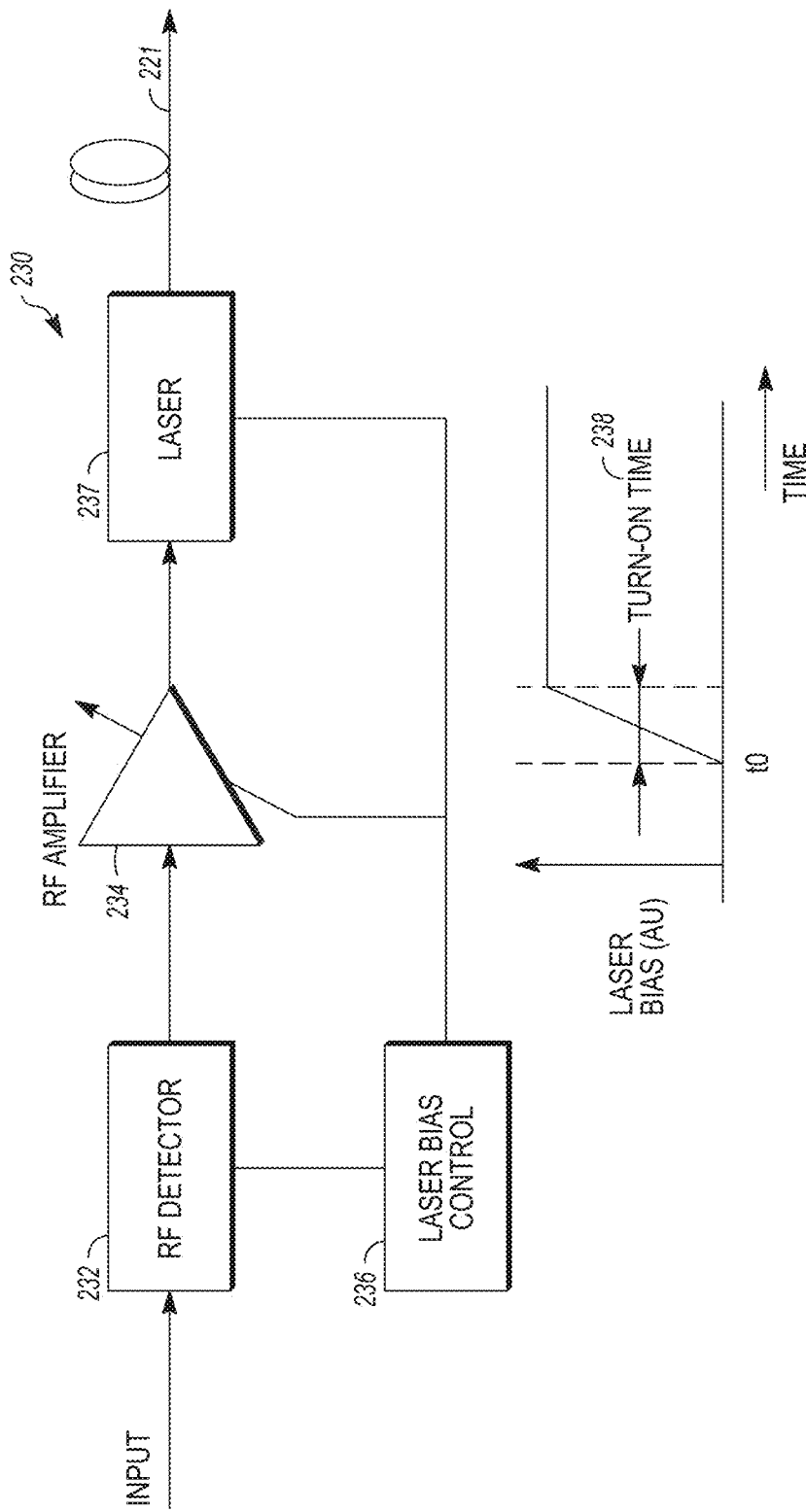

FIG. 43 shows an alternate ONU upstream burst detection system and laser bias control.

Figure 44:
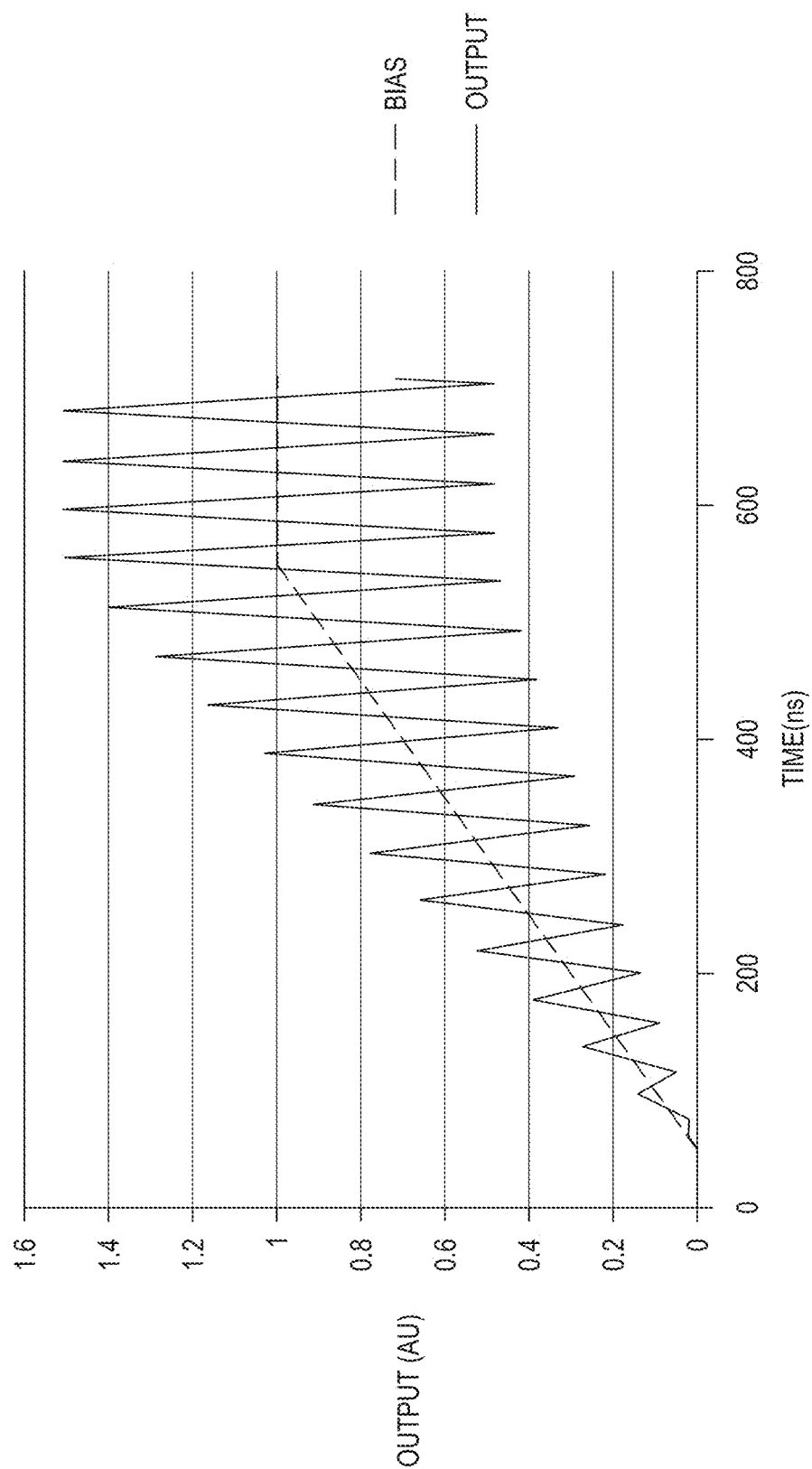

FIG. 44 shows the improvement in clipping that results from using the bias control of FIG. 43

Figure 45:
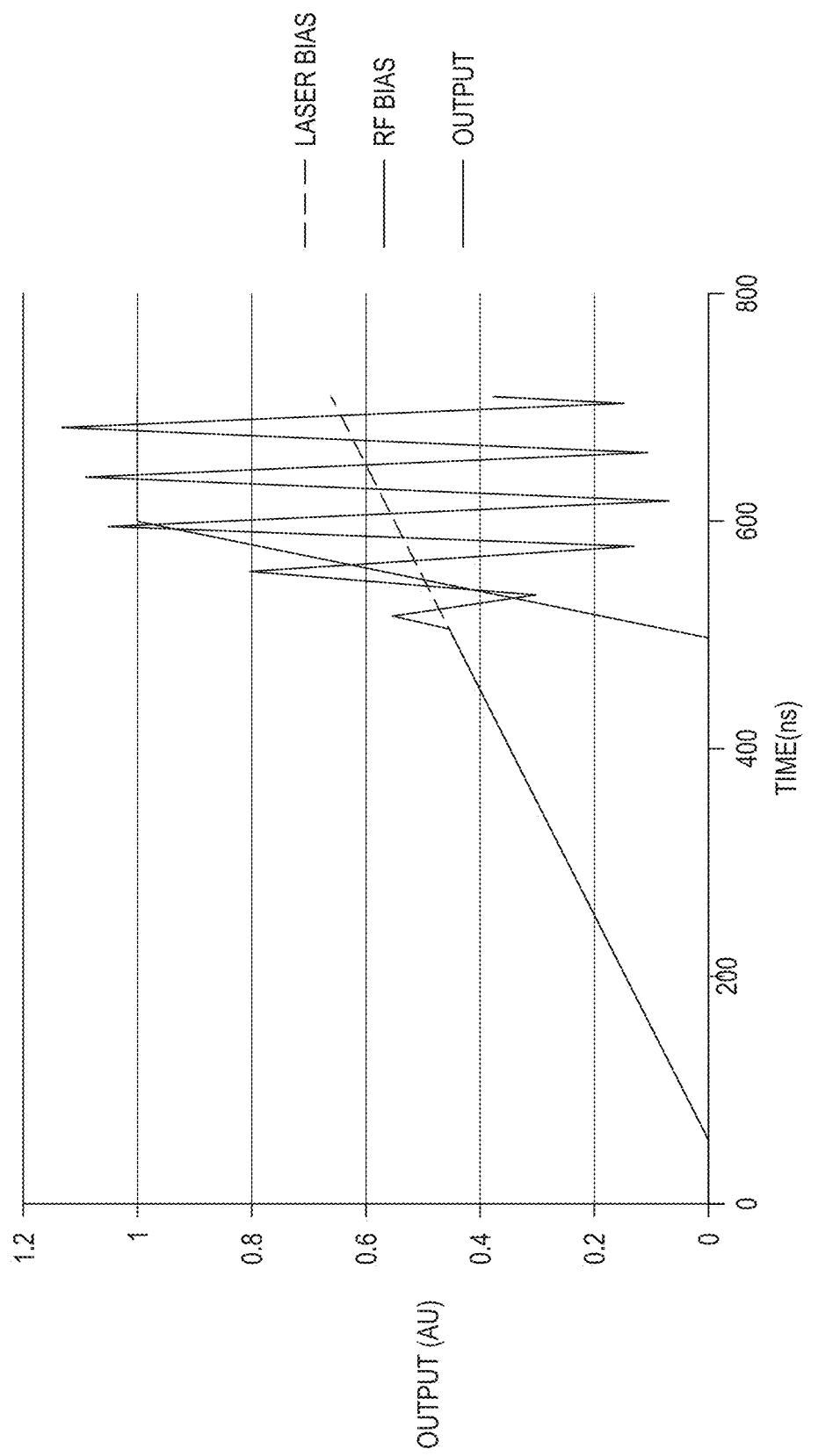

FIG. 45 shows the output of an ONU with a delayed RF gain control and a faster rise time.

Figure 46:
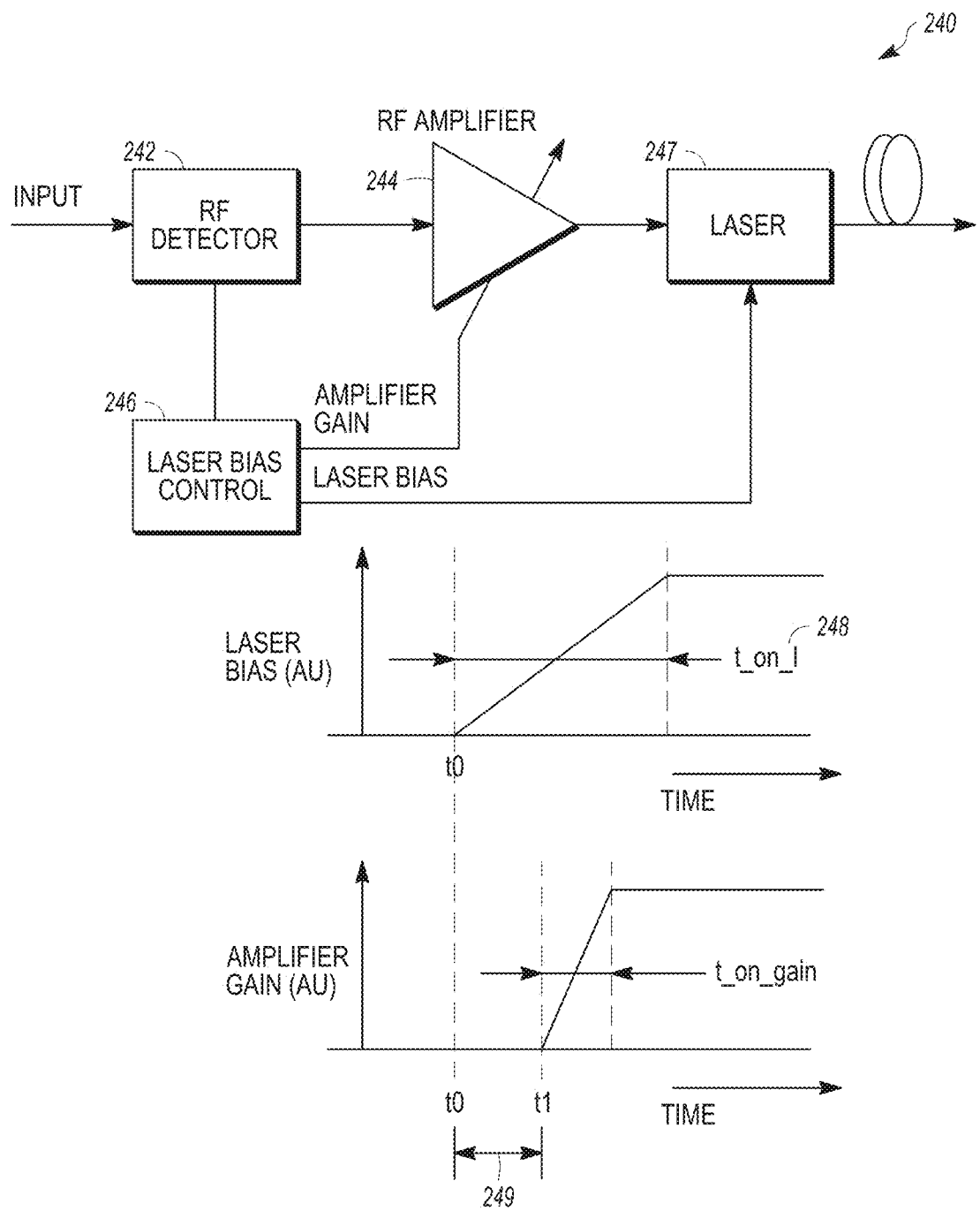

FIG. 46 shows another alternate ONU upstream burst detection system and laser bias control.

Figure 47:
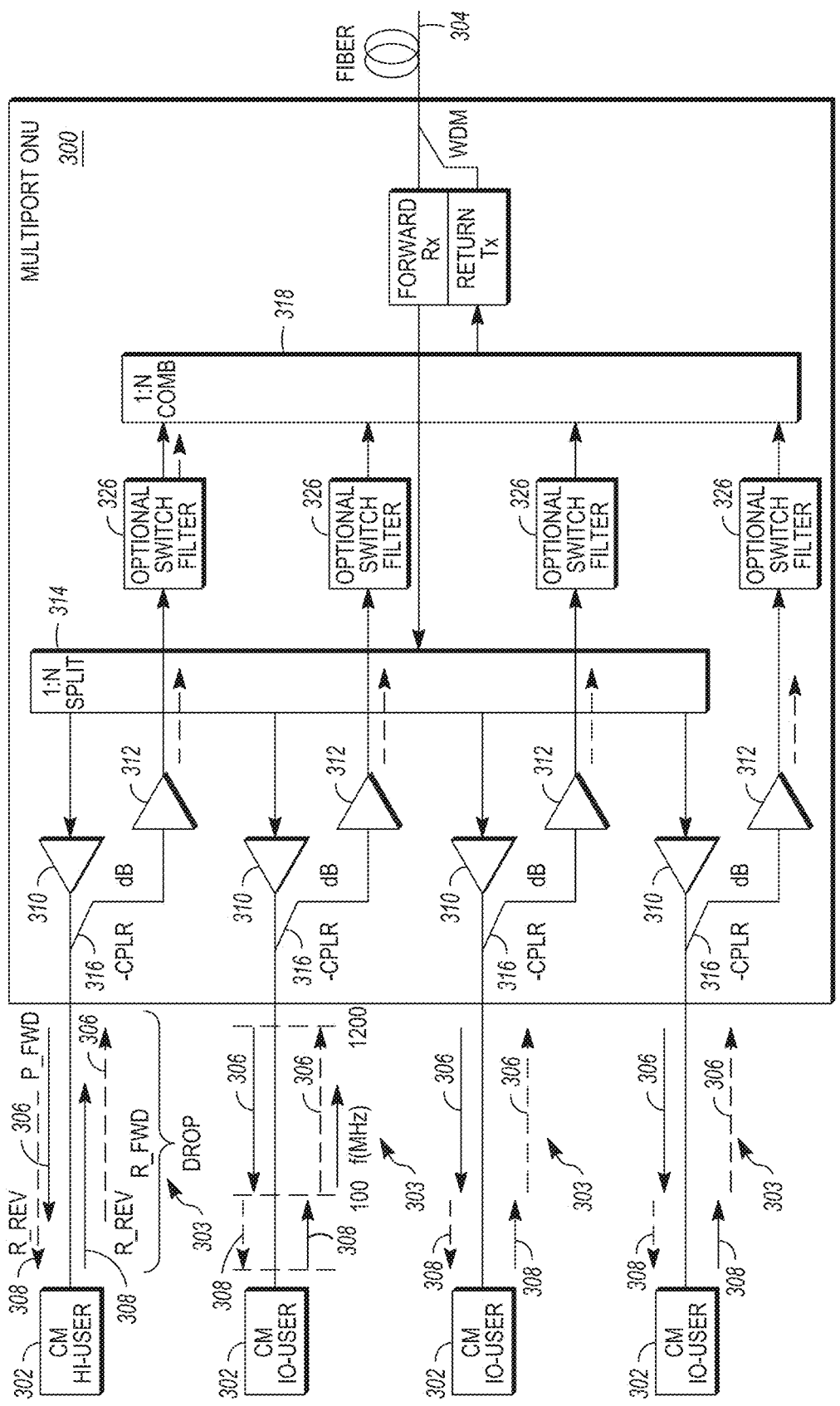

FIG. 47 shows an exemplary multiport ONU connected to user cable modems via coaxial cables, and which mitigates reflections.

Figure 48:
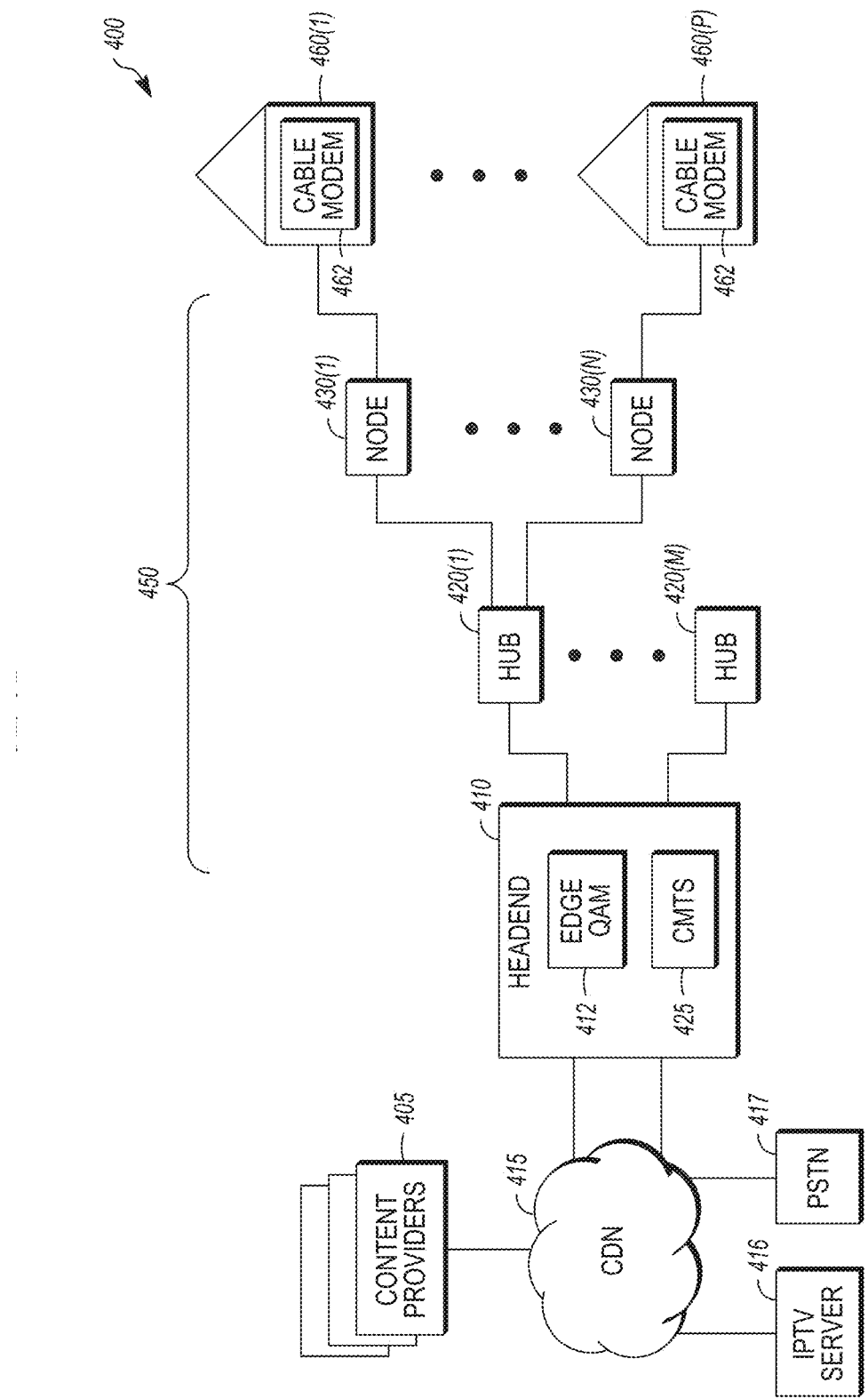

FIG. 48 shows a CATV architecture capable of implementing the systems and methods disclosed in the present application.

DETAILED DESCRIPTION OF PREFERRED EMBODIMENTS

As noted previously, DOCSIS 3.0 and its 85 MHz split between upstream and downstream services was not implemented to its full extent due to the inability to make available the higher quality services contemplated by that standard while simultaneously supporting legacy devices configured for a lower split between upstream and downstream signals. As also noted previously, this problem will be exacerbated by the planned implementation of DOCSIS 3.1, with its split where the upstream signal ends at 204 MHz and the downstream signal begins at 258 MHz.

Competitive pressures to offer Top-Tier 1 Gigabit (1G) services have already induced some cable operators to offer such services over FTTP networks. However, integrating an FTTP solution within an existing HFC network requires that all homes on a given coax segment be migrated to the same new RF frequency upstream split, which creates logistical problems with large service group sizes to get every home transitioned. Moreover, this approach is merely a short-term solution that, at current growth rates, might suffice for five to ten years before the growth in subscribers desiring the Top Tier service hits the HFC limits.

Eventually, to fully implement DOCSIS 3.1, all subscribers in the HFC network will need to be migrated to FTTP. The time needed to implement this transition will likely be significant. From an economic perspective, one analysis shows that this transition will require at least a 20-40 year window to migrate all HFC subscribers to an FTTP network. Assuming, for example, that an operator transitions 5% of its subscribers from HFC to FTTP each year, which is an aggressive and expensive timetable, the full transition would require twenty years. Based on historical spending on plant upgrades, even this scenario is optimistic.

Given that the transition will take multiple decades, extending the useful life of HFC to the end of this transition period is of crucial importance. This will require the adoption of DOCSIS 3.1 technologies and the use of an intelligent strategy for moving subscribers to FTTP. This specification describes systems and methods that implement a mixed HFC/FTTP architecture where selective Top-Tier subscribers are migrated to FTTP service (a ""Selective Subscriber Shedding" method), while maintaining support for legacy equipment, even where the legacy equipment is used by a one or more subscribers in the same service group as subscriber(s) receiving Top-Tier service. Utilizing the disclosed systems and methods will extend the life of HFC for decades, facilitating the smooth and economical transition to FTTP.

Specifically, the disclosed systems and methods support an FTTP overlay that allows a single home—or a subset of homes in a service group (SG)—to be upgraded to a new upstream split, such as 204 MHz, while the rest of the service group continues to use a legacy upstream split. The disclosed systems and methods will provide customers with a choice of either legacy service over a Hybrid Passive Optical Network (HPON) transmission path using an HFC transmission path between the customer and the head end, or DOCSIS 3.1 service over FTTP. The use of standard binary PON technologies such as EPON and GPON are well known, but the benefits from DOCSIS 3.1 over FTTP are a new phenomenon. Considered together with the fact that traditional binary PON systems are completely transparent, this means that the transformational technology disclosed herein, by supporting the legacy HFC infrastructure, along with the binary PON technologies that use FTTP, is a truly HPON architecture.

Traffic Engineering Fundamentals

Figure 1:
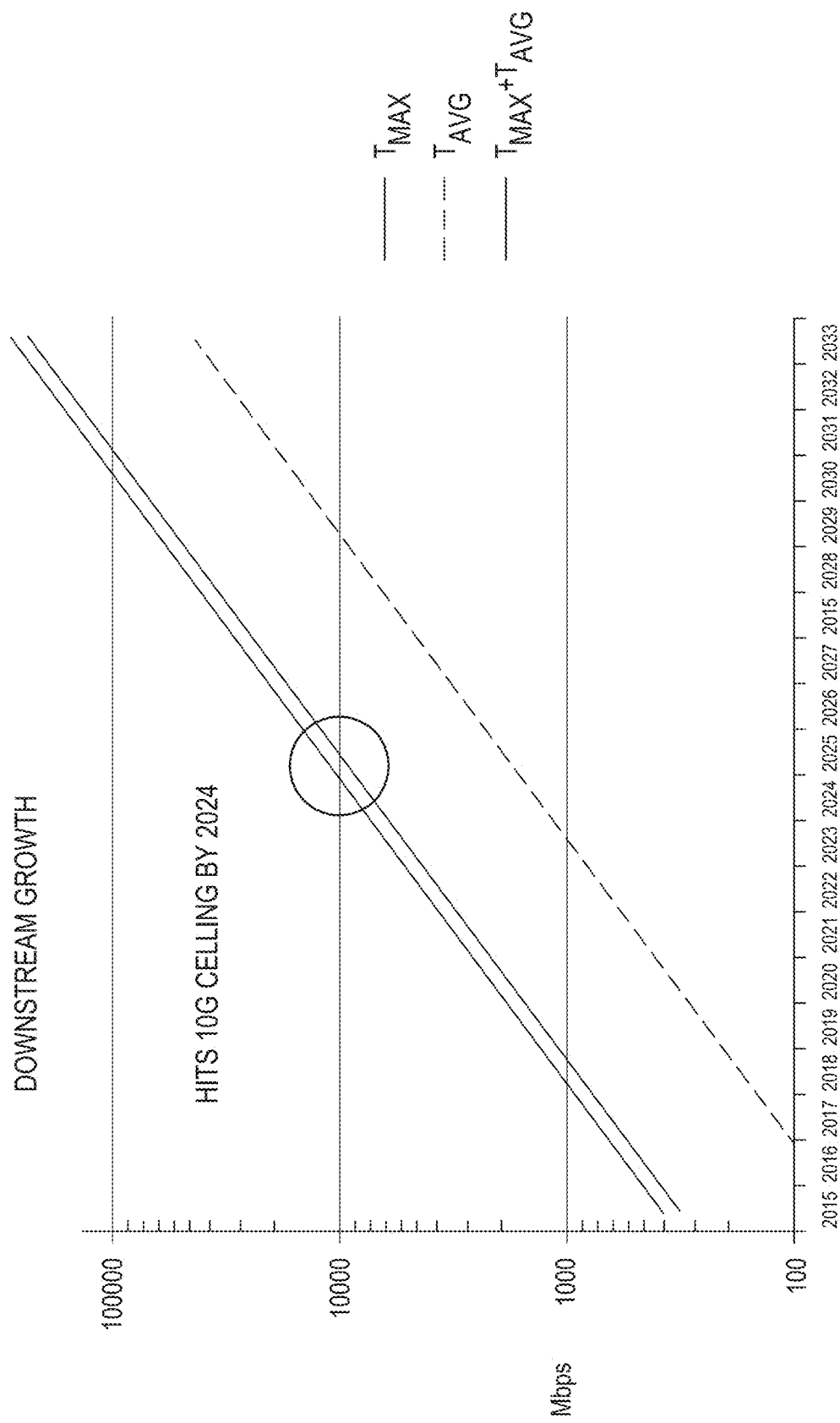
FIG. 1 shows a "Cloonan Curve" and Nielson's Law.

Referring to FIG. 1, Tom Cloonan developed several graphs known as "Cloonan's Curves," which incorporate an observed phenomenon called Nielsen's Law. Nielsen's Law roughly states that the highest offered Internet speed will increase at an annual growth rate of 50%. With the migration to DOCSIS 3.1, the capacity of a HFC plant is roughly 10 Gbps. As can be seen by the circled region in FIG. 1, the expected 50% growth hits the 10G ceiling around the year 2024, less than a decade away, assuming continued 50% growth rate over the entire interval along with a corresponding migration to all-IP Video. While the time frame predicted in FIG. 1 may initially be disconcerting to cable operators who might think that HFC will have run out of capacity by that date, in reality this interval only represents the Top Billboard Tier which is typically less than 1% of all subscribers. Hence this time frame merely indicates when the migration from HFC to FTTP migration must begin, where the choice of when a CATV provider decides to begin migration within that interval is discretionary.

Figure 2:
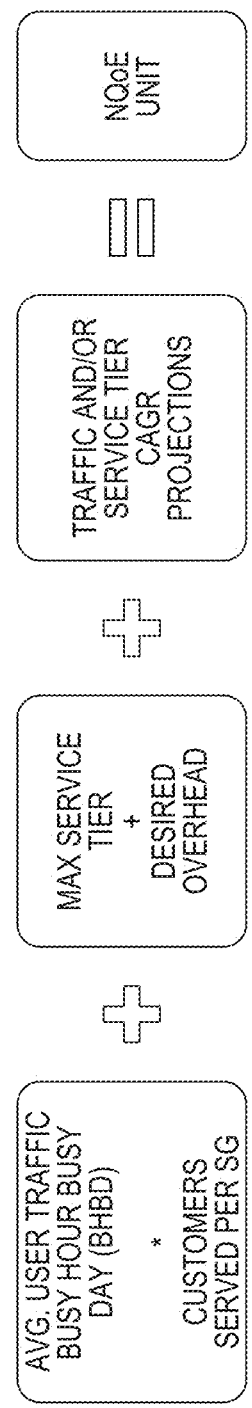
FIG. 2 shows a Network Quality of Experience (NQoE) formula.

To predict the effect that the other 99% of the subscribers may have on the transition to FTTP, FIG. 2 presents a Network Quality of Experience (NQoE) formula first posited in a network capacity model developed by Mike Emmendorfer. The NQoE formula goals include: (1) achieving Max Service Tier even during busy periods; (2) allocating an appropriate amount of network resources; (3) network resources sufficiently configurable to accommodate any data network; (4) accommodating estimates of Service Tier and Traffic Growth Rates; and (5) achieving Max Service Tier through Next Network Capacity Adjustment. While the detailed formula is extremely complex, the simplified version below has been found to work quite well in most situations:

$$C >= (N_{sub} * T_{avg}) + (K * T_{max\_max}) \qquad \text{(Equation 1)}$$

where C is the required Bandwidth Capacity for the service group, Nsub is the total number of subscribers within the service group, Tavg is the average bandwidth consumed by a subscriber during busy-hour, Tmax_max is the highest Tmax offered by the MSO, K is a QoE constant (larger values of K yield higher QoE levels) and K values for typical scenarios will fall in the range K=1.0-1.2.

The first component ($N_{SUB} * T_{AVG}$) in Equation 1 represents the average static traffic load and is a function of the number of subscribers per Service Group (SG) and the average bandwidth per sub at busy hour. The second component ($K * T_{MAX\_MAX}$) of Equation 1 is the headroom required for good Quality of Experience (QoE). Tmax is the Maximum Sustained Traffic Rate parameter for DOCSIS Service Flows. Tmax_max is the highest Tmax across all Service Flows. It should be large enough to support a burst from the highest offered service tier. Many operators may choose a QoE constant, K, equal to 1.2 to give themselves an additional 20% cushion.

Given equation 1, several example traffic engineering scenarios that can happen over the next five years may be considered. For a present day HFC scenario, assume a top service tier of 300 Mbps (i.e. Tmax_max) with 500 subscribers per SG and Tavg=400 kbps. This scenario requires 200 Mbps for the static traffic load and 360 Mbps for QoE headroom for a minimum capacity of 560 Mbps. An operator might deploy 16 DOCSIS 3.0 channels (96 MHz) to support this scenario, which is shown on the left of FIG. 3.

Figure 3:
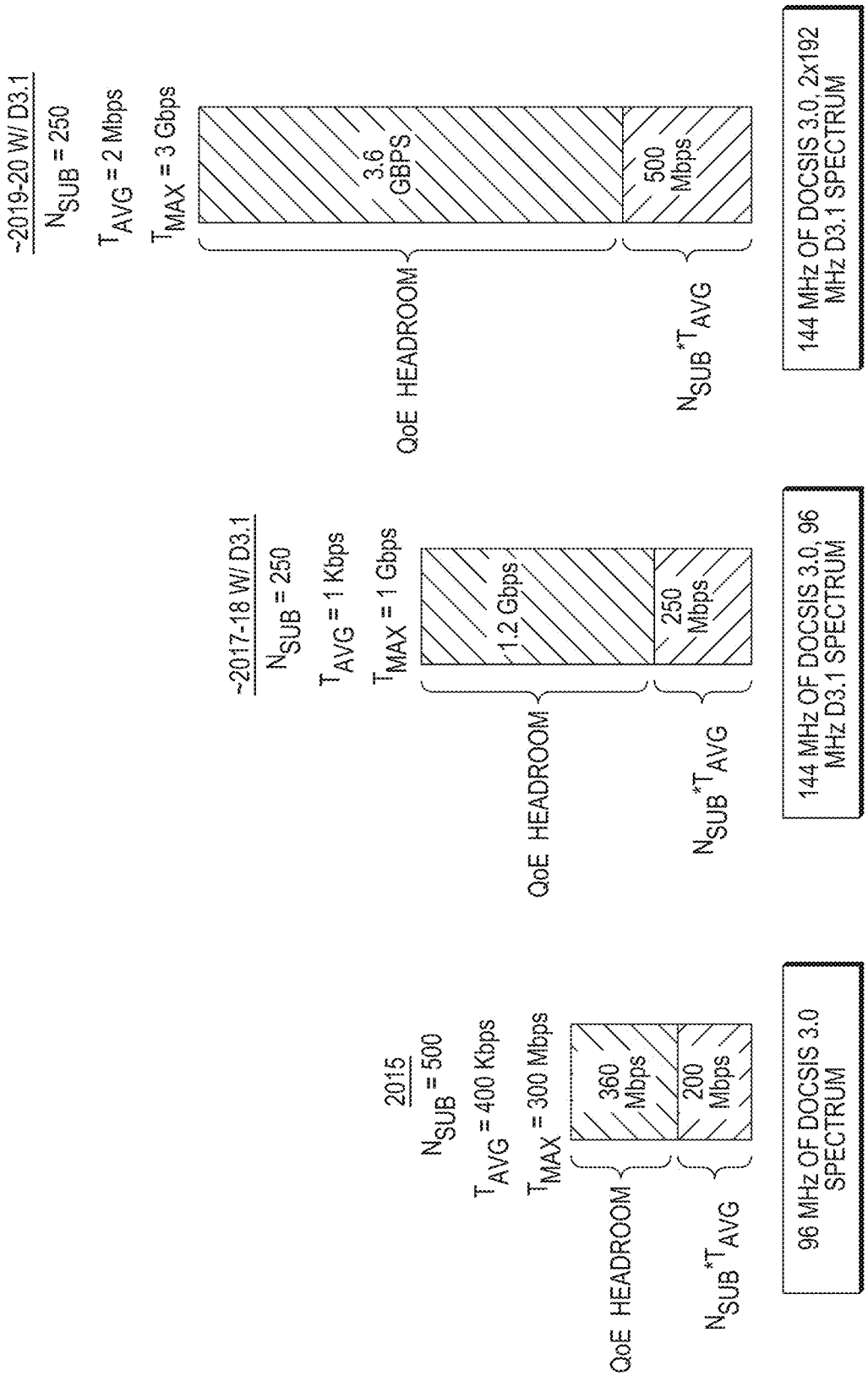
FIG. 3 shows three exemplary CATV network traffic engineering scenarios.

A couple years later, the middle scenario in FIG. 3 supports a max service tier of 1G with 250 subs per SG and Tavg=1 Mbps, a scenario that requires almost 1.5 Gbps. This may be achieved, for example, by bonding 24 DOCSIS 3.0 channels (144 MHz) with 96 MHz D3.1 OFDM channels. By the end of the decade, as illustrated by the right hand scenario of FIG. 3, operators may try to max out D3.1 CPE capabilities and offer a 3 Gbps service tier. By then, Tavg might be 2 Mbps. This scenario requires at least 4.1 Gbps of capacity, which might be achieved by bonding 24 DOCSIS 3.0 channels (144 MHz) with a pair of 192 MHz D3.1 OFDM channels Considering these three scenarios, the DOCSIS spectrum has soared from 96 MHz, to 240 MHz in only a few years, and eventually to 528 MHz by the end of the decade. To control this spectrum growth, an operator might be tempted to consider splitting service groups. However, splitting a service group only impacts the average static load. As can be seen in FIG. 3, this becomes a smaller and smaller component of the traffic engineering. During this stage, it becomes more important to increase the HFC spectrum (e.g. from 750 MHz plant to 1 or 1.2 GHz plant), which still might not be sufficient.

In order to arrive at a better alternative, the present inventors more carefully evaluated the service tiers other than the Top Billboard Tier. Table 1 shows a representative sampling of various service tier breakdowns from several major North American MSOs. The Top Billboard Tier for this sample in 2014 was 300 Mbps and less than 1% of the subs took this service. Looking at the other service tiers, roughly 14% were in the "Performance" Tier @ 75 Mbps with the majority of subscribers in the Basic Tier (65% @25 Mbps) and Economy Tier (20% @ 5 Mbps).

TABLE 1

2014 Service Tier Mix, Rates & Growth

| 2014 Service Tier Levels | % of Subs | Tmax (Mbps) | Tmax CAGR |
|---|---|---|---|
| Top Tier-Billboard rate | 1% | 300 | 50% |
| Performance Tier | 14% | 75 | 32% |
| Basic Tier | 65% | 25 | 26% |
| Economy Tier | 20% | 5 | 15% |

However, forecasts indicate that, while the Top Billboard Tier is expected to grow at the Nielsen's Law 50% CAGR (Compounded Annual Growth Rate) described earlier, the other service tiers had a significantly lower growth rate. The lower the performance of the service tier, the lower the CAGR.

While this difference in CAGR among service tiers initially might be counterintuitive, a more careful consideration indicates that it actually makes sense. If all service tiers grew at Nielsen's 50% CAGR, then every installed cable modem would be obsolete within 2-3 years of introduction, requiring a staggering investment level. Since operators control the CAGR for each service tier, they effectively control how long the cable modem technology stays viable in the field. Note further that the Economy Tier could still be using DOCSIS 2.0 modems from over a decade ago. In 2014, a 16-channel bonded cable modem was probably used for the Top Billboard Tier of 300 Mbps. In a few years, once 1G service is available on HFC, the 300 M service with its 16-bonded channel modem becomes the Performance Tier. A few years after that, it will be relegated to the Basic Tier.

Figure 4A:
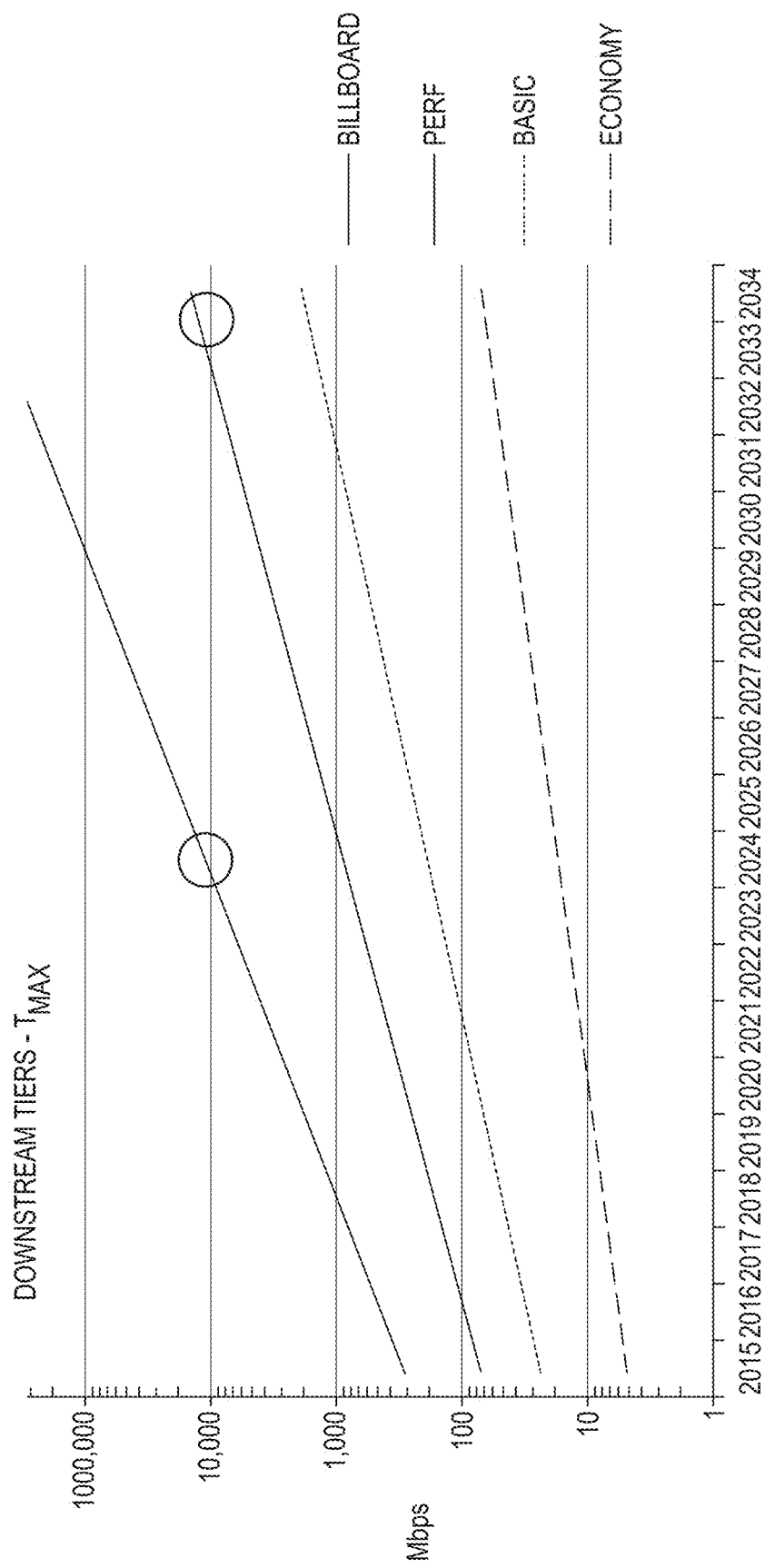
FIGS. 4A and 4B show an exemplary 20-year growth window for a Maximum Sustained Traffic Rate parameter.
Figure 4B:
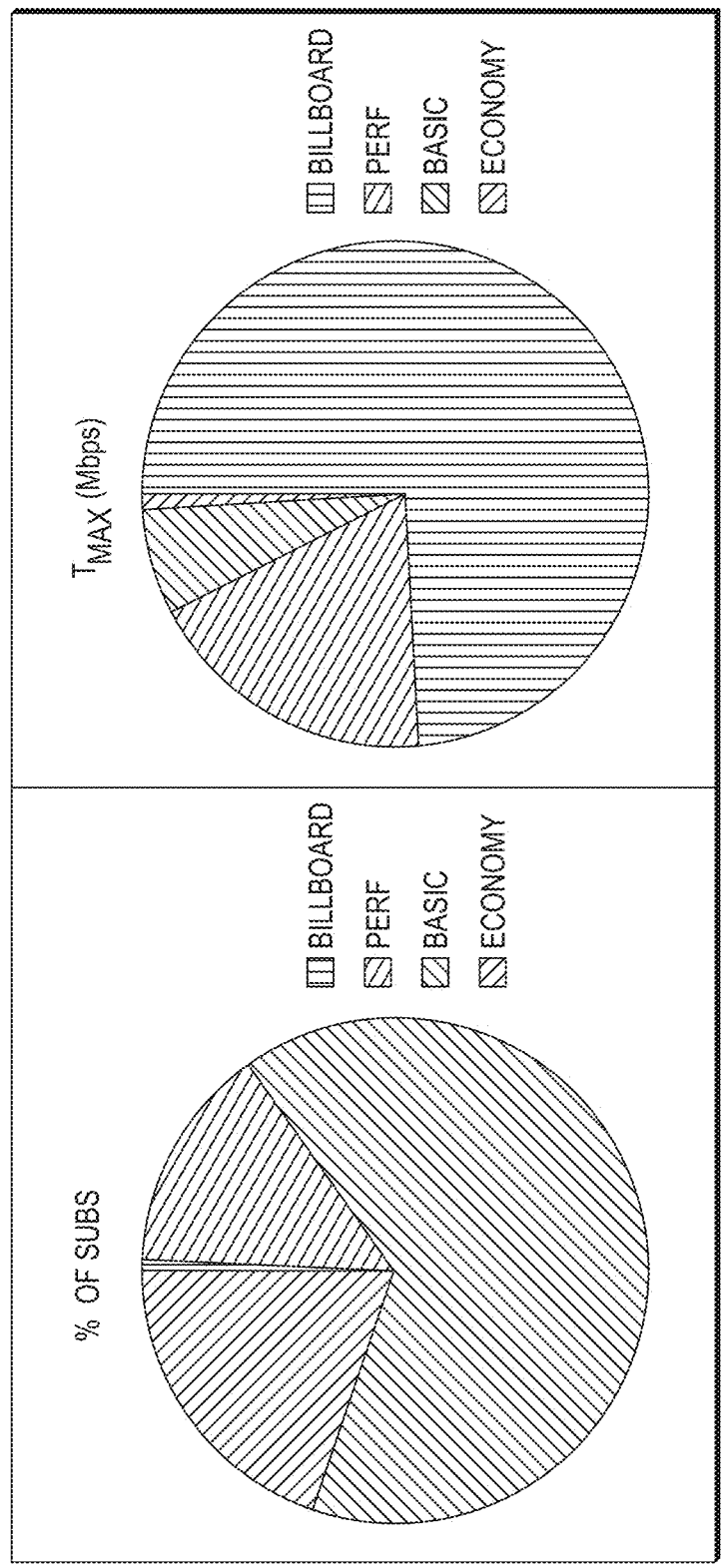

FIGS. 4A and 4B together show the Tmax growth for each service tier over a 20 year window. As indicated earlier, the Top Billboard Tier may be expected to arrive at the approximate 10 Gbps HFC limit by 2024. The Performance Tier Tmax does not achieve 10 Gbps until 2033. By this time, these subscribers will need to be migrated to FTTP. Meanwhile both the Basic and Economy Tiers are well under the 10 Gbps limit twenty years from now. In this example, 85% of the HFC subscribers do not need to migrate from HFC for more than two decades, which even this assumes that growth rates continue unabated. Thus, within 10 years, HFC infrastructure will be able to deliver an Ultra-HD video stream to every person on the network, so further growth will have to be driven by some future application.

Note that the approximately 10 Gbps HFC limit assumes that DOCSIS 3.1 has been deployed and legacy MPEG spectrum has been recovered. If an operator chooses to stay with DOCSIS 3.0 technology, then their best Tmax would be around 1 Gbps using 32-channel bonded modems. From FIG. 4, the Performance Tier now needs to move to FTTP by 2024 and the Basic Tier (i.e. 65% of subs) need to be on FTTP by about 2030. This drastically alters the HFC to FTTP migration plans.

Table 2 shows where each service tier might be by the end of the decade. With a 50% CAGR, the Top Billboard Tier might be at 3G service rate. The Performance Tier with its approximately 32% growth now reaches ~500 M service rate, while the Basic Tier has grown to 100 M and the Economy Tier is around 10 M.

TABLE 2

2020 Service Tier Mix, Rates & Growth

| ~2020 Service Tier Levels | % of Subs | Tmax (Mbps) | Tmax CAGR |
|---|---|---|---|
| Top-Tier-Billboard rate | 1% | 3000 | 50% |
| Performance Tier | 14% | 500 | 32% |
| Basic Tier | 65% | 100 | 26% |
| Economy Tier | 20% | 10 | 15% |

Referring again to FIG. 3, the Top Billboard Tier still fits within the DOCSIS 3.1 cable modem capabilities (i.e. 2×192 MHz OFDM channels), but now requires the operator to have 4.1 Gbps of DOCSIS capacity to offer this service tier. With the "Selective Subscriber Shedding" method, the Top Billboard Tier would be migrated from HFC to FTTP. Note that this tier is typically less than 1% of the total subscribers, so a 250 subscriber SG might only have two or three subscribers in this tier, on average, that need to migrate.

With the Top Tier removed, the traffic engineering can be re-calculated for the remaining HFC subs. The static load is essentially unchanged since so few subscribers have been removed. However, the QoE portion of the formula has been drastically reduced since the top service rate (Tmax_max) is now 500 Mbps instead of 3 Gbps. This means that the operator now only needs 1.7 Gbps of DOCSIS capacity instead of the previous 4.1 Gbps before subscriber shedding. This corresponds to a savings of 250-300 MHz of spectrum using DOCSIS 3.1 OFDM channels. By migrating the Top Billboard Tier to FTTP, the operator has effectively extended the life of the HFC for the remaining subscribers.

Network Capacity Modeling of FTTP Migration

Figure 5:
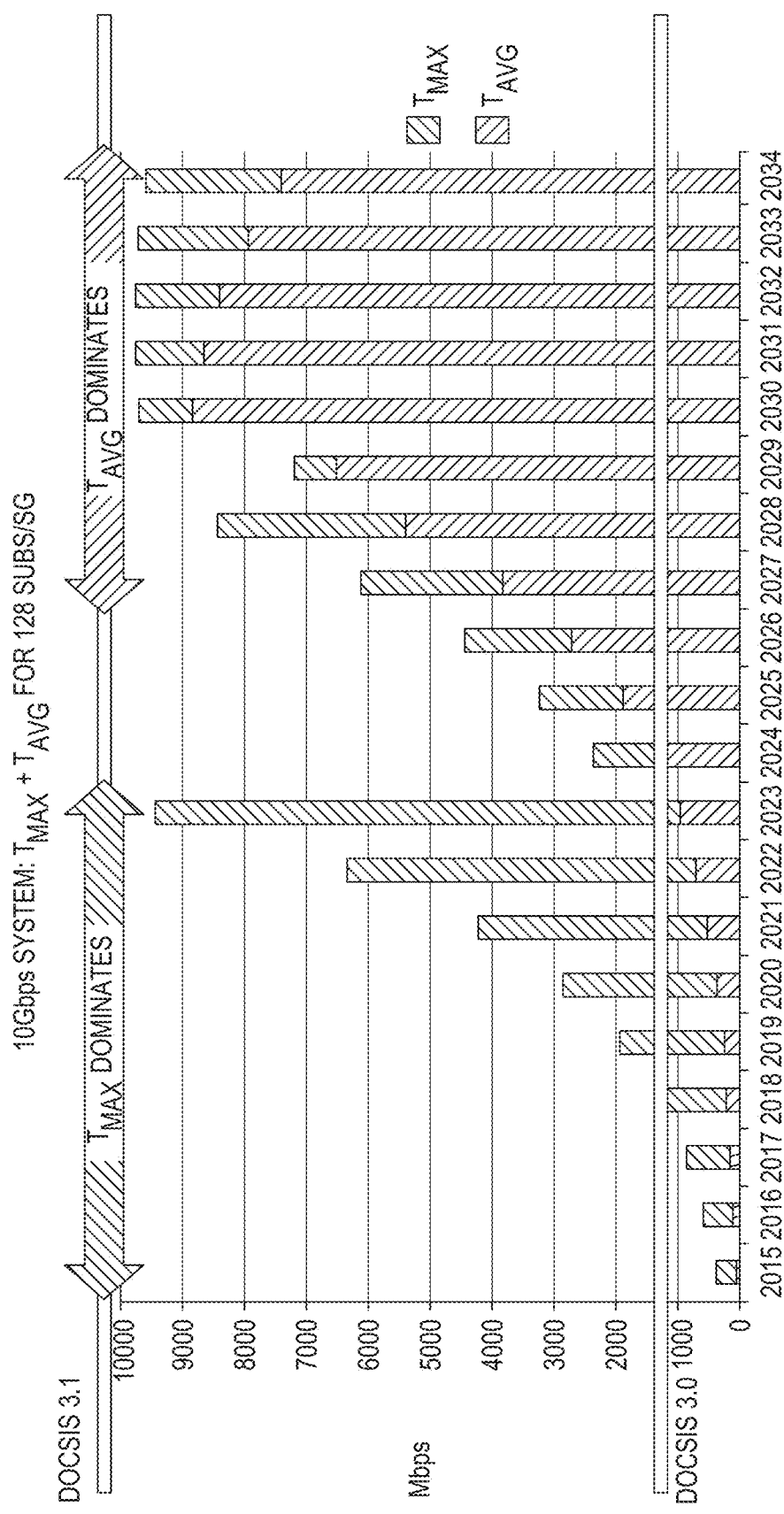
FIG. 5 shows an exemplary network capacity model having 128 subscribers per service group.
Figure 6A:
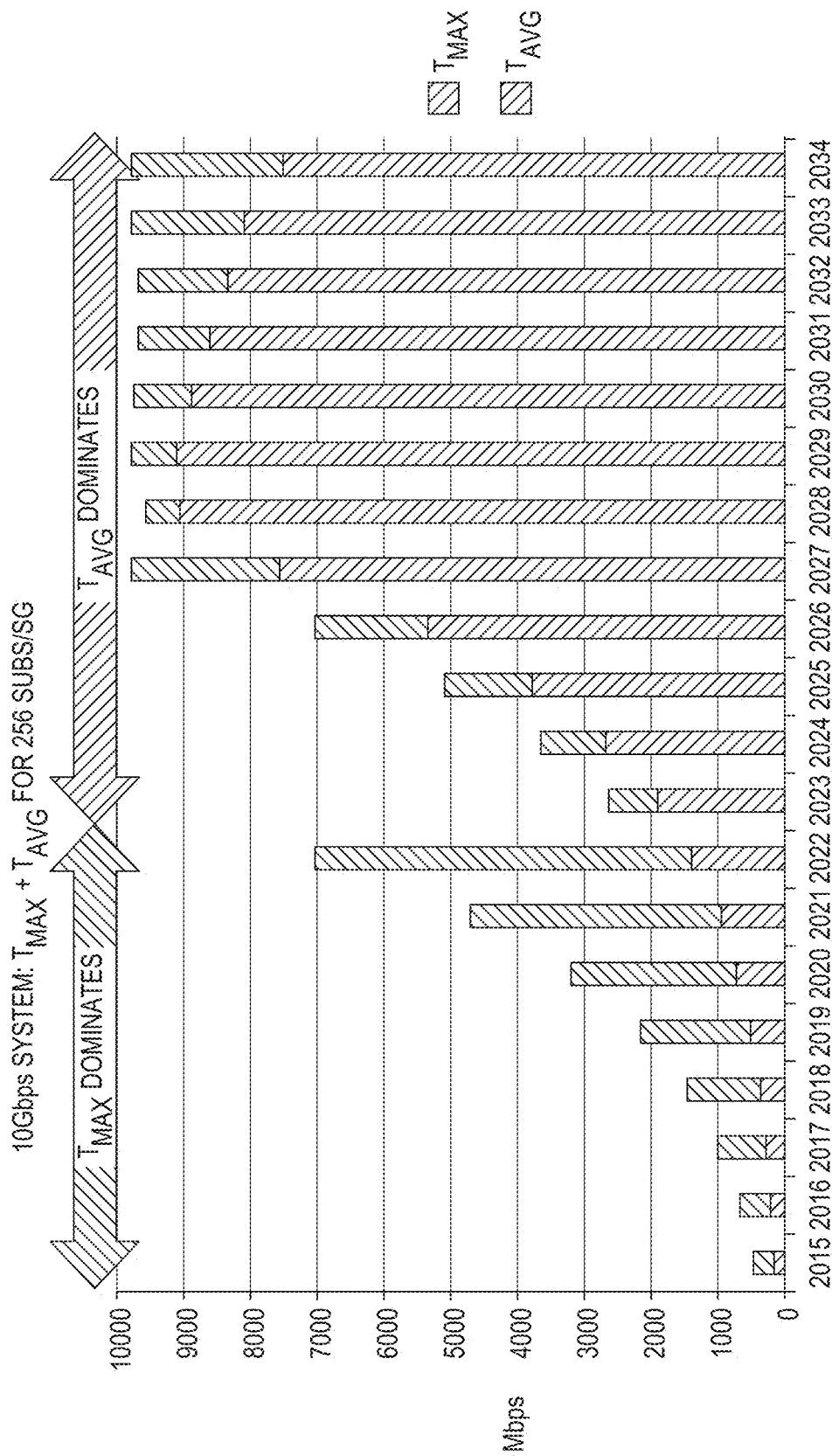
FIGS. 6A-6D show exemplary network capacity models having service groups with subscribers of varying sizes.
Figure 6B:
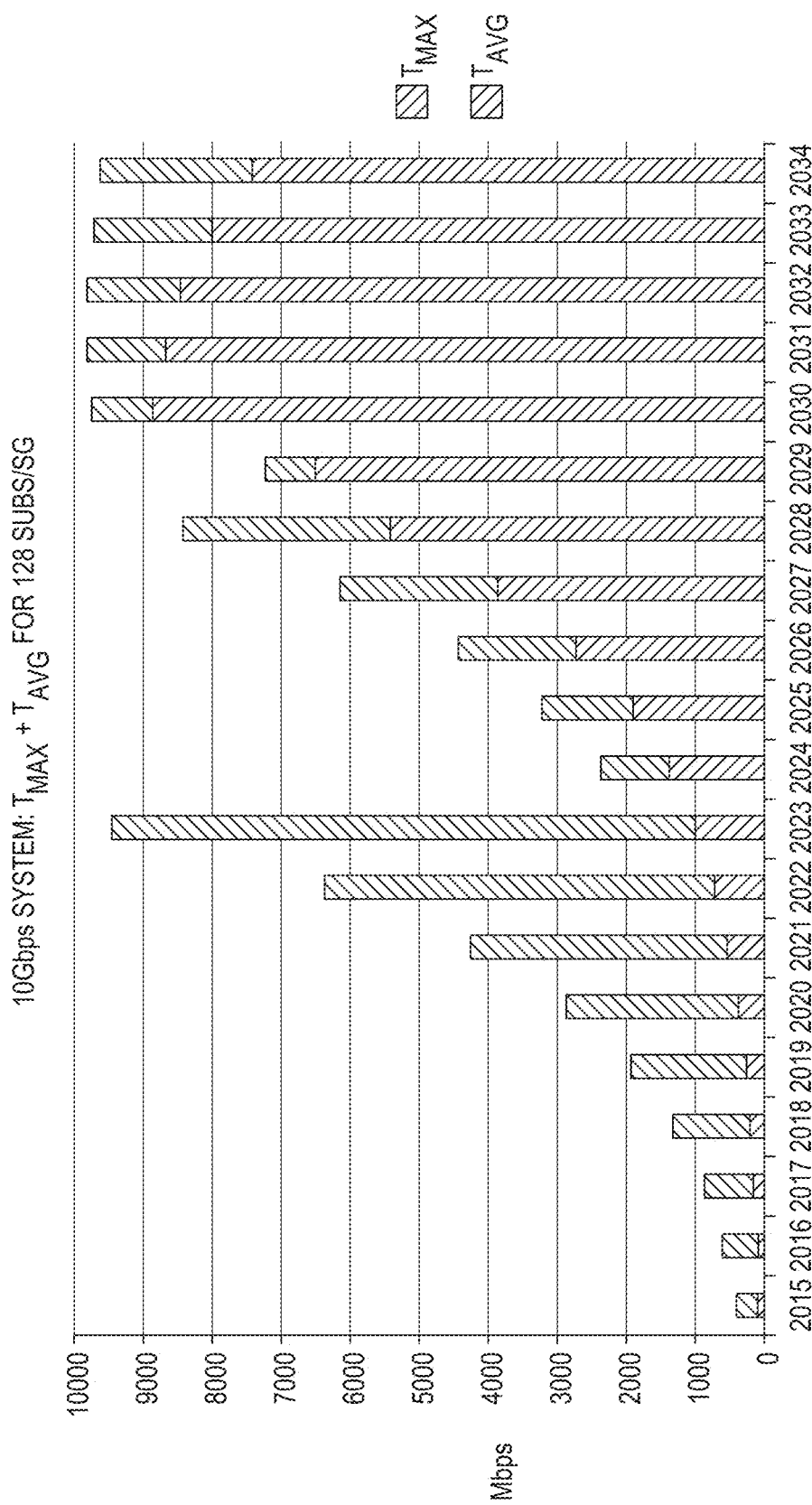
Figure 6C:
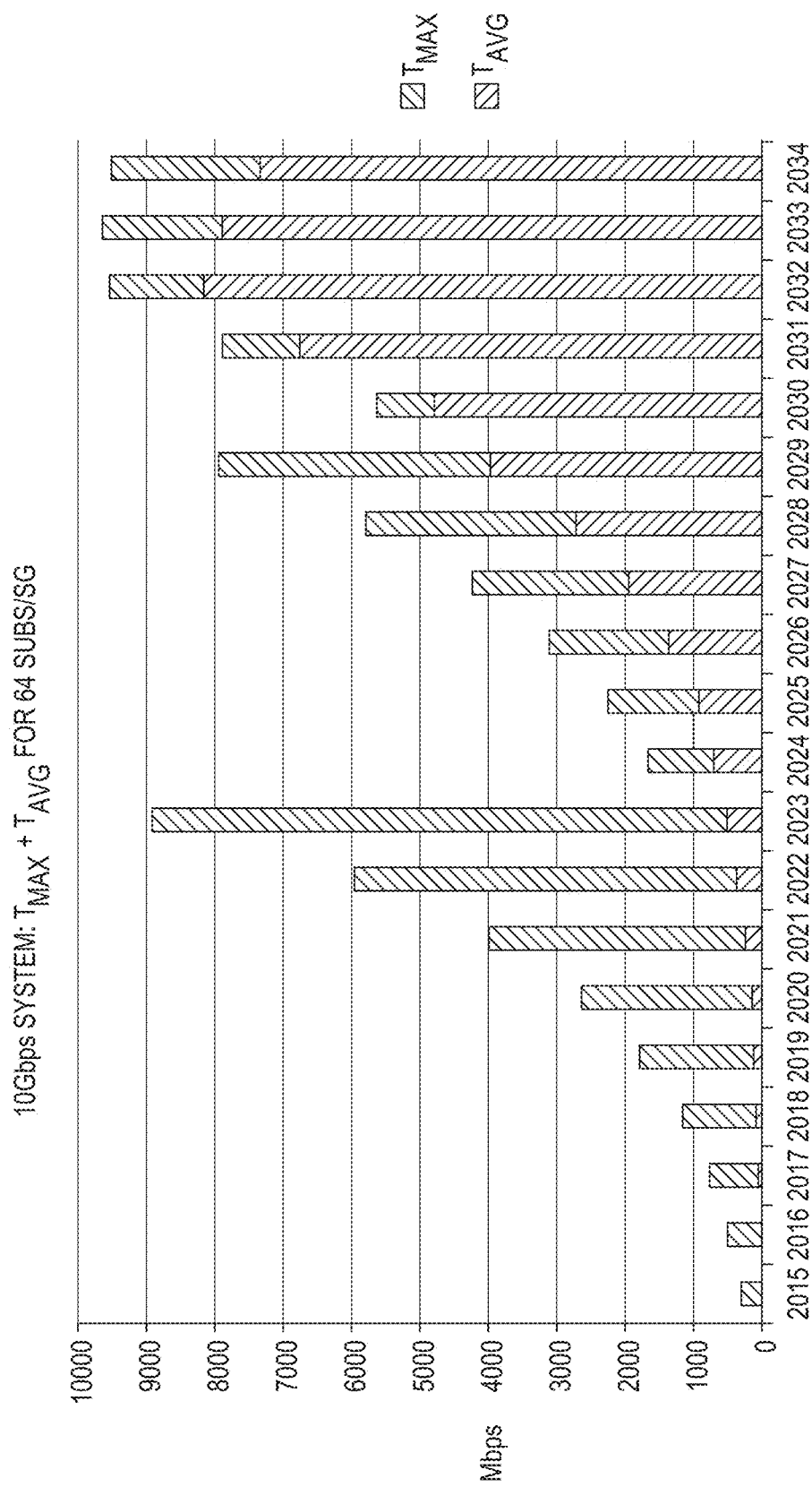
Figure 6D:
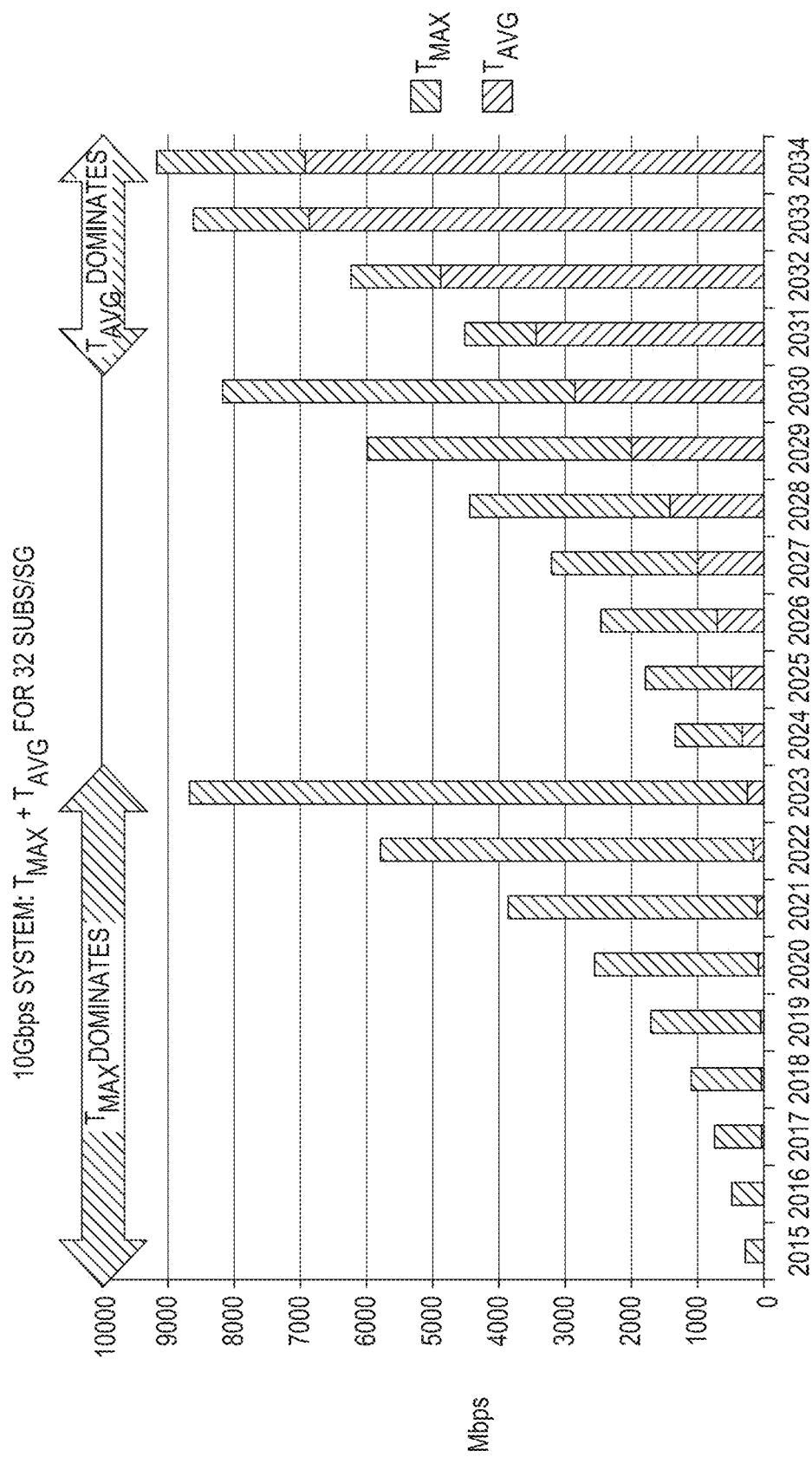

A network capacity model of this service tier example, which assumes 128 subscribers per SG, is shown in FIG. 5. This particular model migrates subscribers to FTTP starting with the highest available service tier as DOCSIS capacity exceeds 10 Gbps. The dark portion of each bar is the QoE element driven by Tmax_max. The light portion of each bar is the static load.

As can be seen in FIG. 5, Tmax dominates in the early years. The 50% CAGR on the Top Billboard Tier is evident in the growth through 2023. In 2024, the Top Billboard Tier (i.e. <1% of subs) is shed to FTTP and there is a drastic reduction in required DOCSIS capacity. The growth rate is now the slightly lower Performance Tier. The Performance Tier is fine using HFC thru 2028 but needs to migrate to FTTP by 2029. By 2029, there is only 15% of subscribers that must be shed from the HFC to FTTP. At this point, with the highest tiers moved to FTTP and continued growth in Tavg, the static load has now become the dominant piece of the network capacity formula. Beginning in 2031, Basic Tier subscribers start to be migrated to FTTP in order to reduce the static load. Hence, the light component of the bars in FIG. 5 start to drop as there are fewer and fewer subscribers still using the HFC network. FIG. 5 also assumes a fixed SG size of 128 subs. Once the static traffic load starts to dominate, it now becomes desirable to split SG size which will reduce the static traffic load.

FIGS. 6A-6D provide four charts corresponding to SG sizes of 256, 128, 64, and 32 subs. As can be seen from this figure, service group size has little impact over the next 8-10 years on determining when the Top Billboard Tier needs to migrate to FTTP (32 subscribers per SG is only one year after 256 subscribers per SG). However, SG size is a big factor on when the static load starts to dominate. For 256 subscribers per SG, the static load becomes the dominant portion by the year 2023. For 32 subscribers per SG, the static load does not dominate until the following decade.

The foregoing discussion illustrates several things. First, migrating to DOCSIS 3.1 is important. FIG. 5 shows the relative HFC limits with both DOCSIS 3.1 and 3.0. Having the capabilities of DOCSIS 3.1 greatly extends the life of the HFC network. Second, the near term goal of CATV providers should to increase spectrum for DOCSIS 3.1. This might mean upgrading a 750 MHz plant to 1,002 MHz or even 1,218 MHz plant. To offer 1 Gbps downstream services over the HFC, the operator should also consider an 85 MHz upstream split at this time as well. Given existing asymmetric traffic loads, the 85 MHz upstream spectrum should match well with a 1 GHz downstream spectrum. As the provider looks further into the future, the static load will start to dominate and SG splits may then become more practical. As operators migrate the highest tiers to FTTP, they should keep in mind that they will eventually need to do some SG splits on HFC as well.

Economic Impacts of Selective Subscriber Shedding

Figure 7:
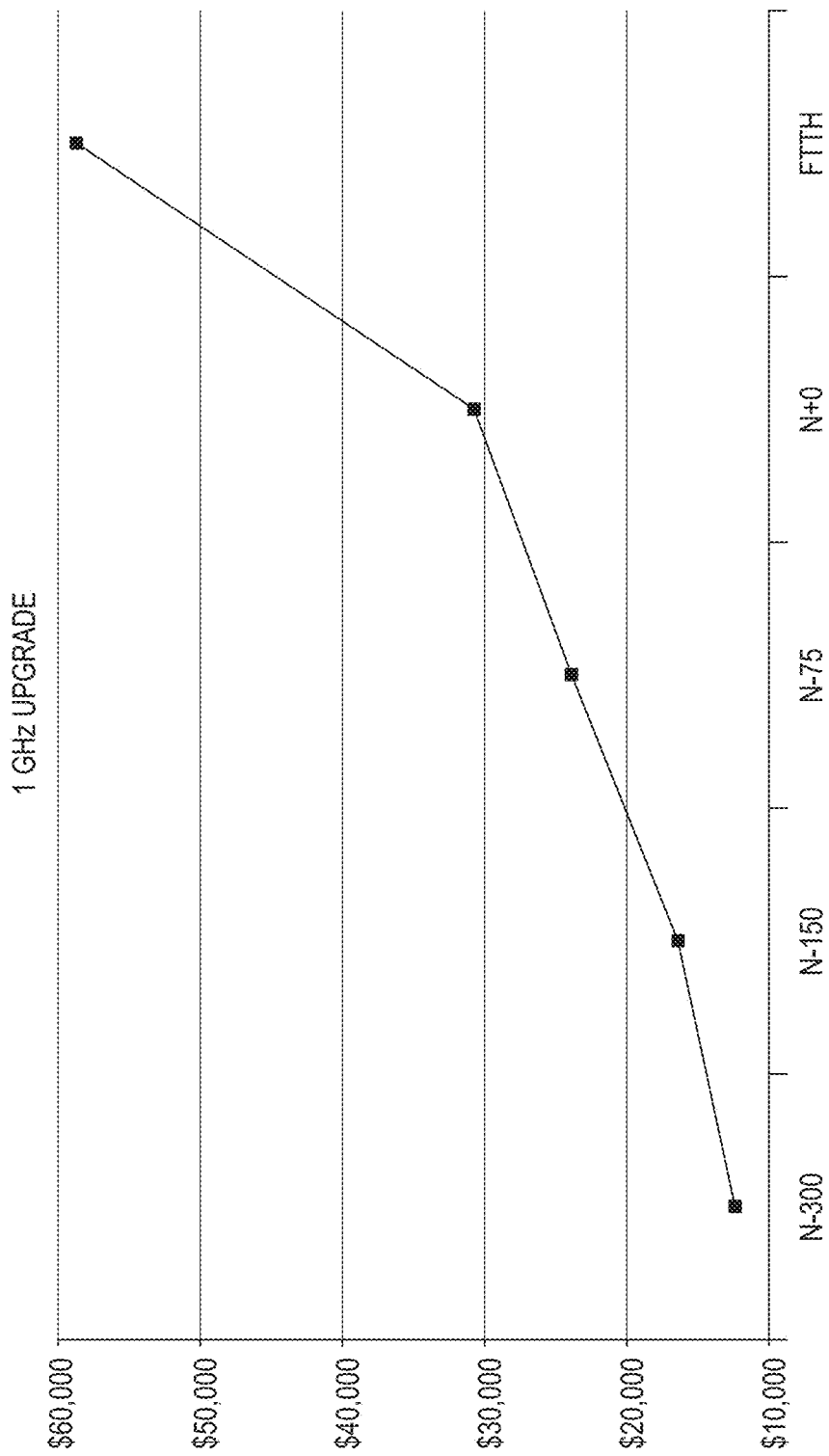
FIG. 7 shows example plant upgrade costs associated with a disclosed "Selective Subscriber Shedding" method.

While the prior discussion centered on traffic engineering benefits of the Selective Subscriber Shedding method, it is also worthwhile to consider the economic impacts of this strategy. FIG. 7 shows example plant upgrade costs for a suburban case study with a serving area of almost 1000 homes passed (HP). Specifically, a full FTTP upgrade is compared to various HFC upgrades to 1 GHz/85 MHz. The HFC options show progressively deeper fiber. N−300 has no more than 300 HP on any leg and is typically N+1 or N+2 with a very limited number of outlying homes at N+4. N−150 and N−75 continue to increase nodes and reduce SG size. These options all use existing node & amplifier locations. Finally, the N+0 upgrade is almost a complete rebuild of the HFC with nodes put in new sites as needed. The N+0 upgrade averages about 60 HP per node.

As is shown in FIG. 7, the plant upgrade costs skyrocket as fiber goes deeper. The ~$30K upgrade cost of N+0 is more than twice that of the N−300 upgrade. The ~$60K cost of FTTP is double the cost of N+0 and is five times more expensive than the N−300 upgrade. A key reason on why the FTTP is much more expensive is that a significant portion of the fiber installation is associated with the last drop cable over the last couple hundred meters.

With the Selective Subscriber Shedding method, an operator only needs to do the N−300 HFC upgrade in the near term, at substantially less cost than either N+0 or FTTP. The N−300 upgrade provides essentially the same spectrum as N+0, so this satisfies the short term needs when Tmax dominates. With the cost savings, a handful of Top Billboard Tier customers can be given FTTP connections. Over the next decade, the Performance Tier can be gradually migrated to FTTP. When this happens, the fiber will also be pulled to enable a fiber deeper HFC migration to N−75 or even N+0 when needed over ten years from now. This approach allows operators to grow slowly as needed and spread plant investments over a lengthy time window, yet still be prepared for fiber deep SG splits when needed a decade from now.

In summary, selectively shedding subscribers from HFC to FTTP starting with the highest service tiers, combined with DOCSIS 3.1 and 1 GHz/85 MHz upgrades to maximize HFC capacity, provides a sensible transition from HFC to FTTP and relieves pressure to reclaim legacy spectrum. This method not only saves money, it adds decades of life to the HFC plant for 80% to 95% of the total subscribers by being able to support Gbps services to the masses. Furthermore, if entertainment and Ultra-HD is all that Basic & Economy Tiers require, then these subscribers can potentially reside on HFC forever.

DOCSIS 3.1 Overview

DOCSIS 3.1 is a key element in the foregoing method to extend the life of HFC for decades. Some critical technologies underlying the DOCSIS 3.1 standard include: OFDM, LDPC Forward Error Correction (FEC), Multiple Modulation Profiles in the downstream, and Time and Frequency Division Multiplexed (TaFDM) CMTS Scheduler.

DOCSIS 3.1 provides the following important benefits: (1) it is DOCSIS 3.0 backwards compatible and operates in existing HFC plants without changes; (2) it has Ultra-wide, variable width channels, e.g. 24-192 MHz downstream channels and 6.4-96 MHz upstream channels; (3) its higher modulations yield increased spectrum capacity, e.g. 4,096-QAM (16,384-QAM optional) in the downstream direction, 1,024-QAM (4,096-QAM optional) in the upstream direction with Bps/Hz gains of 40%-75% (downstream) and 66% to 100% (upstream); (4) it provides new spectrum availability, i.e. an optional future spectrum of 1,218 MHz downstream, 204 MHz upstream for 10+Gbps (downstream), 1.8 Gbps (upstream) as well as a robust OFDM+LDPC Leverages Roll-off region in existing plants (~1 Gbps possible); (5) OFDM+LDPC and TaFDM maximizes existing upstream (e.g. ~250 Mbps in 42 MHz); and (6) DOCSIS 3.1 MAC enables bonding across 3.0 SC-QAM+3.1 OFDM.

The DOCSIS 3.1 specification also requires that the first generation DOCSIS 3.1 cable modems must support two 192 MHz OFDM channels downstream and two 96 MHz OFDMA channels in the upstream. That means these DOCSIS 3.1 modems, once deployed in the field, will be capable of providing capacities of 5 Gbps downstream and 1.8 Gbps upstream.

DOCSIS 3.1 Capacity and Migration Examples

Figure 8A:
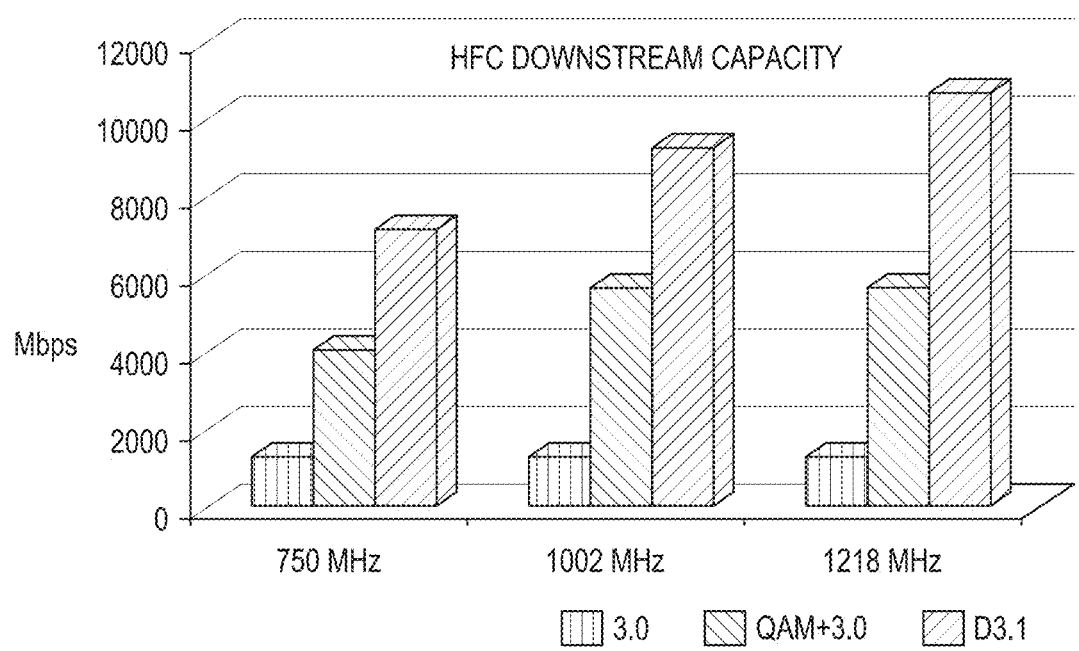
FIGS. 8A and 8B show HFC Upstream and Downstream capacity for selected sizes of spectrum transmitted by a CATV provider.
Figure 8B:
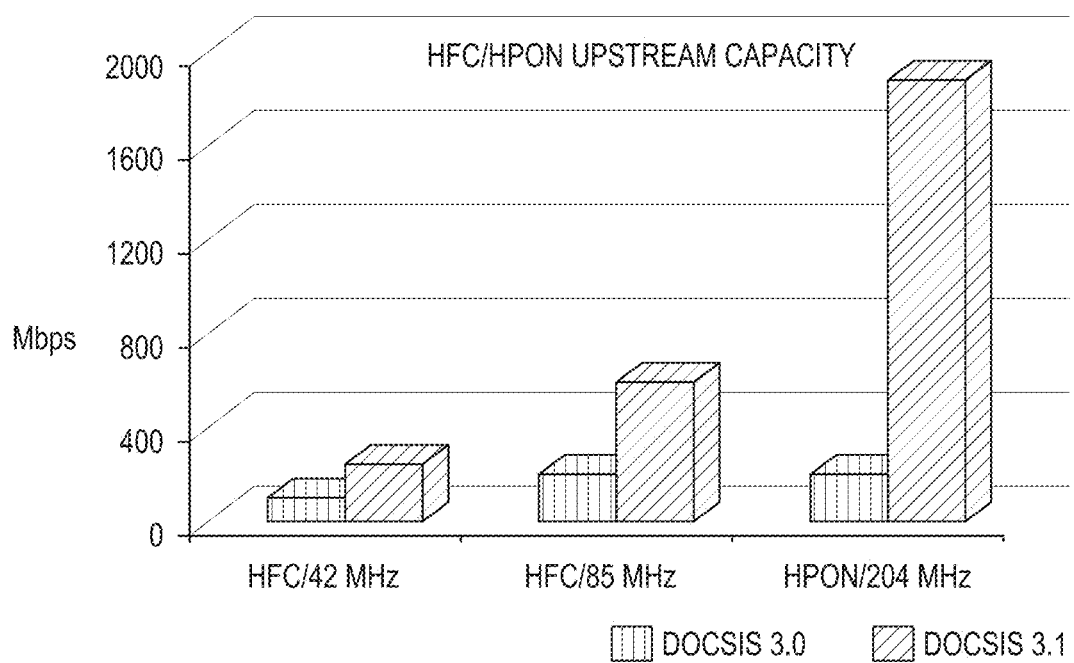

FIGS. 8A and 8B show that DOCSIS 3.1 greatly increases the potential capacity of HFC. Today's DOCSIS 3.0 cable modems are limited to 32×8 configurations. The 32-bonded downstream channels enable just over 1 Gbps of capacity. The 8-bonded upstream channels provide about 200 Mbps of upstream capacity. From an HFC plant perspective, total capacity for today's HFC is the combination of both the DOCSIS 3.0 channels and the MPEG Video QAM channels, which is represented in FIG. 8A with the 3.0+QAM bars.

For a 750 MHz HFC plant, the downstream capacity goes from approximately 4 Gbps for 3.0+QAM to approximately 7 Gbps for DOCSIS 3.1. For a 1 GHz HFC plant, this differential may go from approximately 5 Gbps for 3.0+QAM to almost 9 Gbps for D3.1. Finally, DOCSIS 3.1 can provide over 10 Gbps of downstream capacity over 1,218 MHz of spectrum.

Also of importance is the procedure by which migration from DOCSIS 3.0 to DOCSIS 3.1 occurs. Initially, no HFC plant changes are needed. DOCSIS 3.1 can be introduced into existing plants, providing capacity gains with improved spectral densities, with the challenge being finding available spectrum for DPCSIS 3.1. In the downstream direction, DOCSIS 3.1 provides am additional benefit in that it can operate in the roll-off region. For example on a 750 MHz plant, an OFDM channel could be placed from 750 to 900 MHz. An analysis of an actual 870 MHz plant showed that there may be as much as 1 Gbps of capacity in the roll-off region, but this may vary substantially from one HFC plant to another.

At the point an operator does decide to upgrade, several options exist. The first option is to expand the existing HFC spectrum. For example, it may be preferable to extend the downstream spectrum to at least 1,002 MHz since such upgrades are straightforward and cost effective. Some operators may consider going to 1,218 MHz but this will introduce some additional challenges, especially considering power and tilt as well as potential MoCA interference. When upgrading the HFC downstream spectrum, the operator may also consider increasing the upstream split to 85 MHz. This will help future-proof the HFC from an upstream capacity perspective.

The second upgrade option is to migrate select subscribers to HPON, which will give these HPON subscribers immediate access to expanded spectrum (e.g. 1,218 MHz downstream, 204 MHz upstream) while not requiring any immediate changes to the existing HFC. Those of ordinary skill in the art will appreciate that different operators have their own circumstances that will dictate which upgrade option is selected, and/or which order they are applied. It may be that many operators will pursue both options in parallel.

The final step in the migration to DOCSIS 3.1 should preferably be for the operator to enable all IP video so that legacy MPEG spectrum can be reclaimed, and the entire HFC spectrum utilized by DOCSIS. The IP video deployment should leverage the latest Multicast adaptive bit rate (ABR) protocols to make the most efficient use of capacity.

The migration sequence just described will allow operators to grow their DOCSIS capacity on HFC from 1 to 2 to 5 to 10 Gbps over time.

Hybrid PON (HPON)

HPON comprises an innovative fiber splitter technology that completely eliminates Optical Beat Interference (OBI) for RFoG wavelengths. HPON requires minimal power, e.g. approximately 150 mW per drop connection. While not a purely passive architecture, HPON is not meaningfully different from many PON installations that require PON extenders or Remote OLT at much higher power consumption. Thus, while minimal power is needed for RFoG wavelengths, HPON is still essentially passive and compatible with Ethernet and PON technologies such as 10G Ethernet, EPON, 10G EPON, GPON, NG-PON2. Hence, even if the RFoG wavelengths lose their power, PON and Ethernet may continue to operate.

HPON is standards-compliant on both ends of the network. HPON is completely backwards compatible with today's RFoG ONU and RFoG Headend Optics. An operator may use any vendor's RFoG-compliant ONU or Optics. Because HPON eliminates OBI, an operator is free to choose any vendor's CMTS/CCAP with its traditional upstream scheduler. HPON enables full DOCSIS 3.1 performance with an OBI-free environment. In contrast, some other RFoG solutions needed a specialized CMTS 3.0 scheduler, which handicaps performance and is not usable with DOCSIS 3.1.

HPON is "hybrid" in several senses. First, HPON supports legacy HFC services Over FTTP. Second, HPON provides both DOCSIS 3.1 content along with traditional binary PON (e.g. EPON, GPON, NG-PON2). Third, HPON provides DOCSIS content over both HFC & FTTP. Fourth, HPON provides both DOCSIS 3.0 and DOCSIS 3.1 content. Fifth, HPON is both powered and passive. Sixth, HPON provides both a symmetric and asymmetric applications.

Fiber to the Home (FTTP) Transition

Until recently, EPON or GPON seemed to be the only reasonable long term FTTP choices. The DOCSIS over RFoG alternative was hampered by Optical Beat Interference (OBI) as previously discussed. With HPON, DOCSIS 3.1 over FTTP becomes a viable long term option. Those of ordinary skill in the art will appreciate that this is not an either/or choice for the operator, as HPON supports both EPON/GPON AND OBI-Free DOCSIS 3.1. The operator can support DOCSIS &/or EPON/GPON as needed, whichever is best suited to the service needs. For example, an operator might deploy symmetric 10G EPON over HPON for Business Services while DOCSIS 3.1 over HPON for Top Tier residential customers.

When considering DOCSIS or EPON over FTTP, operators should evaluate several factors. For example, EPON leverages Ethernet the ecosystem, supplies more than abundant bandwidth capacity up front, and offers symmetric capabilities. From a MAC perspective, it is simple and relies on small service groups and polling for access.

DOCSIS fits seamlessly into HFC infrastructure, being spectrum friendly. It supplies bandwidth capacity as needed, i.e. "Just in Time". This was evident with DOCSIS 3.0 as the number of bonded channels grew over time while always being backwards compatible. HFC and hence DOCSIS has had an asymmetric focus on residential applications. The MAC is full-featured to provide guaranteed services to very large service groups. For example, early DOCSIS adoption involves some service group sizes greater than 1000 modems.

HPON and the Role of DOCSIS

HPON support for DOCSIS over FTTP brings provides an operator with many potential benefits. First, it leverages the existing DOCSIS/HFC Infrastructure, which allows both CCAP and DOCSIS CPE investments to be reused in an HPON architecture. DOCSIS 3.1 over HPON supports legacy MPEG Video services, meaning that operators can reuse legacy STB investment in the field.

HPON unleashes DOCSIS 3.1 capabilities to its full extent, providing PON-like Gbps data rates for both downstream and upstream directions. Initial DOCSIS 3.1 modems will have 5 Gbps downstream, 1.8 Gbps upstream capacities, which will enable true 1G upstream services, unlike 1G EPON, GPON or 10G/1G EPON which lack sufficient QoE upstream capacity.

By leveraging the DOCSIS MAC capabilities, DOCSIS 3.1/HPON supports existing service group sizes and distances, which are significantly larger than traditional PON. DOCSIS is designed to handle 80 km distances with potentially 1000 modems, while traditional PONs are limited to 20 km and 32-64 ONU. This conserves trunk fibers and wavelengths as well as CCAP ports. In the future, DOCSIS 3.1 OFDM technology in an OBI-free environment offers the potential of 40 Gbps downstream, 10 Gbps upstream on single wavelength.

Mixed HFC and HPON DOCSIS 3.1 Operation

In the disclosed Selective Subscriber Shedding method, there may only be a few Top Tier subscribers on the FTTP in a serving area. From the perspective of Head End infrastructure, this appears wasteful and expensive if an entire CCAP or OLT port must be dedicated this small number of customers. DOCSIS 3.1 over HPON can overcome this hurdle by reusing the same CCAP port that is being used by the HFC plant.

Figure 9:
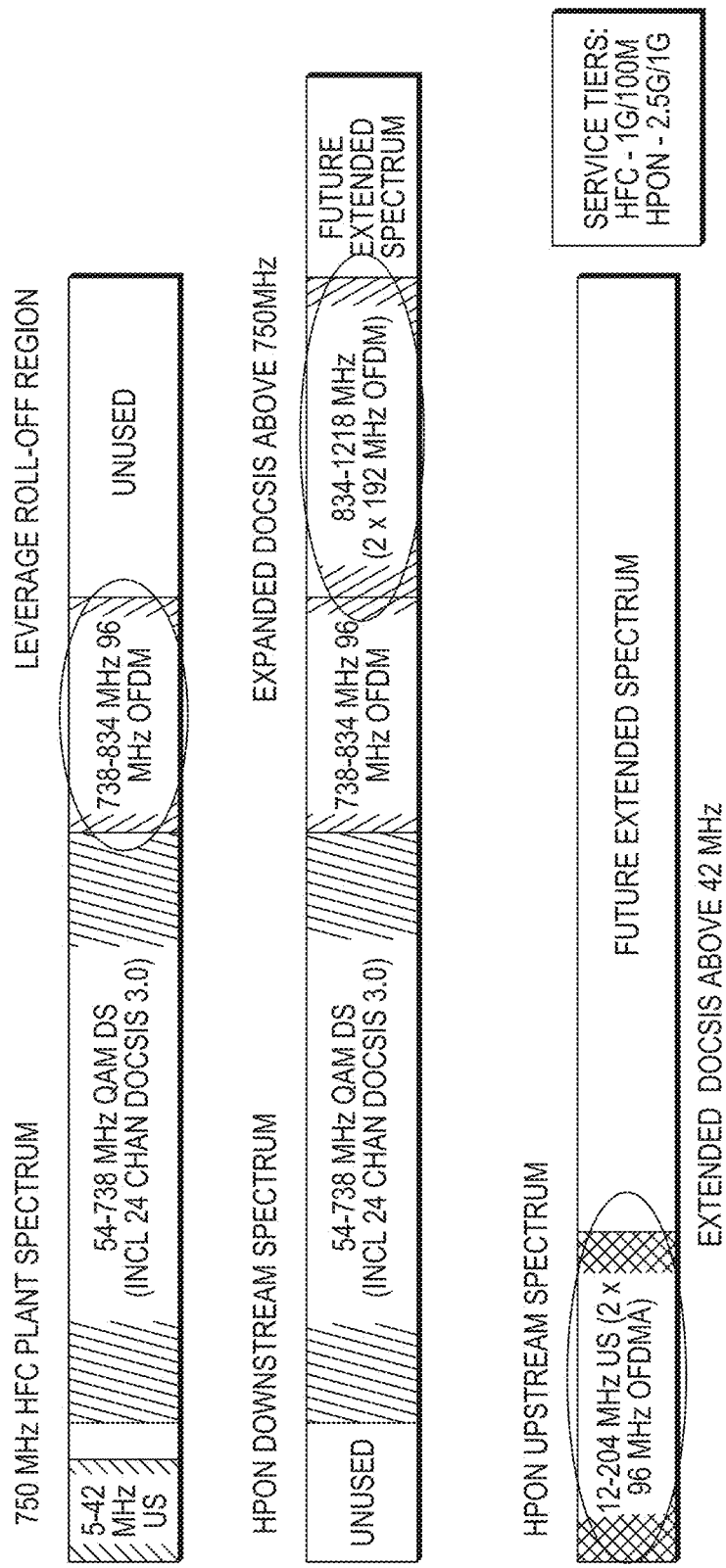
FIG. 9 shows an example of HFC spectrum overlapping with HPON spectrum.

FIG. 9 shows an example of how the HFC and HPON spectrum can overlap and be shared from a single CCAP port. The example of FIG. 9 assumes that most of the existing 750/42 MHz HFC spectrum is being used for DOCSIS 3.0 and legacy QAM services, which in some embodiments might include 24-32 3.0 channels. A 96 MHz 3.1 OFDM channel is placed on the HFC from 738 to 834 MHz so it only replaces two QAM channels and leverages the 750 MHz roll-off. This is enough DOCSIS capacity to offer 1G downstream services and 100 M upstream services (within 42 MHz).

Because HPON is full FTTP, it can support 1,218 MHz downstream. The CCAP port can put two additional 192 MHz OFDM channels from 834 to 1,218 MHz. This spectrum can then be sent down both the HFC and HPON. HFC modems will only use the 96 MHz OFDM bonded with 3.0 channels and ignore the top 2×192 OFDM. The HPON modems can bond across all OFDM and 3.0 channels as needed, which could enable a 2.5G or even 3G downstream service.

Another significant advantage of HPON is the isolation between downstream and upstream spectrum, each with its own dedicated wavelengths. This provides the operator with a cost effective operational mechanism for migrating select customers to a DOCSIS 3.1 204 MHz, true 1G upstream services while keeping the vast majority of subscribers on existing HFC. Over time, this capability can also enable Extended Spectrum RFoG with significant bandwidth capacity enhancements in both upstream and downstream. At the Head End, the 204 MHz HPON upstream can be combined with the 42 MHz HFC upstream and use the same CCAP port. The 42 MHz spectrum is shared between HFC and HPON while 42-204 MHz is available to HPON 3.1 modems. It should also be understood that HPON provides improved upstream Signal to Noise Ratio (SNR) and reduces upstream noise funneling from ingress in the home which should make 4096-QAM modulation a reality in the upstream.

The overlapping spectrum has some additional benefits. Because the downstream spectrum can stay within the 54-1,218 MHz band, it can continue to support legacy services such as STB in the lower spectrum. Thus, a benefit of HFC and HPON spectrum overlay on the same CCAP port is that a small number of subscribers can be cost-effectively moved to FTTP. This may be accomplished by simply licensing additional D3.1 OFDM channels, and without additional hardware. This is in contrast to a PON migration, where moving a small number of subscribers to FTTP might trigger the installation of an entire OLT where there may have been none before.

Comparing DOCSIS 3.1 Over HPON Capacities to Other PON Architectures

Figure 10:
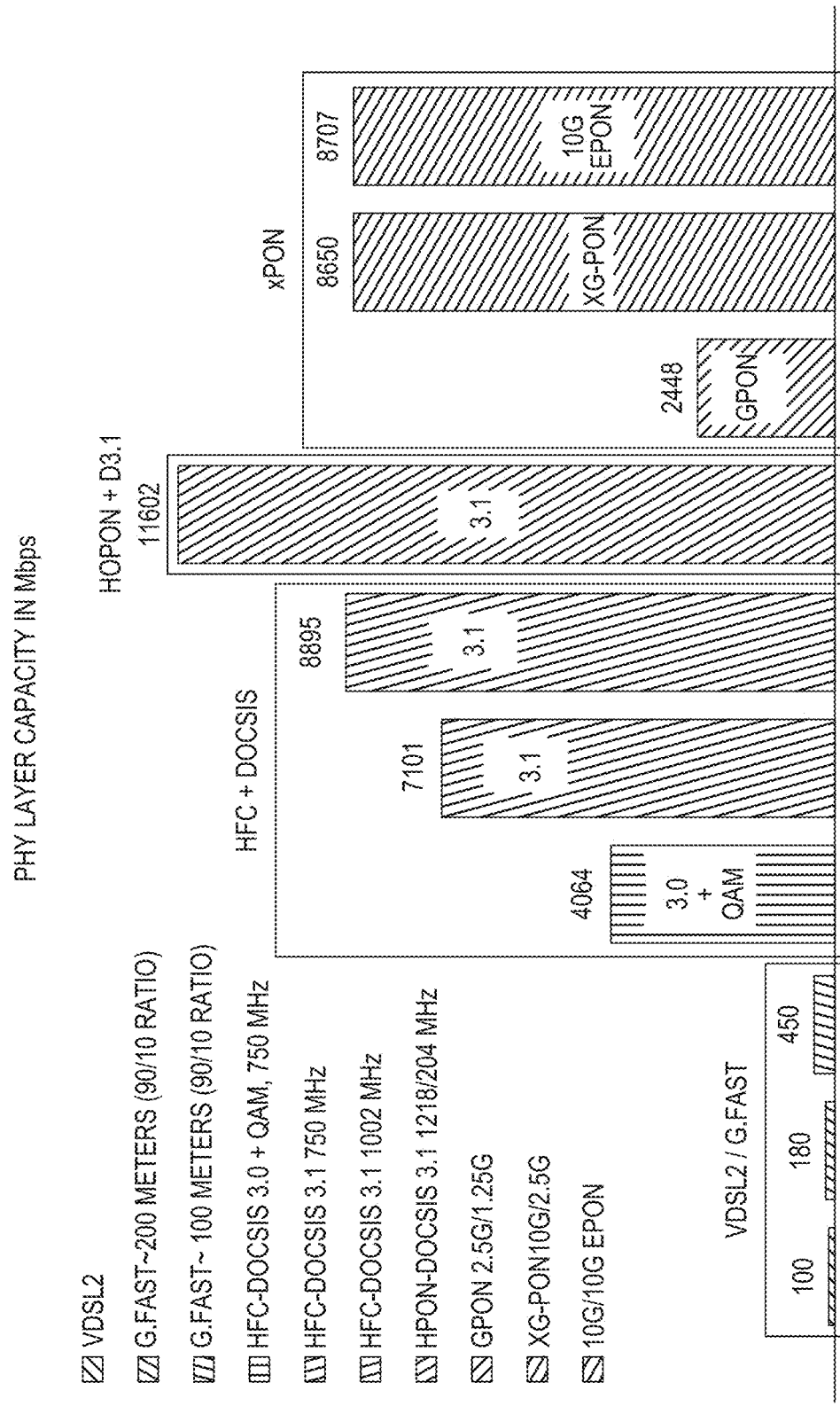
FIG. 10 shows a comparison of downstream capacities for various CATV architectures.

Operators have many different potential network options available to them and their competitors, so it is important to understand how these various technologies stack up against each other. A comparative chart of downstream capacities is shown in FIG. 10. Note that PHY Layer Rates are those after encoding and forward error correction (FEC) if used. Copper based infrastructure has made significant progress over the years and VDSL2 and G.fast are the current state of the art. Some estimates for these copper solutions are also shown in FIG. 10. These copper solutions "only" provide hundreds of Mbps of downstream capacity to the user, not Gbps as in the other solutions.

The traditional PON technologies include GPON, 10G EPON and XG-PON. GPON provides almost 2.5 Gbps DS while 10G EPON and XG-PON provides ~8.7 Gbps of DS capacity. "10G" is a bit of a misnomer as it loses about 13% of capacity to the FEC. NG-PON2 was not included in FIG. 10 as it is a multi-wavelength technology, whereas FIG. 10 shows what can be delivered to a user with a single wavelength.

For DOCSIS on HFC, FIG. 10 shows the capacity for a 750 MHz plant with 3.0+QAM (4 Gbps); 750 MHz with DOCSIS 3.1 (7 Gbps); and 1 GHz plant with DOCSIS 3.1 (8.9 Gbps). Note that a 1 GHz plant with DOCSIS 3.1 is roughly equivalent to a 10G EPON downstream capacity. Finally, DOCSIS 3.1 over HPON provides almost 12 Gbps of capacity in 1,218 MHz, which is 33% more downstream capacity than 10G EPON.

TABLE 3

Mapping D3.1 to PON Equivalents, Downstream Capacities

| Downstream Spectrum | Nominal Data Capacity | PON Equiv |
| --- | --- | --- |
| 30 '3.0' + 96 MHz OFDM | 2 Gbps | GPON, 2 × 1 G EPON |
| 30 '3.0' + 2 × 192 MHz | 5 Gbps | 2 × GPON, ½ 10 G |
| 30 '3.0' + 4 × 192 MHz | 8.7 Gbps | 10 G EPON, XG-PON1, NG-PON2 |
| 12 24 × 192 MHz | ~20.40 Gbps | NG-PON2 (multiple λ) |

Table 3 shows a mapping of downstream capacity for various DOCSIS configurations into traditional PON systems. A DOCSIS system with 30 3.0 channels bonded with 96 MHz 3.1 OFDM channel provides about 2 Gbps, is roughly equivalent to GPON, and is double 1G EPON. A 2×192 MHz OFDM with 3.0 channels now provides almost 5 Gbps, which is twice GPON but slightly more than half of 10G EPON. As the number of OFDM channels grow over time, just as DOCSIS 3.0 channels grew, a 4×192 MHz OFDM bonded with 3.0 channels is equivalent to 10G EPON downstream. Finally, Extended Spectrum DOCSIS 3.1 can achieve up to 40 Gbps DS over a single wavelength. This downstream capacity would be equivalent to NG-PON2 which would require 4 wavelengths for the same capacity.

TABLE 4

Mapping D3.1 to PON Equivalents, Upstream Capacities

| Upstream Spectrum | Nominal Data Capacity | PON Equiv |
| --- | --- | --- |
| 85 MHz OFDMA | 750 Mbps | 1 G/1 G 10 G/1 G EPON, GPON |
| HPON 204 MHz OFDMA | 1.8 Gbps | EPON w. 10 G/1 G co-exist, XG-PON1, NG-PON2 (2.5 G) |
| HPON 500 MHz OFDMA | ~5 Gbps | EPON w/10 G/1 G co-exist |
| HPON 1.2 GHz OFDMA | ~10 Gbps | 10 G/10 G EPON, NG-PON2 |

Table 4 shows upstream capacity mapping. An 85 MHz DOCSIS 3.1 HPON system upstream capacity is roughly equivalent to 1G EPON, 10/1G EPON &GPON with usable capacity in the 700-800 Mbps range. The 204 MHz DOCSIS 3.1 system is roughly equivalent to XG-PON 2.5G US. This specification later shows that this also matches 10/10+10/1 EPON coexistence under certain traffic conditions.

HPON Topology Options

The specification so far has discussed migration from HFC to FTTP. As operators start to consider delivery of multiple Gbps services to every home, a migration to FTTP would require a PON ONU to be in the premise, since copper drop cable technology has limited bandwidth and prevents a FTTC approach with PON. However, because coax is an effective drop cable technology that can support more than 10 Gbps to each home, it is appropriate to consider other fiber deep architectures besides FTTP.

Figure 11:
FIG. 11 shows a Fiber-to-the-Tap architecture.

First, DOCSIS 3.1/HPON could deploy a Fiber to the Curb or Tap (FTTC) architecture, which is depicted in FIG. 11. New deployment technologies are now available that allow fiber strands to be economically inserted into a coax conduit. FIG. 11 shows an FTTC architecture 10 where each HPON ONU at a Tap location 12 drives coax drops to groups 14 of four homes. This approach saves the cost of pulling fiber drops to each home and shares the cost of ONU across multiple homes.

Another DOCSIS 3.1/HPON topology would be Fiber to the Multi-Dwelling Unit (MDU). The ONU could be located in the basement or supply room and leverage existing coax distribution throughout the building. Alternately for a larger MDU, the fiber could be pulled to every floor where a single ONU serves the entire floor via coax.

HPON Topology Migration First Example

Figure 12:
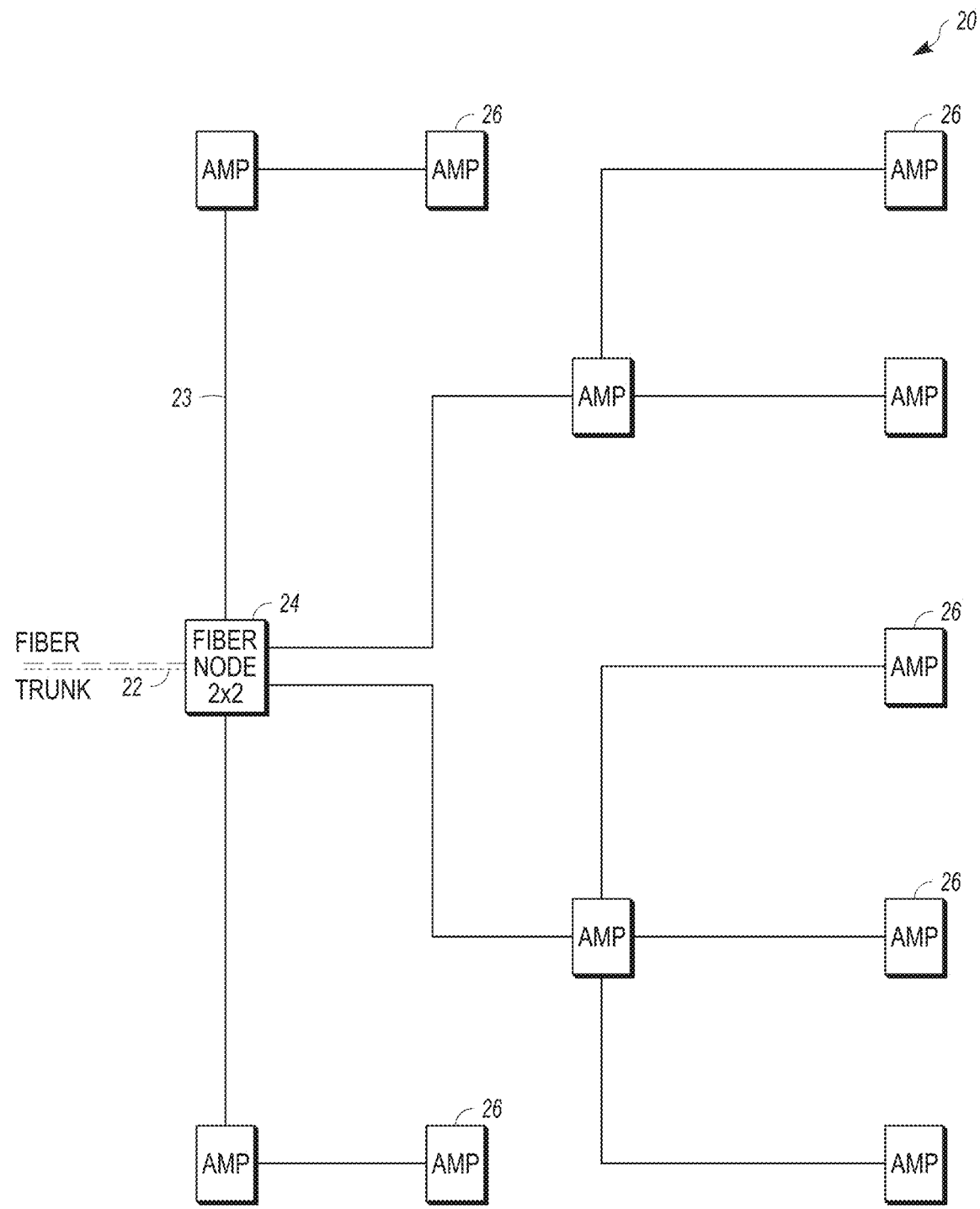
FIGS. 12-15 show respective steps in an exemplary HPON topology migration

An HFC to HPON migration example is provided in FIGS. 12-18 to better understand the various Topology options. FIG. 12 shows the baseline of an existing HFC Plant 20 where a fiber trunk 22 feeds signals to and from a fiber node 24. The fiber node 24, in turn is connected to a tree-and-branch network of amplifiers 26 at customer premises through coaxial cables 23.

Figure 13:
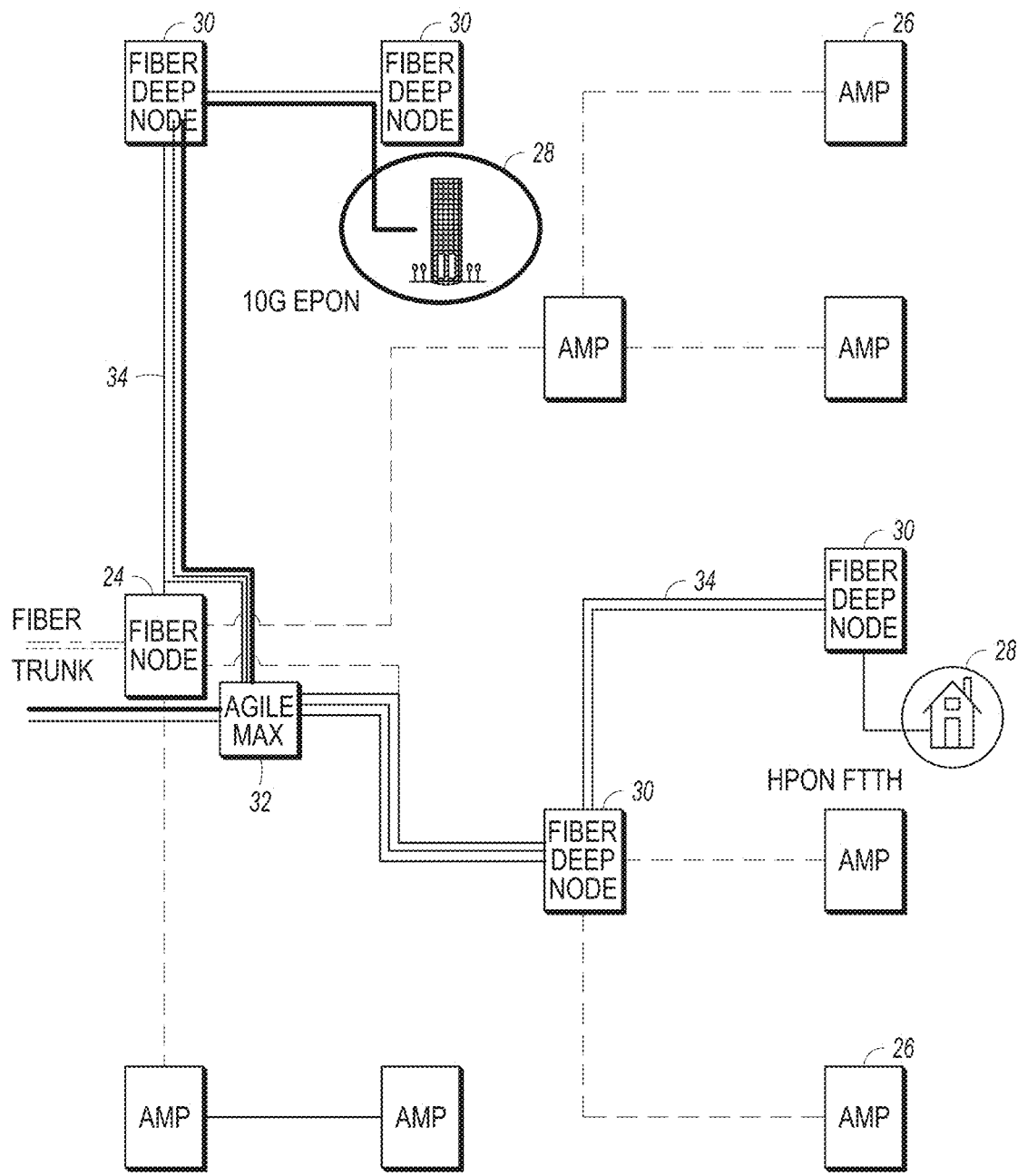

The first step of the migration is shown in FIG. 13 where select customers 28 are migrated to FTTP using an HPON unit 32. This migration can be achieved with either DOCSIS or PON. In FIG. 13, as an example, a business is connected with 10G EPON and a Top Billboard Tier user gets a D3.1/HPON FTTP connection to their home. To perform this migration for selective customers, the coaxial cable lengths to the select customers 28 are replaced with a fiber connection 34 and Fiber-Deep nodes 30, which may be upgraded to 1 GHz/85 MHz. As operators pull fiber to the Top customers, they will most likely pull additional dark fibers as well. This will enable a future fiber deep migration along this path. The remaining customers in the service group may remain connected to the node 24 via the existing amplifiers 26.

HPON provides an additional benefit for Fiber Deep deployments. Traditionally, every Fiber Deep node would need its own set of Head Eend optics and require a separate wavelength on the fiber trunk. By leveraging RFoG optics, the HPON system can act as an aggregator for Fiber Deep nodes, and they can reuse the same optics being used for the D3.1/HPON FTTP home. This makes Fiber Deep more economical.

Figure 14:
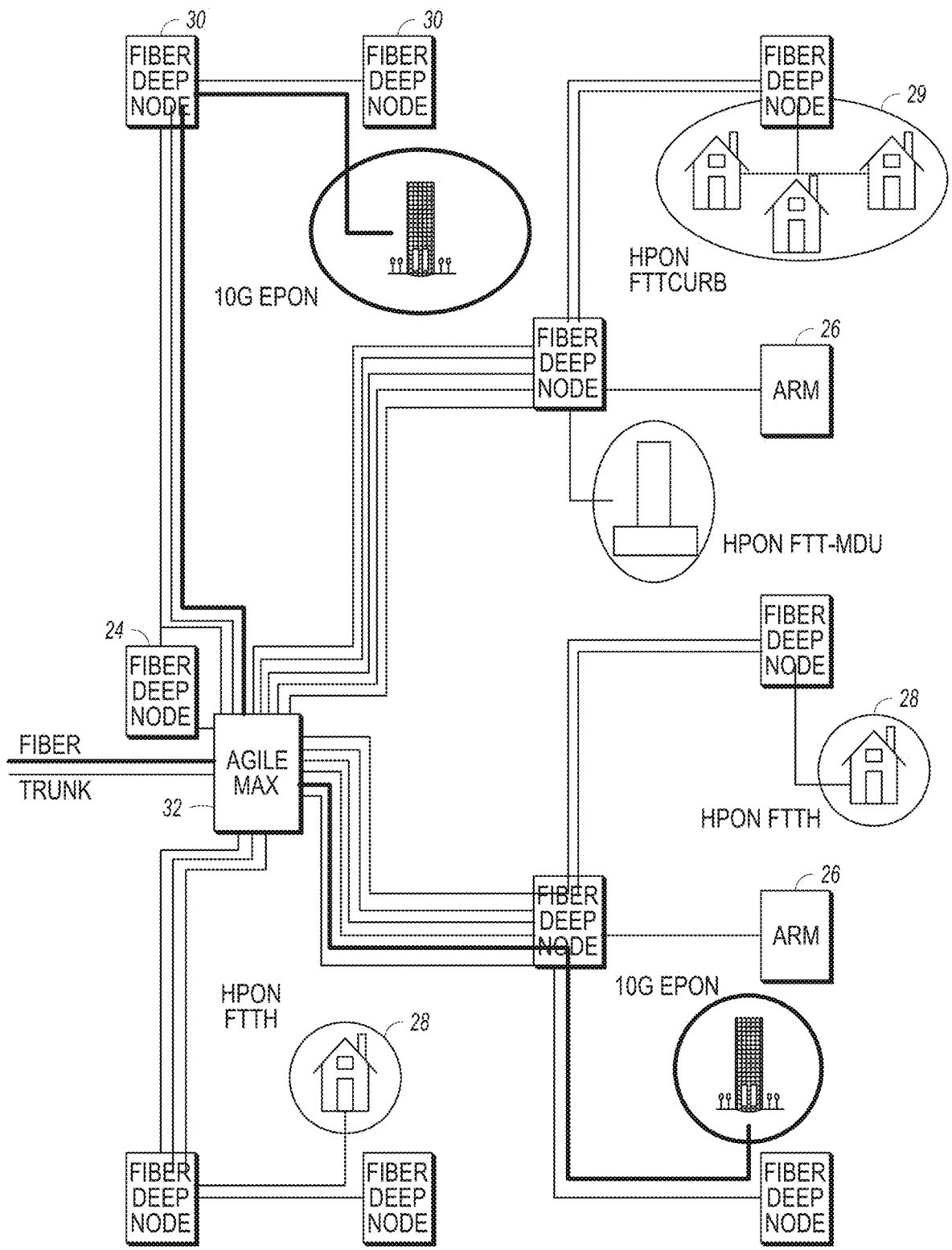

FIG. 14 illustrates the second step in the migration, where more Top customers 28 are migrated to FTTP using HPON. This example shows additional 10G EPON users, along with DOCSIS 3.1 users. FIG. 14 also depicts D3.1/HPON being delivered to an MDU 27 as well as Fiber to the Curb 29 being shared by several homes.

As the Performance Tier is migrated to FTTP (e.g. 5% to 15% of subcribers), then most of HFC plant will be covered by Fiber Deep. In FIG. 14, there are only a couple stray amplifiers 26 left without fiber before the entire HFC can be converted to Fiber Deep. Note that all of the Fiber Deep nodes are still sharing the same single set of RFoG optics.

Figure 15:
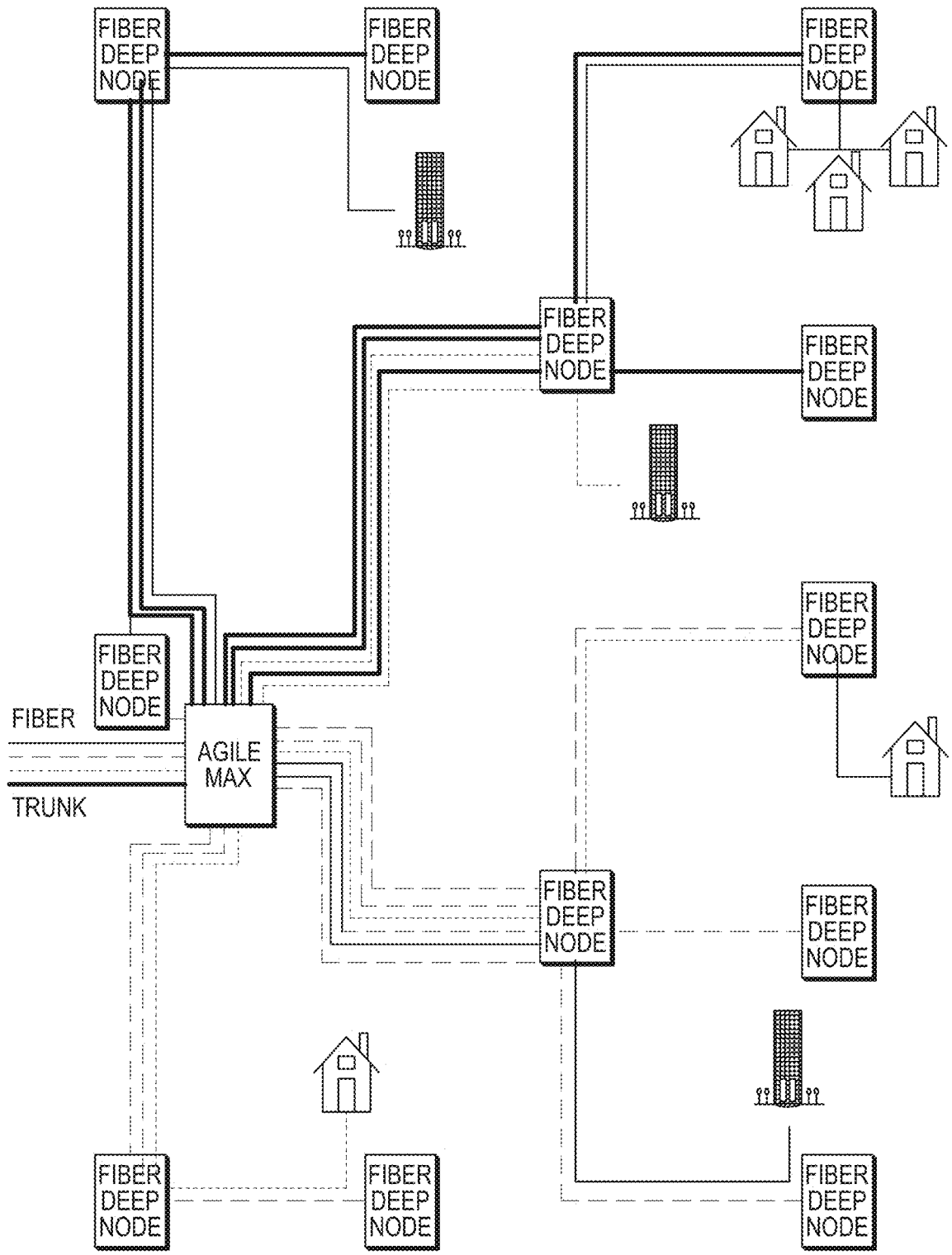
Figure 16:
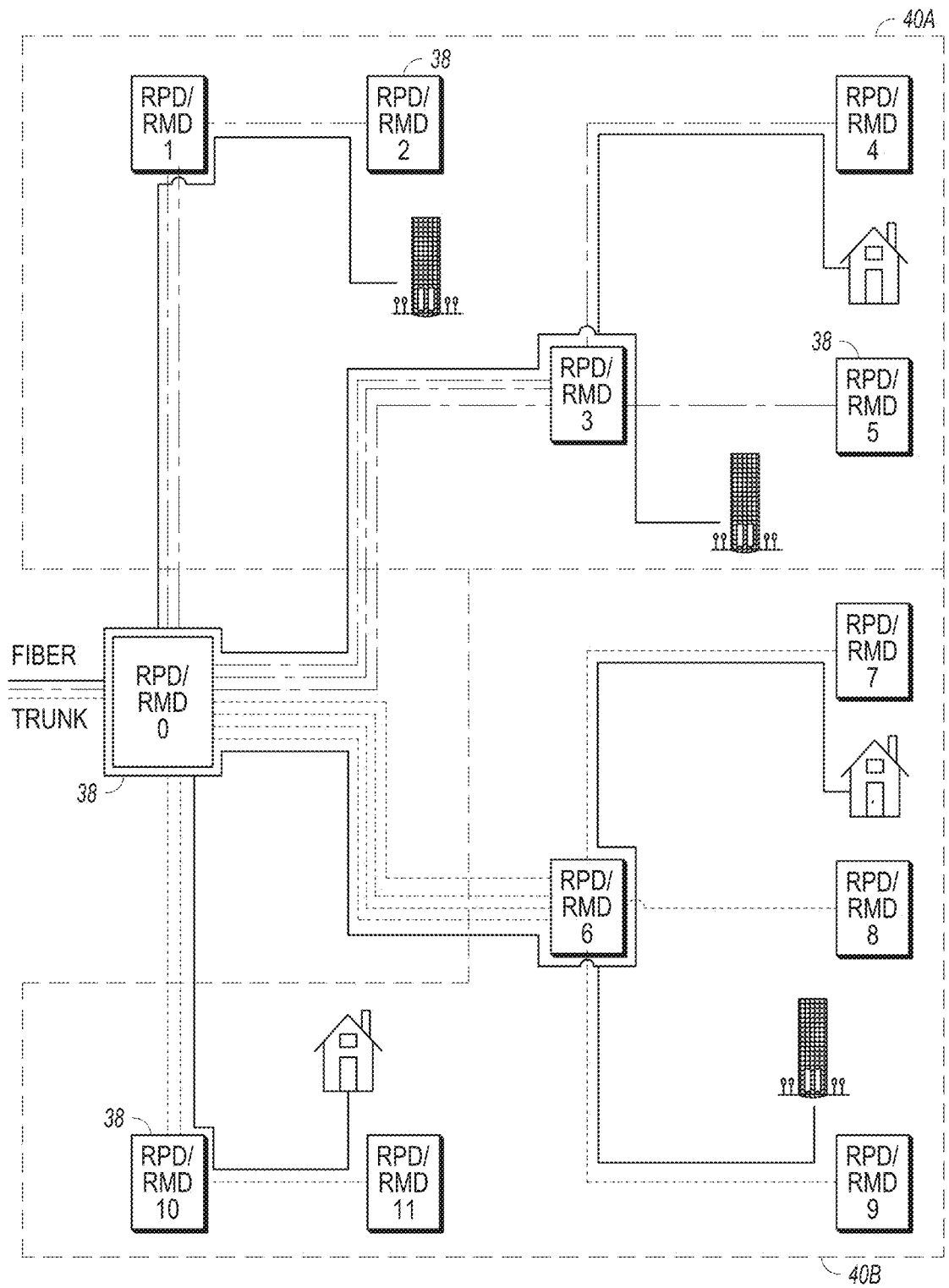
FIGS. 16-18 show respective alternate exemplary HPON topology migration examples.

The third step of the migration shown in FIG. 15. At this point, the Fiber Deep HFC has been completely built out and the Top Tier customers moved to FTTP. Eventually, the static traffic load will increase as in FIG. 6 and the operator will need to split service groups, as needed. At this point, all service group segmentation is localized to the HPON splitter and multiple wavelengths came be sent down for the different SG. In FIG. 15, service group segmentation becomes simple, and is analogous to node segmentations done today.

With this strategy, the operator only needs to deploy as many CCAP ports and Head End optics as is warranted based on subscriber demand, and then grow these over time as demand requires. This is exactly the DOCSIS philosophy.

HPON Topology Migration Further Examples—Remote Devices

The HPON architecture has a primarily passive Outside Plant with its reduced operational expenses while maintaining a traditional centralized Head End architecture. An alternative approach is the Distributed Access Architectures (DAA) where intelligent devices such as Remote PHY, Remote MAC+PHY and/or Remote OLT are pushed out to the nodes in the plant. But HPON and Remote Devices are not mutually exclusive. A key motivation for Remote PHY Devices (RPD) and Remote MACPHY Devices (RMD) is the elimination of long analog AM optic fiber links enabling higher D3.1 capacities. The deployment of RPD/RMD is often considered with Fiber Deep upgrades as well.

Conventional wisdom today places the RPD/RMD at the Fiber Deep Node location. Starting from the baseline example in FIG. 12, the distributed architecture might appear as in FIG. 16. There are now twelve Remote Devices 38 (RPD/RMD 0 to RPD/RMD 11) in the serving area, and each might only be serving ~60 HP or only ~30 subcribers. Based on previous traffic engineering results, Remote Devices will have excess capacity for another decade or two.

Figure 17:
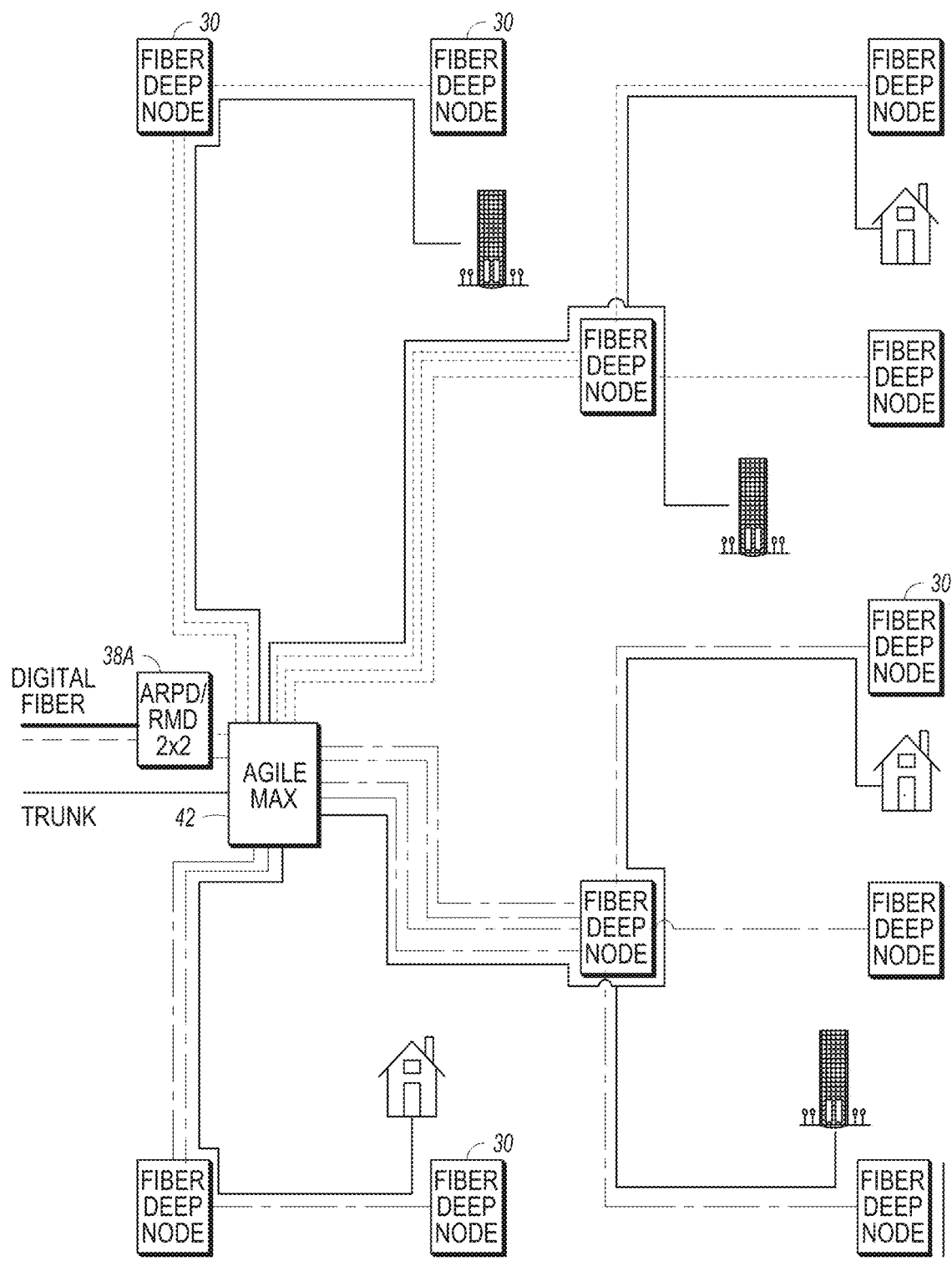

HPON enables an alternate distributed architecture with shared Remote Devices. This is shown in FIG. 17. This figure shows that HPON migration steps 1 and 2 have been completed. Top customers have received FTTP and the Fiber Deep nodes are aggregated using HPON 42.

The difference between FIG. 14 and FIG. 17 is that the previous connection from the HPON splitter to the Head End optics and CCAP over the Fiber Trunk has now been replaced with a connection to a single RPD/RMD remote device 38a that is logically placed near the HPON splitter. The Remote Device must now contain short distance AM optic modules that support distances less than a kilometer. This particular example shows a single 2×2 RPD/RMD that can support 2 service groups 40a and 40b.

The key benefit to the architecture shown in FIG. 17 is that it only requires a single Remote Device compared to a dozen devices required in a typical distributed system shown in FIG. 13. HPON ONU is significantly less complex than RPD/RMD devices which save the operators significant costs and power at every Fiber Deep node location.

Eventually, the time will come where the service size needs to be split. In a shared Remote Device scenario, the additional resources can be added at the same location as the original Remote Device. This device might be upgraded from a 1×1 or 2×2 RPD/RMD to a 4×4 or 6×6 or 8×8 device. Since this upgrade will occur many years in the future, this will be done with much newer technology thanks to Moore's Law and give the operator substantial cost and power savings per SG. This example is shown in FIG. 18.

Figure 18:
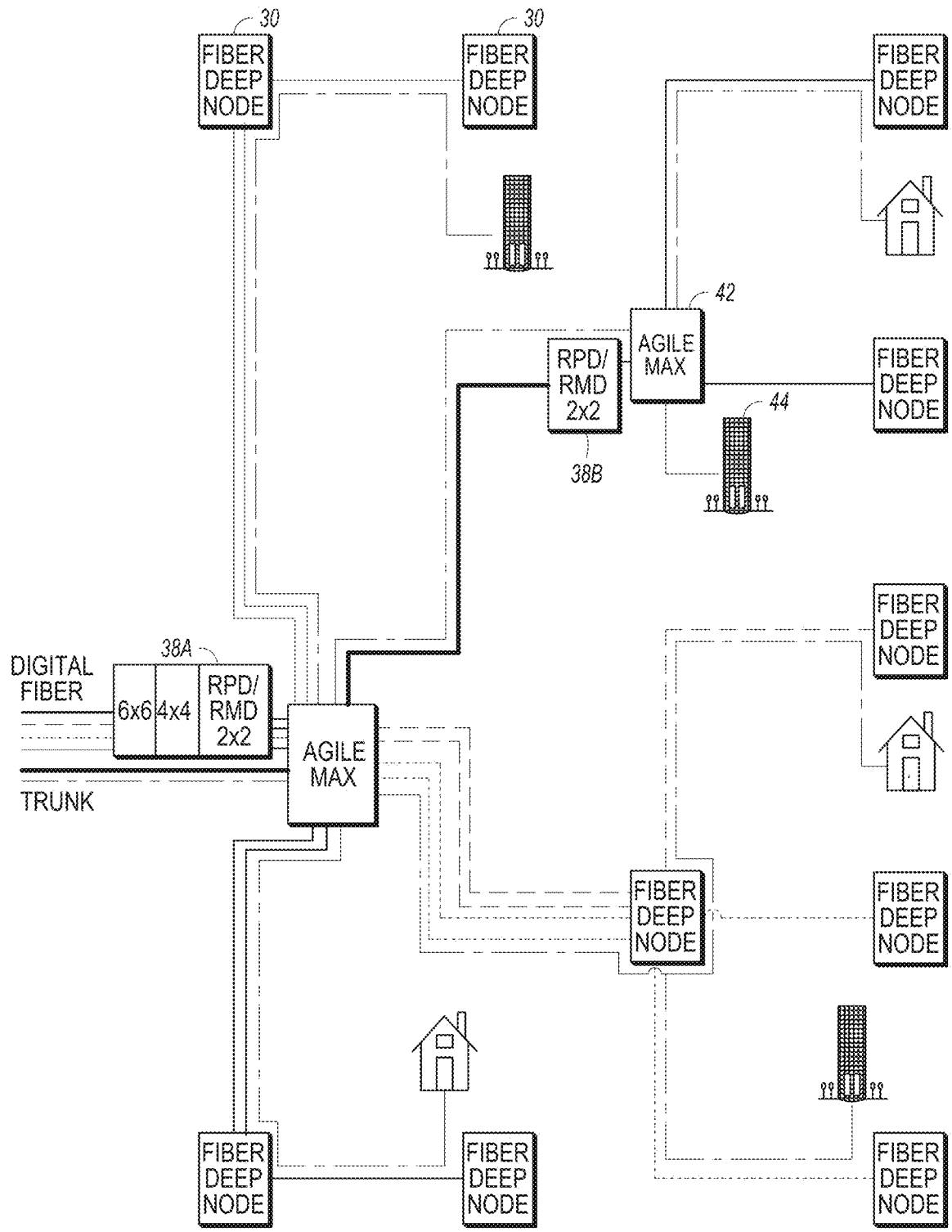

The approach shown in FIGS. 17-18 does not preclude adding other Remote Devices in other locations. For example, may be there is a neighborhood hotspot or an MDU 44 that deserves its own Remote Device. FIG. 18 shows an additional RPD/RMD 38b being added for the MDU 44.

DOCSIS 3.1 and RF Performance Over HPON

Figure 19:
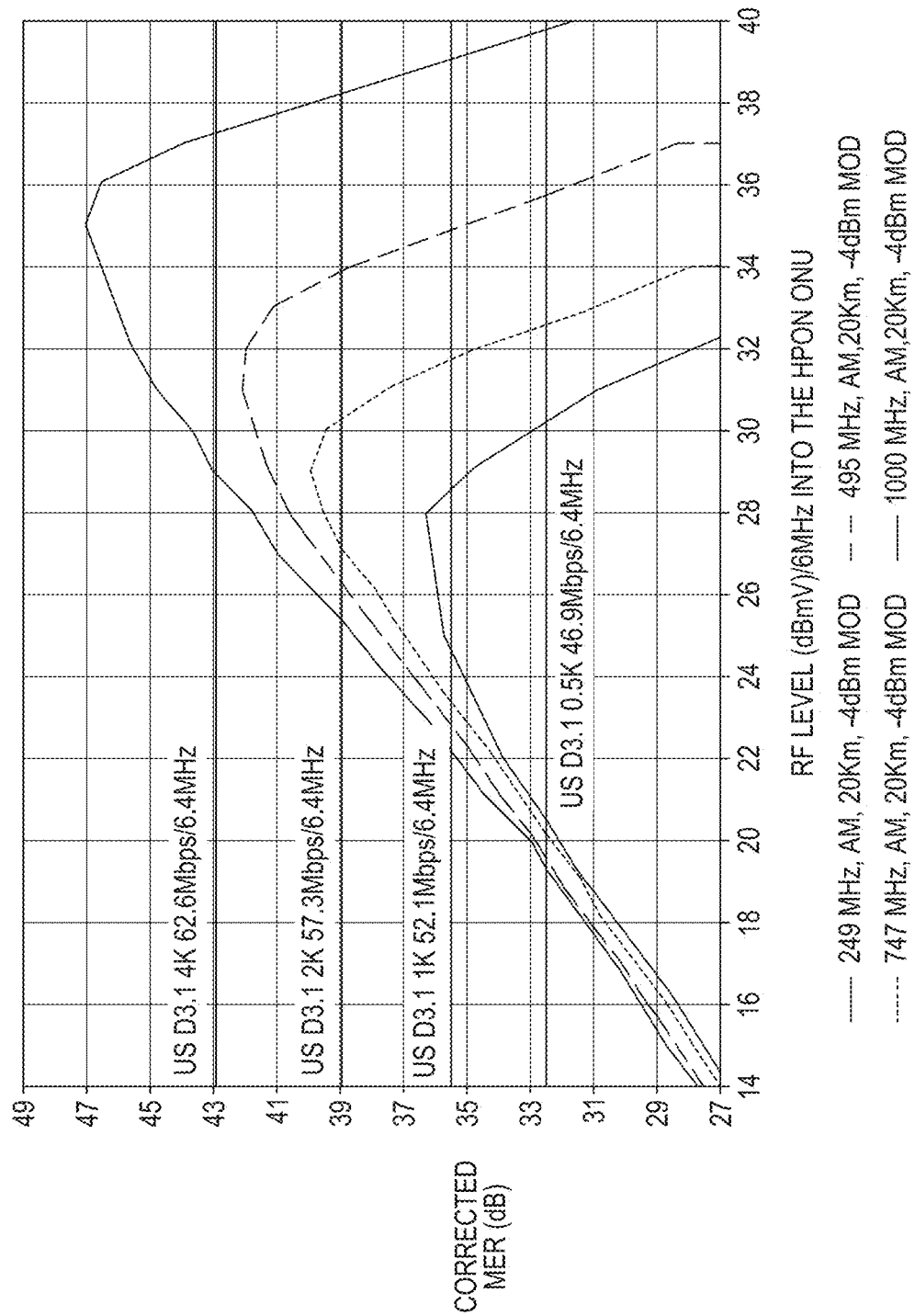
FIG. 19 shows a set of MER curves for various RF spectrum loads on a first generation HPON splitter system.

To verify the potential of DOCSIS 3.1 over HPON, several measurements were taken that analyzed the RF upstream performance. FIG. 19 shows a set of MER curves for various RF spectrum loads on a first generation HPON splitter system over 20 km. For this system, a reverse transmitter was modified to go up to 1.2 GHz in the upstream, which then fed the HPON splitter. When viewed in the context of what SNR is required by DOCSIS 3.1, one can easily see that a 204 MHz spectrum can easily support 4K QAM, with very good SNR for higher frequency spectral load.

Figure 20:
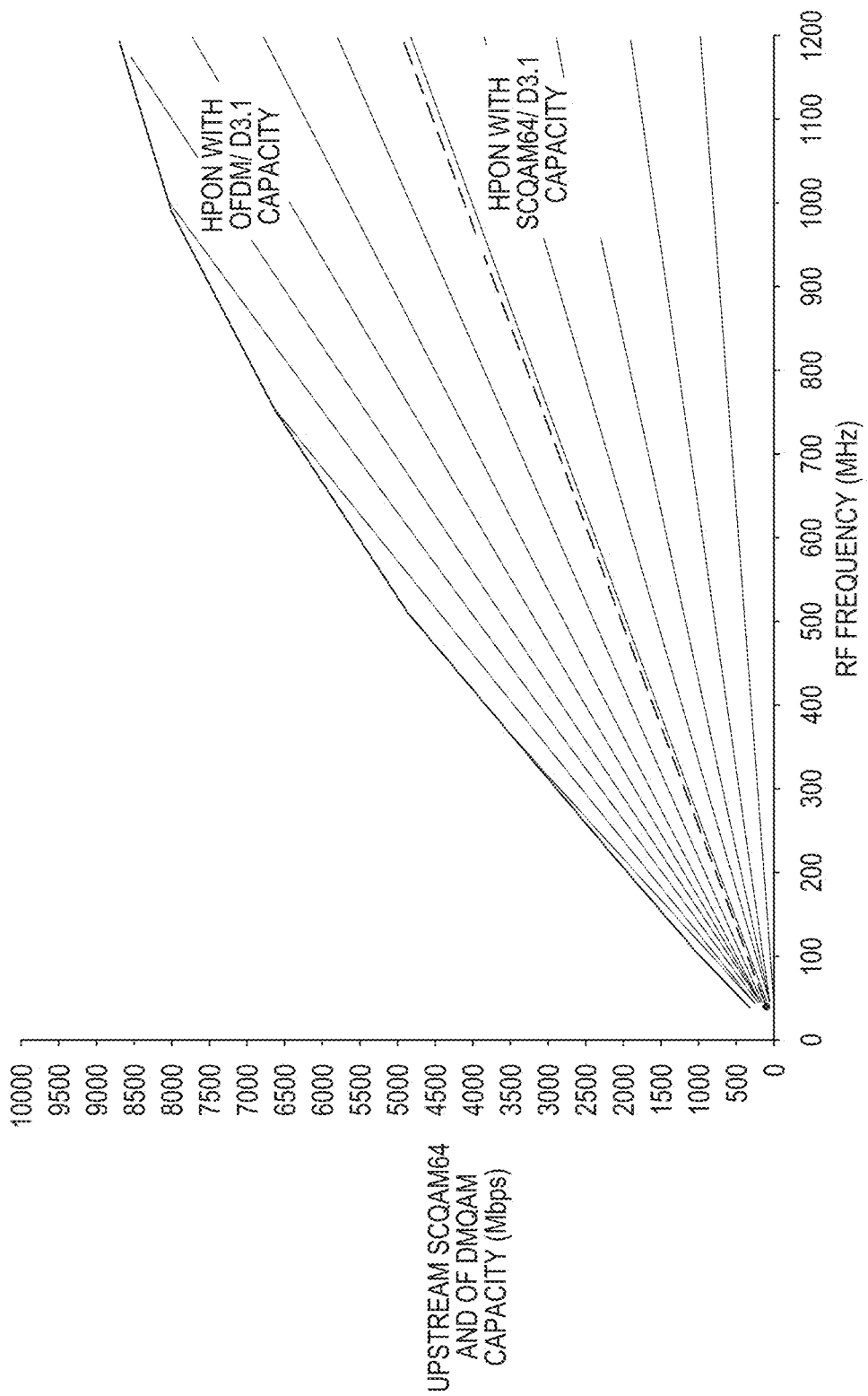
FIG. 20 shows a comparison of HPON upstream capacity between OFDMA and SC-QAM.

When the above SNR graph is converted to the capacity available, as indicated in FIG. 20, the capacity available is a monotonically increasing function of bandwidth, and at the 1.2 GHz upper limit, provides for almost 10 Gbps of upstream data throughput. At a more modest RF bandwidth of 204 MHz, the HPON system provides 2 Gbps of capacity. This is compared to SC-QAM technology @ 64-QAM which is what DOCSIS 3.0 uses today. By way of comparison, current 42 MHz DOCSIS 3.0 4 channel bonded system provide only 100 Mbps of throughput.

Figure 21:
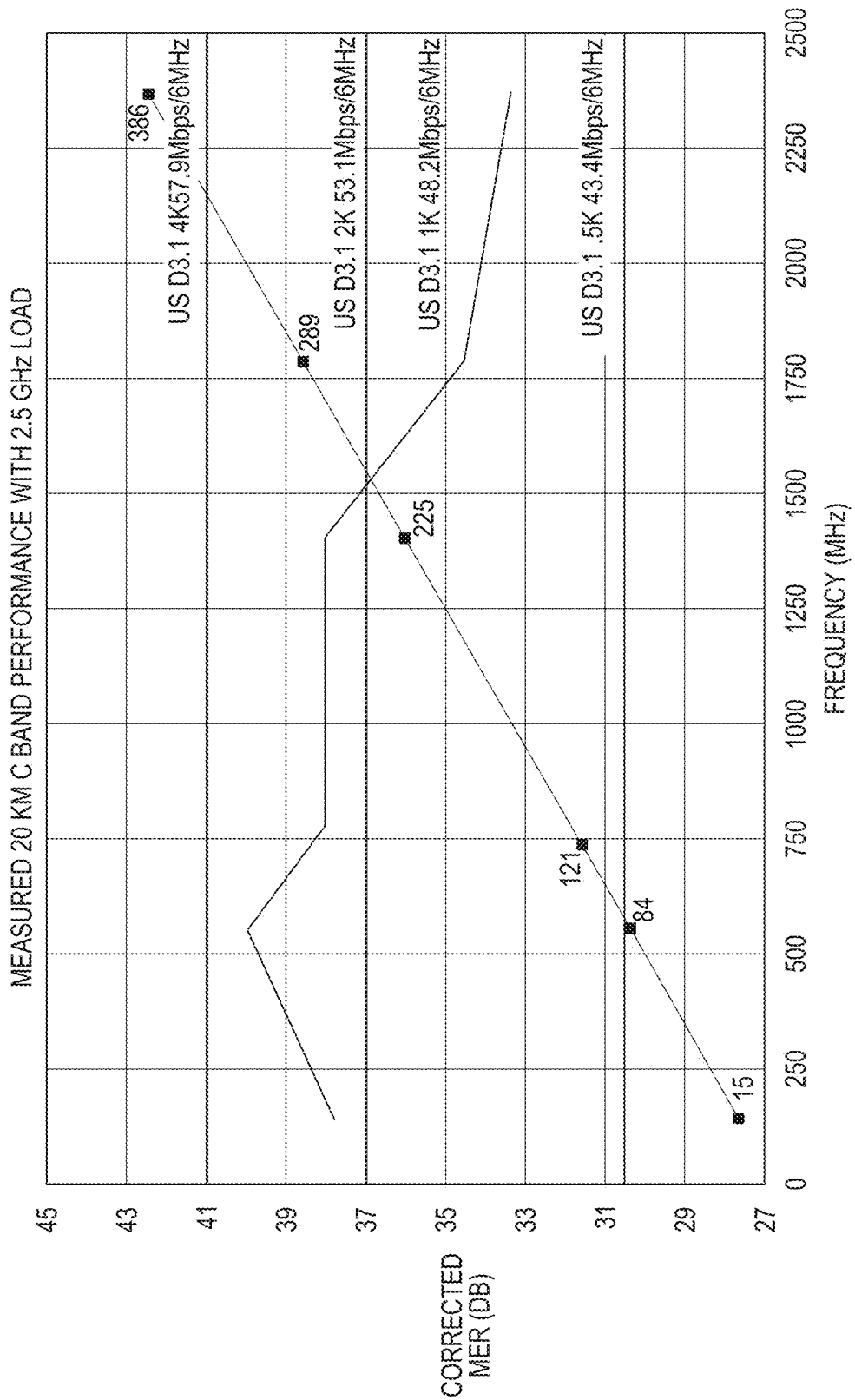
FIG. 21 shows HPON Downstream RF Performance.
Figure 22:
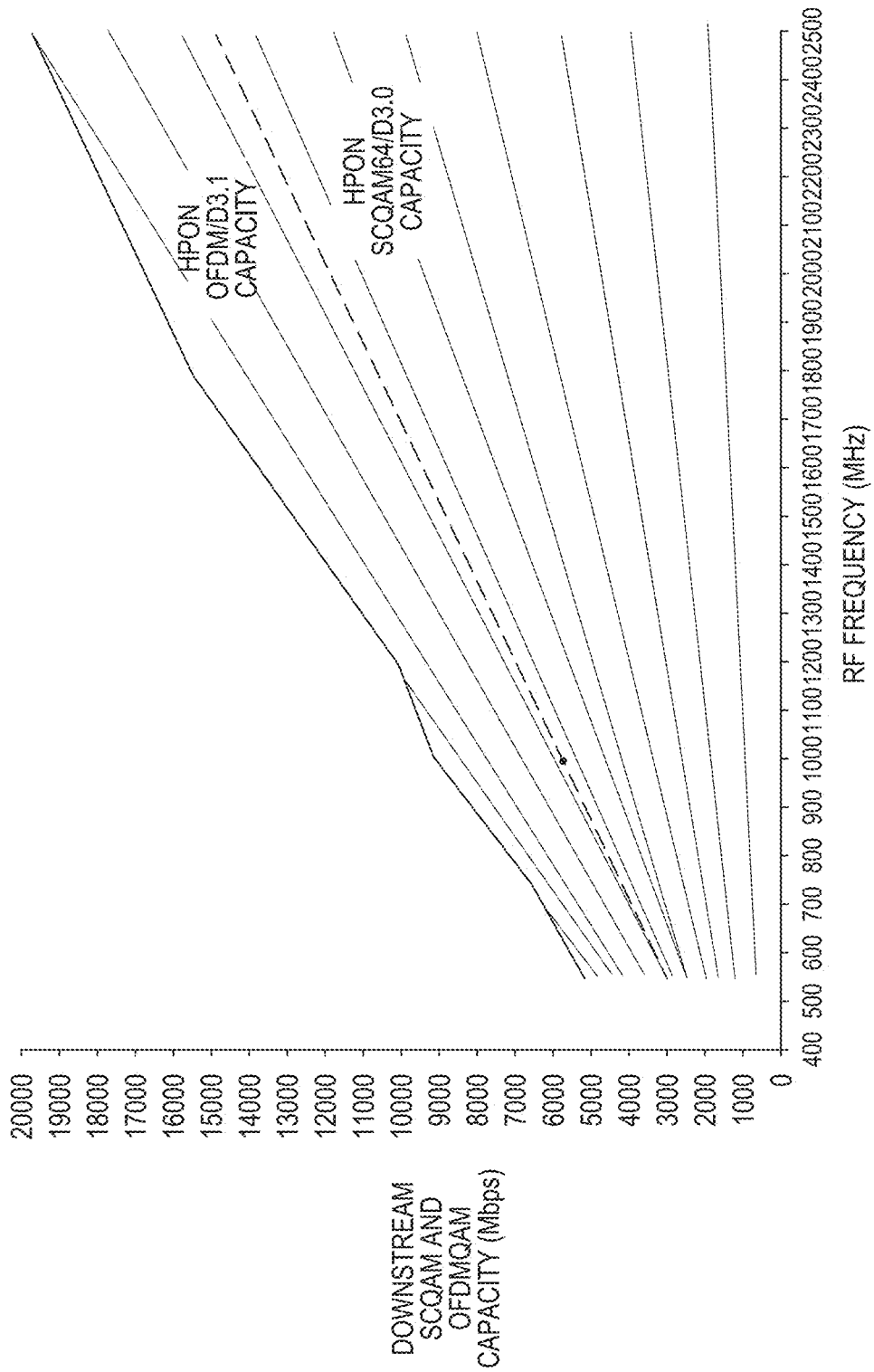
FIG. 22 shows a comparison of HPON downstream capacity between OFDMA and SC-QAM.

FIG. 21 shows HPON downstream performance where a DML transmitter was modified to 2.5 GHz of spectral load. Over 20 km of fiber, the downstream receiver produced a corrected MER that enabled 2K QAM for much of the spectrum and 1K and 0.5K QAM for the remaining portion. When the downstream capacity is now computed for various spectral loading, one can see from FIG. 22 that the HPON capacity can approach 20 Gbps for a 2.5 GHz spectral load. This figure also shows how OFDM capacity compares to SC-QAM channels@ 256-QAM.

By enabling OBI-free DOCSIS 3.1 over HPON, a variety of options becomes available to operators. HPON unleashes DOCSIS 3.1 capabilities to offer PON-like Gbps services in both upstream and downstream. It leverages the DOCSIS infrastructure making it very cost effective for incremental investments for a gradual HFC to FTTP migration. It also makes available new potential HPON topologies such as FTTC, MDU and N+0.

Since DOCSIS supports large service groups, it enables fiber and wavelength conservation in the plant and allows the CCAP port costs to be amortized over a larger number of users. Having significantly fewer CCAP ports also helps with head end space and power considerations.

10G & 1G EPON, GPON on HPON: Residential Scaling Considerations

The foregoing discussion of the benefits of DOCSIS 3.1 over HPON reveals the ability of traditional PON, when used in accordance with the disclosed systems and methods, to handle larger SG, and in particular larger residential SG.

Figure 23:
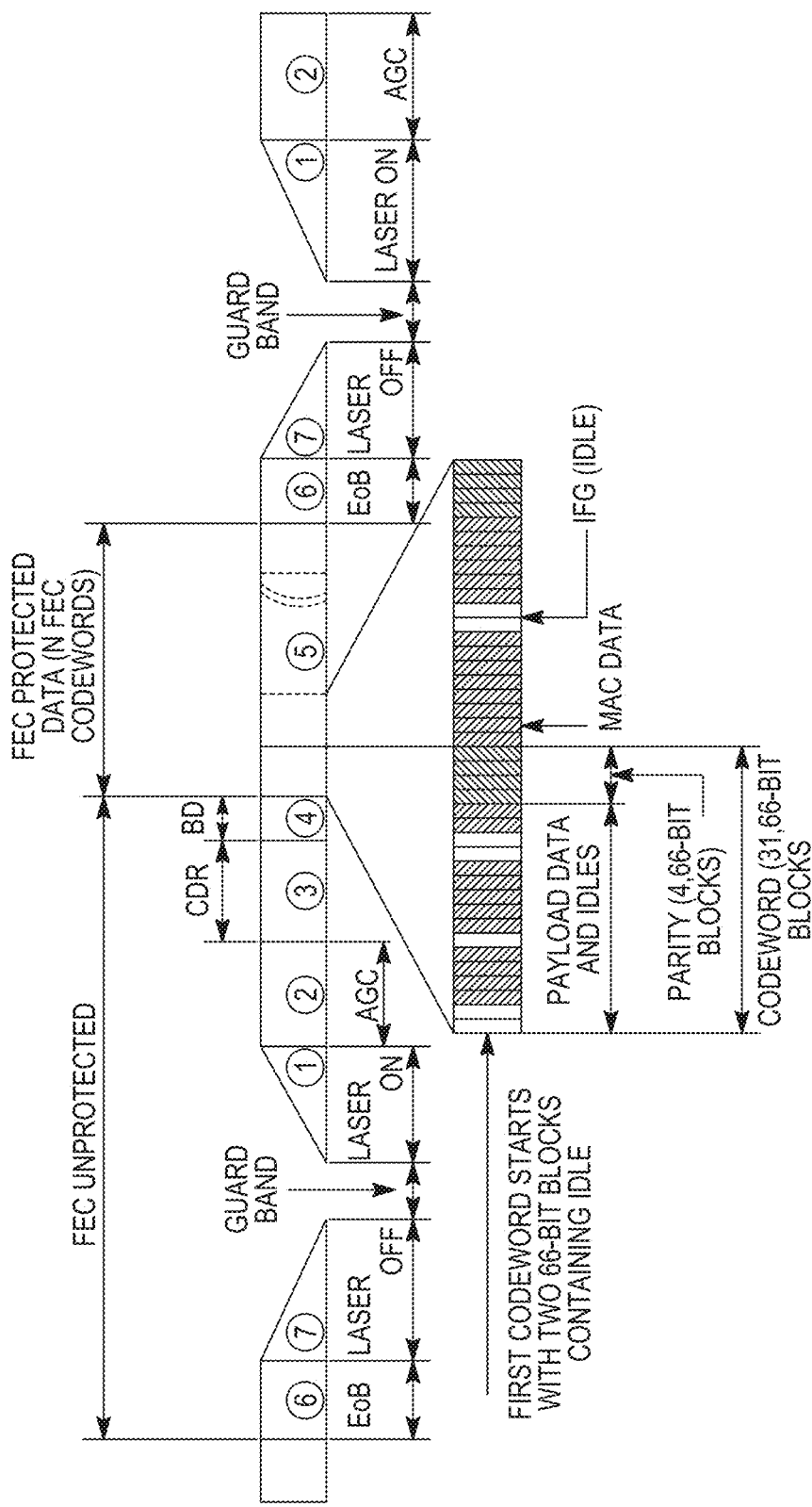
FIG. 23 shows an exemplary EPON burst diagram.

To better understand PON upstream capacity, FIG. 23 shows an exemplary EPON burst schematic 50, which shows the various overheads associated with each upstream transmission burst. Of particular note is the laser turn on and turn off times at the ONU, and the Automatic Gain Control (AGC) and Clock Data Recovery (CDR) times required by the OLT receiver. It turns out that for a 1G EPON upstream, the total burst overhead is in the range of 1.5 to 2.1 microseconds, which corresponds to an overhead of 188 to 264 bytes for every transmit burst.

As EPON evolved to its 10G upstream, the transmitter burst overheads was reduced, but not by a factor of ten. For a 10G upstream, the transmitter overhead may vary from 0.6 to 1.6 microseconds, which corresponds to an overhead of 764 to 2000 bytes for every transmit burst. A survey of industry literature by Glen Kramer, et al, shows how the EPON upstream is impacted by the number of ONU and LLID and Grant Cycle Time. The Grant Cycle Time is the frequency of the OLT polling of each LLID in the ONU. This results in a 64 byte Report message being sent in the upstream direction Tables 5 and 6 show some results for a 10G upstream.

TABLE 5

10 G EPON Upstream Efficiencies

| ONU x LLID | 1 ms | 2 ms | 4 ms |
|---|---|---|---|
| 32 | 85.00% | 86.05% | 86.57% |
| 64 | 82.91% | 85.00% | 86.05% |
| 128 | 78.72% | 82.91% | 85.00% |

TABLE 6

10 G EPON Upstream Capacities

| ONU x LLID | 1 ms | 2 ms | 4 ms |
|---|---|---|---|
| 32 | 8.47 Gbps | 8.59 Gbps | 8.65 Gbps |
| 128 | 7.78 Gbps | 8.24 Gbps | 8.48 Gbps |

As can be seen for the parameters tested, efficiencies varied from ~79% to 87%. It is noted that the FEC accounts for 13% overhead. This means that the TX burst overhead varies from 0.5% to 9% based on these input parameters. This shows that EPON TX Burst overhead is very sensitive to ONU, LLID and Grant Cycle Time.

Extending 10G EPON Capacity Analysis

Considering the previous discussion of the disclosed Selective Subscriber Shedding method, an operator might only need a service group size of 250 subscribers for the next five to seven years. A large service group size would minimize the number of OLT ports and fiber trunks required. However, each ONU might also have four to eight LLID associated with it. This implies that the product of ONUx LLID might go up to 1024.

The present inventors recreated and simulated the Kramer analysis over a wider range of parameters. The results are shown in FIG. 24. It shows a set of curves with different Cycle Times that fall off rapidly with increasing ONUx LLID. For example, 512 LLID (e.g. 64 ONU with 8 LLID each) with a 1 msec Cycle Time (needed for voice, gaming & MEF applications) has capacity of only ~5 Gbps.

Given this sensitivity to transmitter burst overhead, a closer evaluation of the parameters was made to determine a reasonable set for further testing. While an ONU might support 8-16 LLID, many will not be active and not require any polling. Based on DOCSIS experience, the present inventors determined that 4-5 active LLID per ONU would be reasonable.

The DBA scheduler in EPON also has the capability to poll each LLID at different intervals. Our analysis assumes that one LLID is needed for low latency applications with a 1 msec Cycle time, while another 4 LLID might have an average cycle time 4 msec. Since EPON allows multiple Reports per transmitter burst, our model assumes that there would be on average one transmitter burst per millisecond with an average of two Reports per transmitter burst.

1G EPON, 10G EPON and GPON Efficiency

Figure 25:
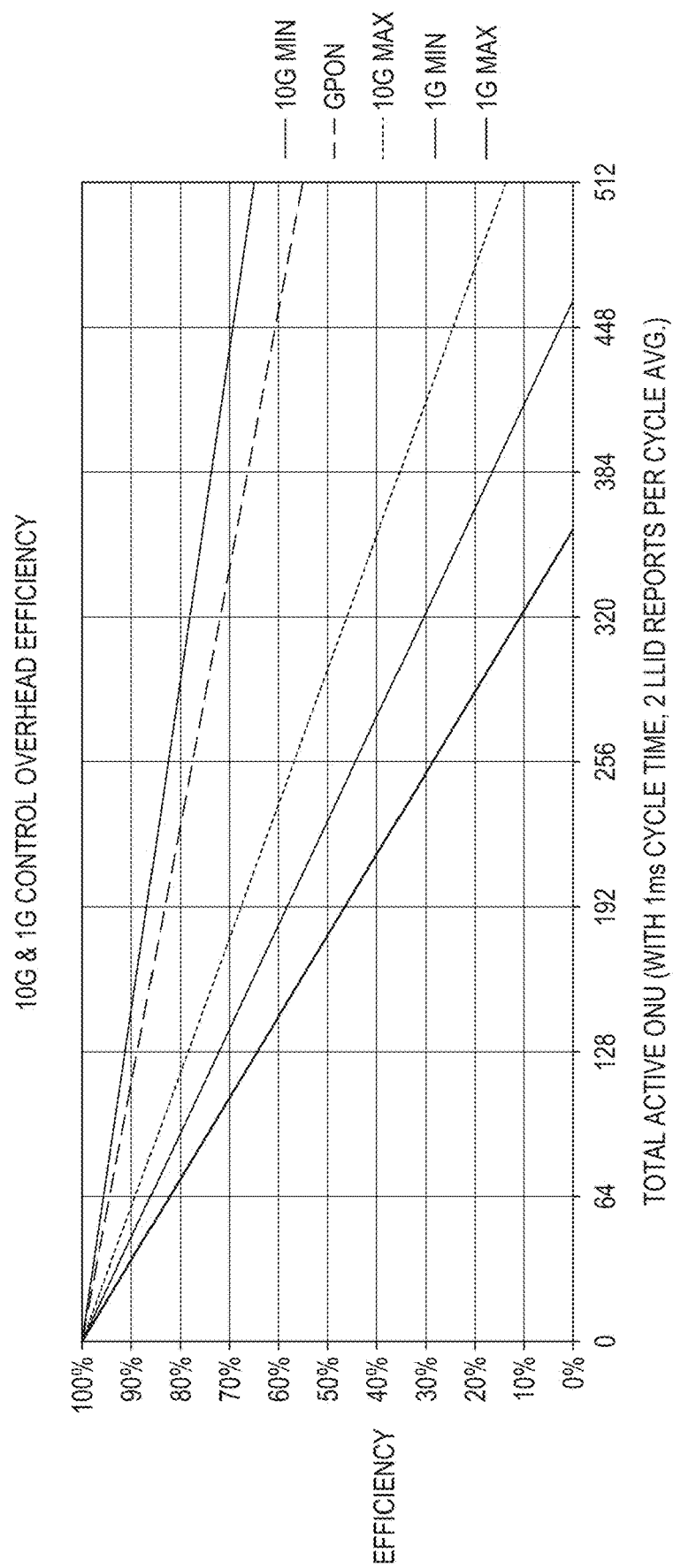
FIG. 25 shows the control overhead efficiency for 10/1 and 10/10 EPON.

10G EPON has a 10 Gbps downstream PHY rate, but supports two different upstream PHY rates: 1 Gbps and 10 Gbps. These are often referred to as 10/1 and 10/10 EPON. The control overhead efficiency is calculated and shown in FIG. 25. The control overhead efficiency is basically the percentage of time available to transmit after the polling overhead. It excludes the FEC overhead for the 10G upstream. The efficiency is calculated for both 1G and 10G upstream, and for the min and max transmitter burst overhead. As can be seen from FIG. 25, 1G upstream loses 28% to 36% capacity for 128 ONU while 10G upstream loss is in the 9-23% range for 128 ONU.

The chart also shows the efficiency for the GPON upstream. GPON is a synchronous system with only a 2 byte status report that is sampled every 125 microseconds. GPON efficiency is close to the 10G best case.

EPON: 1G and 10G Coexistence, Control Overhead Impact on Efficiency

10G EPON supports the feature of simultaneously allowing 10/10 and 10/1 ONU to share the same OLT port. This is very desirable from an operator's perspective as they can deploy lower cost 10/1 ONU in asymmetric applications like residential while more expensive 10/10 ONU are deployed to symmetric applications like business services. Other operators may decide to deploy cheaper 10/1 ONU today and then in the future deploy 10/10 ONU once they are more cost effective.

However, coexistence can have significant impact on upstream efficiency and capacity. Since the 10/10 and 10/1 share the same OLT port, only one can be transmitting at a given time. This is analogous to the 802.11 scenario where 11b and 11g WiFi devices coexisted in the same spectrum. The slower 11b devices took so much transmit time it left little capacity for 11g devices. 10G EPON concerns are potentially worse, as the difference in speeds is now a factor of ten.

There are two key factors when analyzing the 10/10 and 10/1 coexistence scaling. First, the control overhead is a function of the ONU mix. The efficiency becomes a blend dependent on the ratio of 10/10 ONU and 10/1 ONU. The second key factor is the traffic mix between 10/10 and 10/1 ONU. It is assumed that 10/10 ONU will provide a higher upstream traffic load than 10/1 ONU.

With these factors in mind, three different scenarios were considered:

Scenario 1: 50% of ONU are 10/10, 50% 10/1; Traffic Mix is 90% 10/10, 10% 10/1
Scenario 2: 25% of ONU are 10/10, 75% 10/1; Traffic Mix is 75% 10/10, 25% 10/1
Scenario 3: 10% of ONU are 10/10, 90% 10/1; Traffic Mix is 50/50

Figure 26:
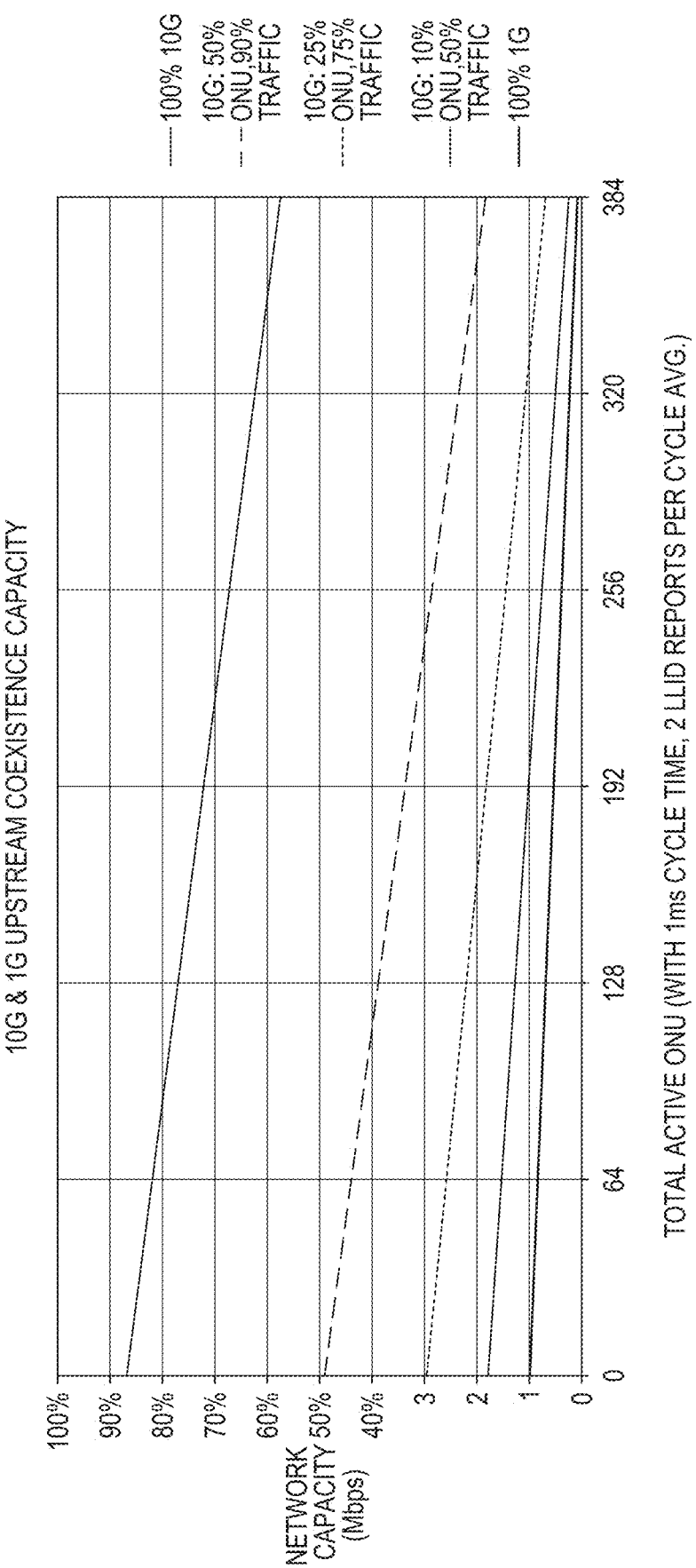
FIGS. 26-28 shows the results for different scenarios of upstream coexistence capacity.

FIG. 26 shows the results. For Scenario 1, network capacity is cut in half compared to 10G-only upstream, even though 90% of the traffic is coming from a 10/10 ONU. For Scenario 2, network capacity is only one third compared to 10G-only upstream. Finally in Scenario 3 where 50% of the traffic is coming from a 10/10 ONU, network capacity is less than 2 Gbps, marginally better than 1G-only upstream.

10/10 & 10/1 Coexistence compared to GPON and D3.1/HPON

Figure 27:
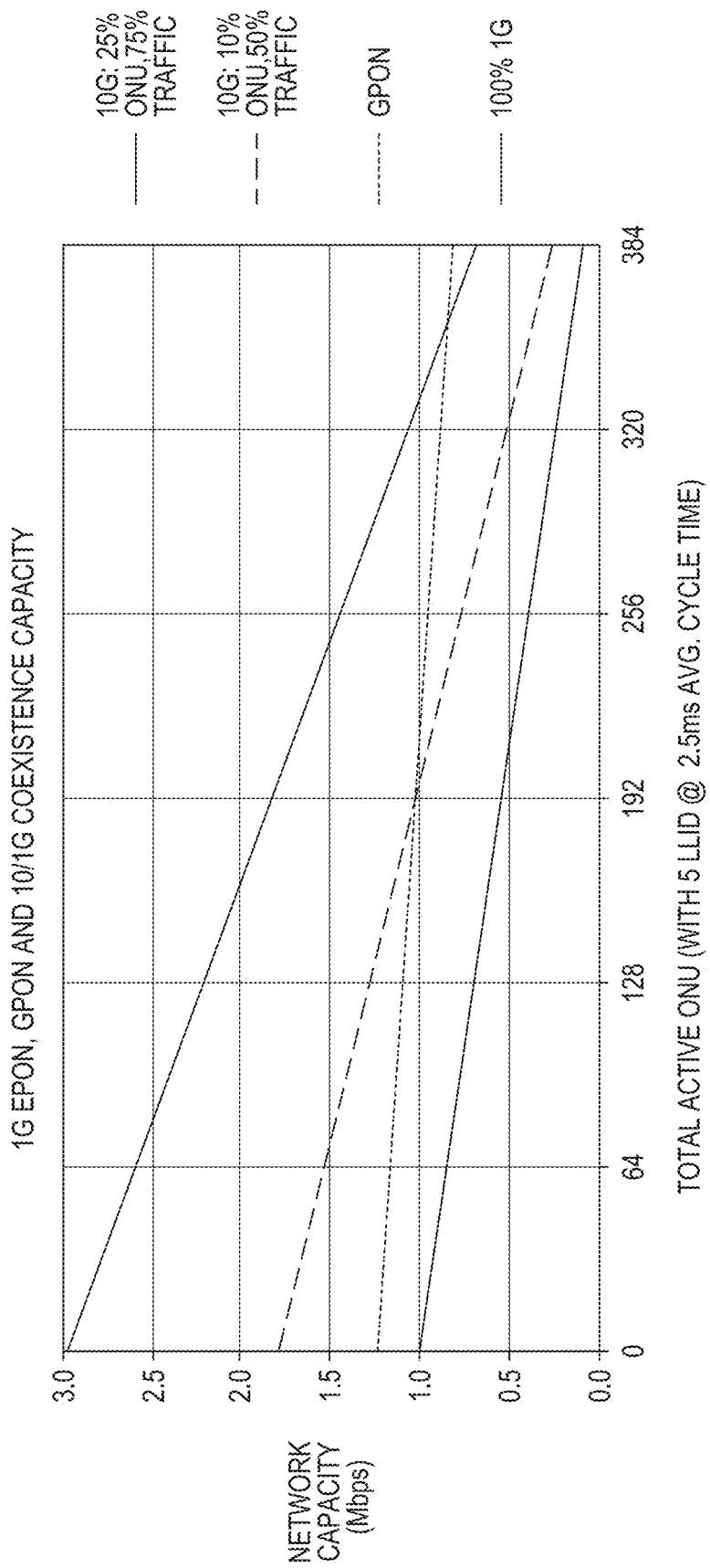

With such significant degradation in capacity caused by 10/10 & 10/1 coexistence, it is useful to see how these scenarios fared when compared to GPON and to D3.1 over HPON. FIG. 27 adds GPON to the ONU Mix shown in FIG. 26 and compares the results with Scenarios 2 and 3 of FIG. 26, as well as 1G EPON US. As can be seen, GPON handles larger ONU count better than EPON. GPON capacity is competitive with these mixed 10/10 & 10/1 scenarios for large ONU counts.

Figure 28:
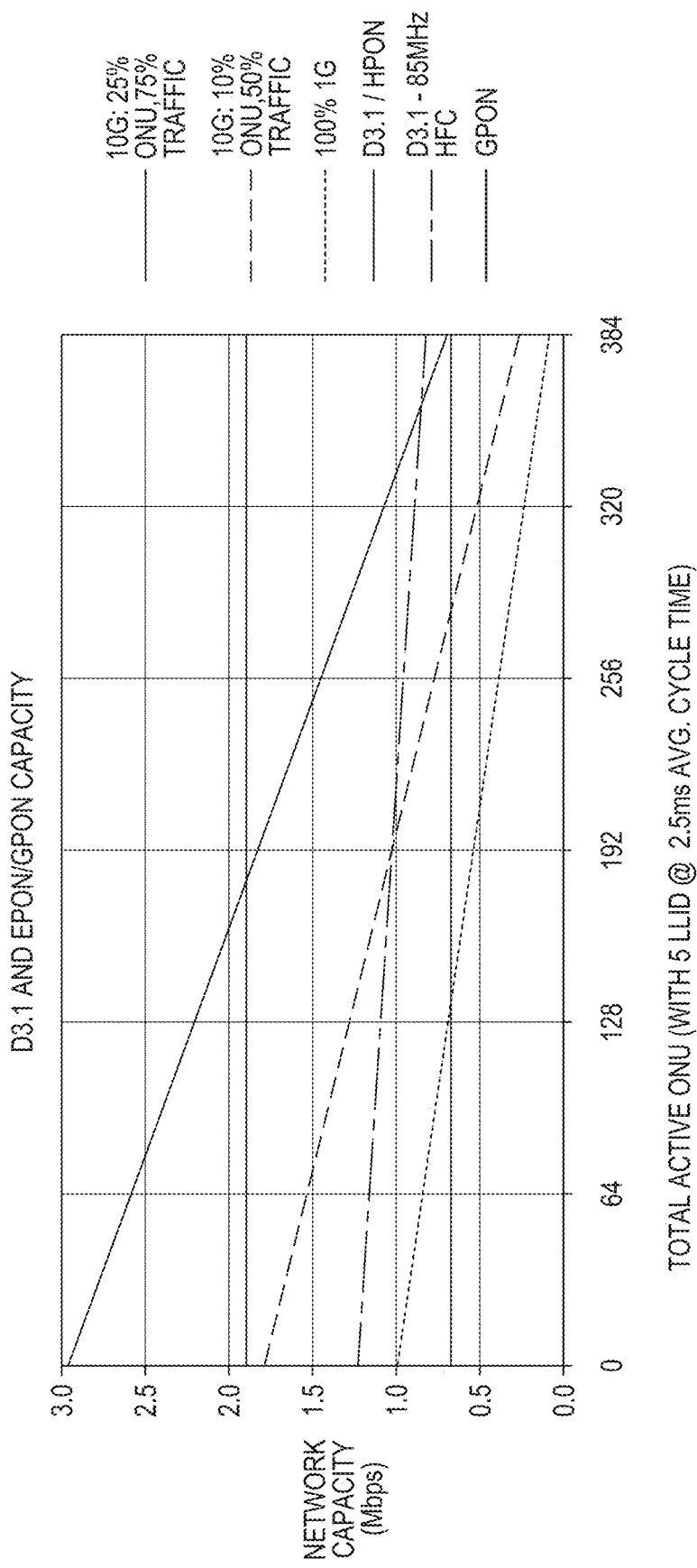

FIG. 28, adds DOCSIS 3.1 upstream capacity to the ONU mix for both 85 MHz HFC and 204 MHz HPON networks. As can be seen from this figure, the DOCSIS 3.1 Network Capacity is relatively independent of ONU count. DOCSIS 3.1/HPON outperforms 10G EPON Scenario 3 with 50% 10G upstream Traffic. D3.1/HPON is comparable to Scenario 2 of FIF. 26 (75% 10G US Traffic) for many ONUs. DOCSIS 3.1 on 85 MHz HFC is comparable to 1G upstream, especially for larger ONU counts.

Residential Applications Present Traffic Engineering Challenges

As previously seen, 10G EPON has significant TX burst overheads, up to 764 to 2,000 bytes. This means that the average transmitter burst needs to be sufficiently large to minimize the effect of this overhead. However, this may be problematic in a residential environment.

With respect to residential traffic usage, packet size distribution is roughly 30% small packets (e.g. 64B), and 70% large packets (e.g. 1,500B). There are a relatively small percentage of heavy users that account for majority of upstream traffic. Recent Sandvine data shows BitTorrent file sharing as the leading upstream application; with the remaining top applications related to real-time entertainment (e.g. Netflix, YouTube). Sandvine data also shows that traffic asymmetry actually increases during peak busy hours.

From these observations, several conclusions can be extrapolated. First. File sharing applications will be bursts of large packets from a limited number of users, with a good probability of bursts of large packets together. Second, real-time entertainment drives many small packets (e.g. IP Acks) from many users with little chance of bursts of more than a couple small packets together. Since video is driving the bandwidth growth engine, this traffic mix is not likely to change anytime soon.

Figure 29:
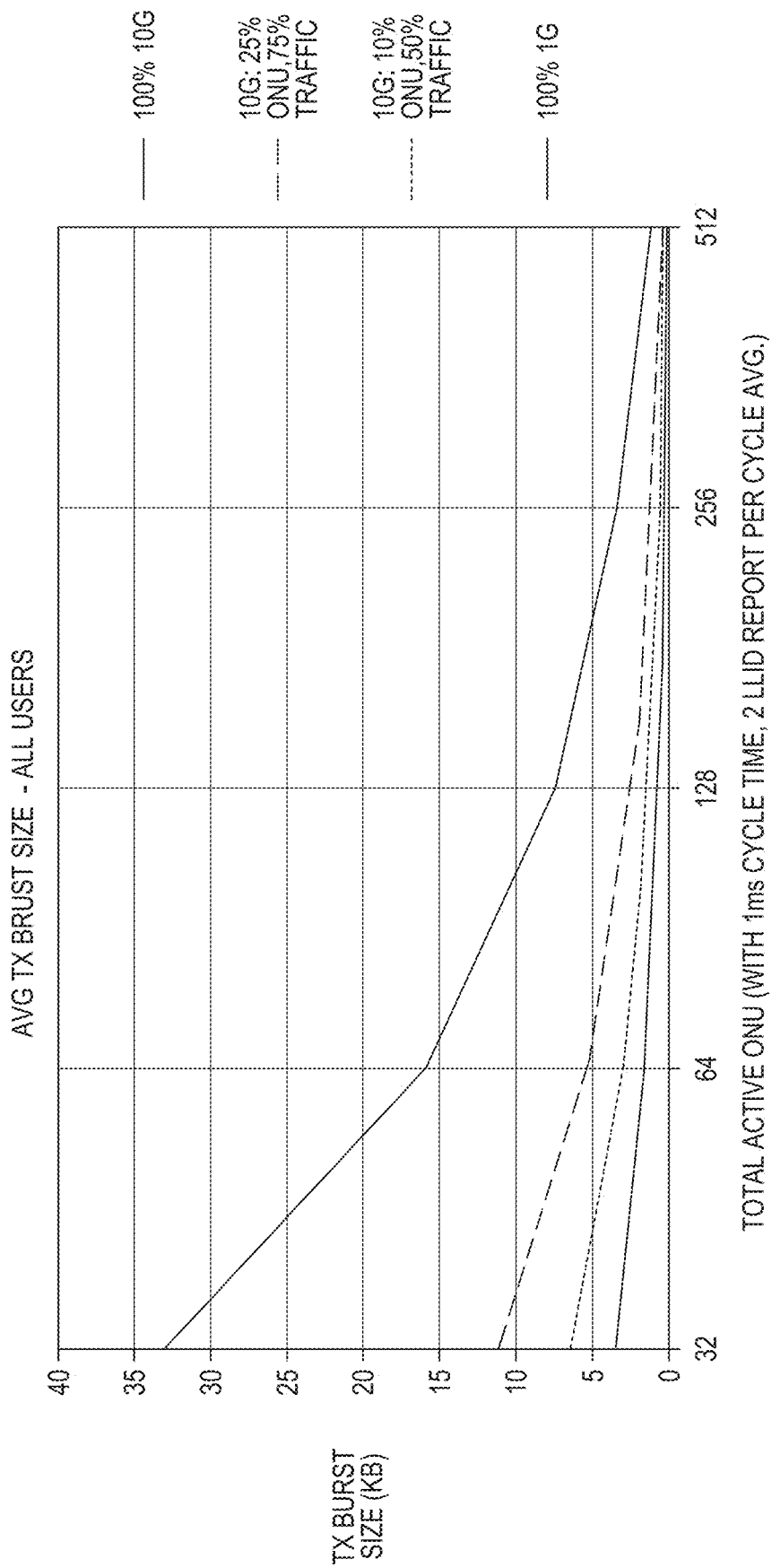
FIG. 29 shows an example average transmitter burst size required for upstream traffic load.
Figure 30:
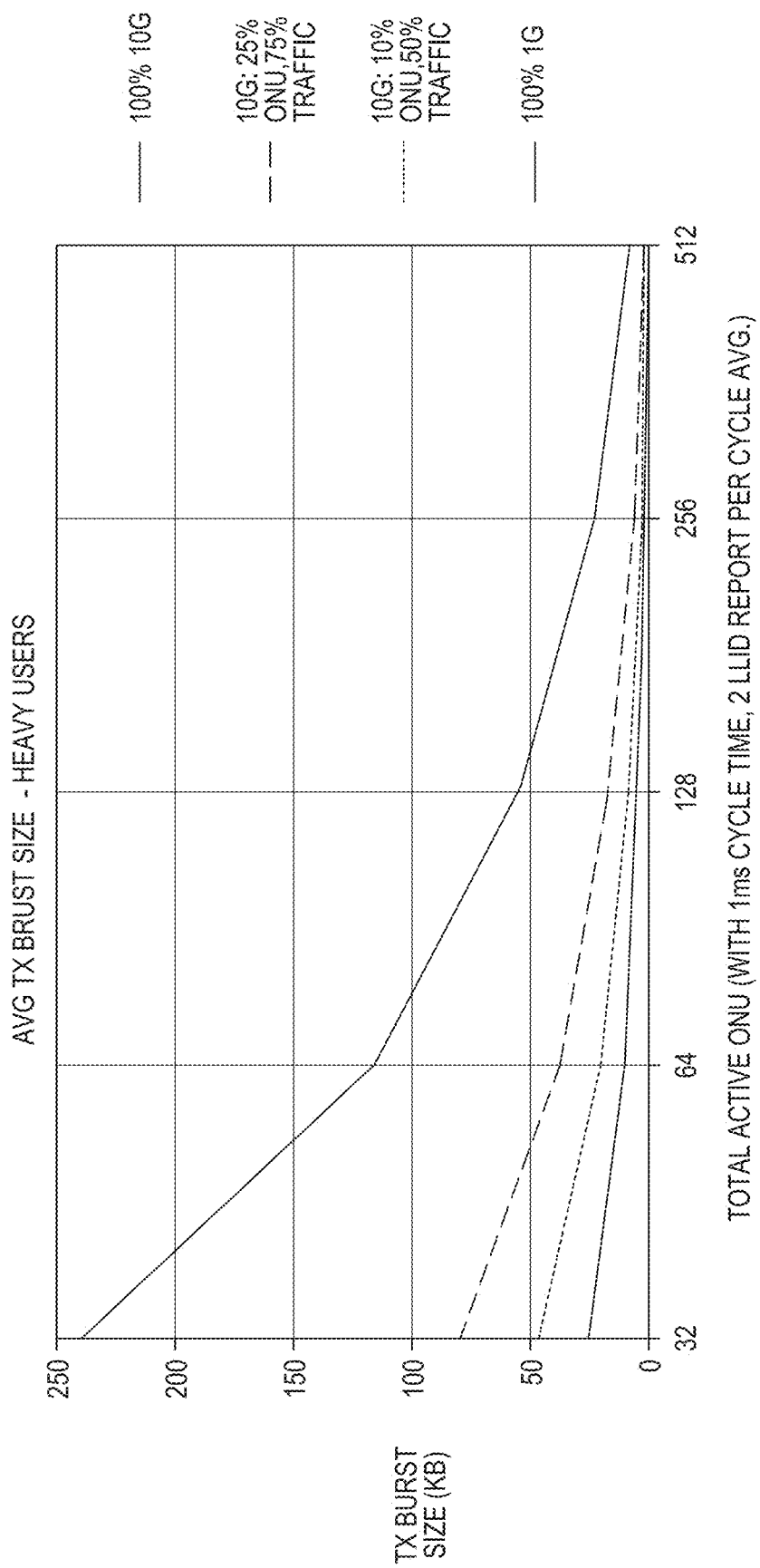
FIG. 30 shows an example average transmitter burst size for heavy users.

FIG. 29 shows the average transmitter burst size required for 100% utilization for upstream traffic load spread evenly across all ONUs. Looking at 64 ONU with 100% 10G upstream, each ONU needs a 16 KB average transmitter burst size each millisecond from every ONU to maintain 100% utilization. FIG. 30 shows the average transmitter burst size for heavy users required for 100% utilization with a packet distribution based on the extrapolations above. It turns out that with 64 total ONU (100% 10G), of which 8 are heavy users, the heavy users need to have a 117 KB average burst size every millisecond to maintain 100% utilization of the 10G upstream.

These results show that 10G EPON will need extremely large transmitter burst sizes in order to maintain its utilization, which becomes significantly worse when a packet distribution from a residential use case is factored in.

The role of FTTP and Hybrid PON—Other Considerations

Figure 31:
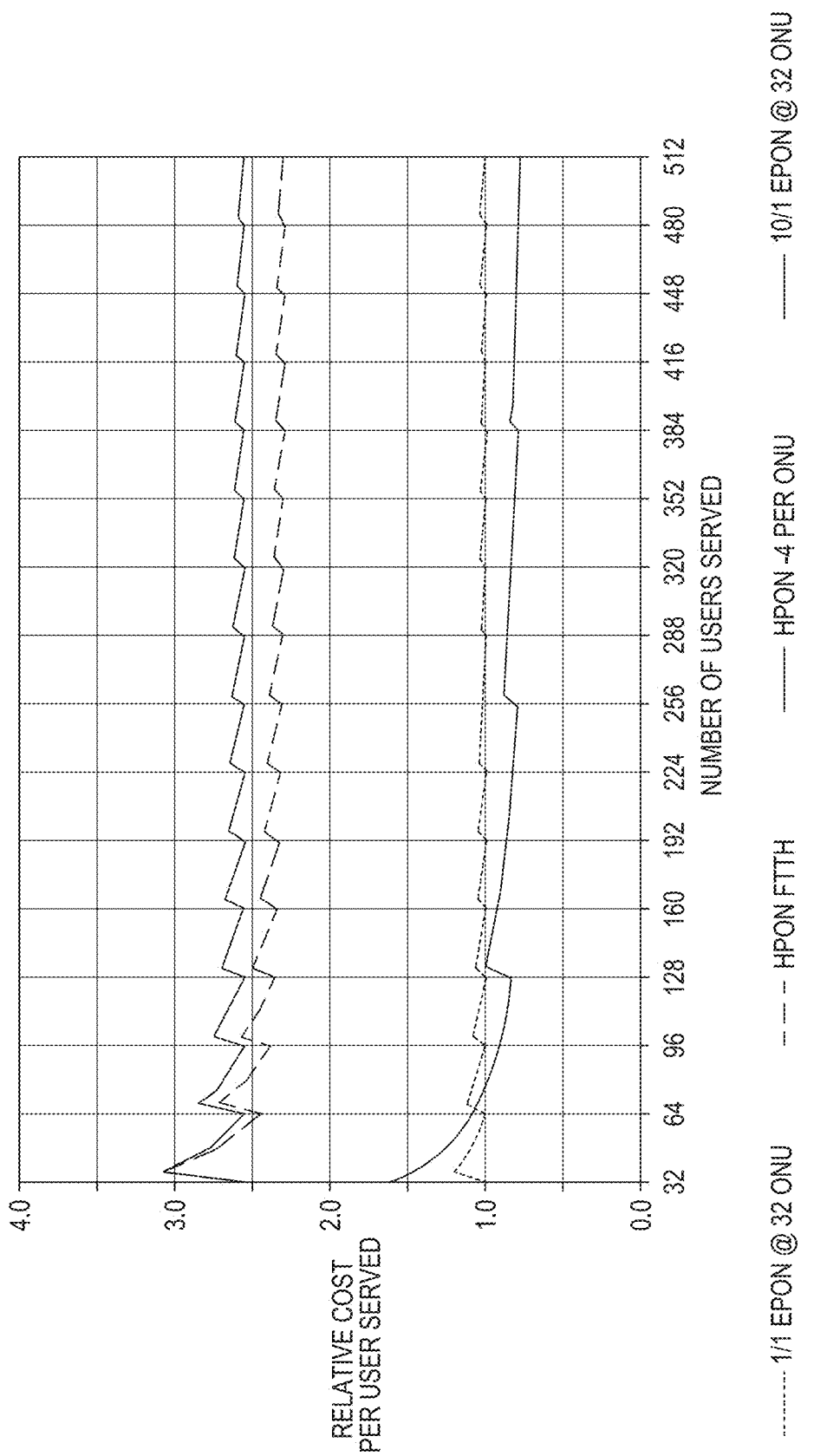
FIG. 31 shows an economic analysis of HPON.

Much of the preceding discussion in the present disclosure has focused on the capacity of an HPON system. It is also important to consider the economics of HPON. The present inventors completer an analysis that included total system costs including fiber deployment, ONU, and CCAP/OLT along with associated optics. The 1G EPON case was used as a baseline for a relative system cost comparison. The results are shown in FIG. 31.

The top two curves compare 10/1 EPON costs to a D3.1/HPON FTTP costs. Both are assumed to have 1 user per ONU. Both are about 2½ times the baseline cost of 1G EPON. The DOCSIS 3.1/HPON costs are slightly less than 10/1 EPON as it can reuse existing HFC CCAP ports.

The bottom two curves show 1G EPON compared to D3.1/HPON FTTC costs with 4 user per ONU, and are very close to each other cost-wise. The HPON FTTC approach generates significant savings by eliminating the need for a fiber drop to the end user and by sharing the cost of the ONU across four users. With HPON FTTC, an operator ends up with 10/1 EPON capacity at a cost of 1G EPON. This also highlights the HPON FTTC savings when compared to HPON or 10/1 EPON FTTP costs.

Fiber Trunks, Wavelengths and OLT/CCAP Ports

For the HFC to FTTP migration, most operators will plan to reuse their existing fiber resources as much as possible and focus investment on pushing the fiber deeper towards the home. Many operators have limited fiber between their head ends and hubs to their serving areas, so both fiber count and wavelengths are critical resources. There are also head end space and power considerations based on the number of OLT/CCAP ports required.

Figure 32:
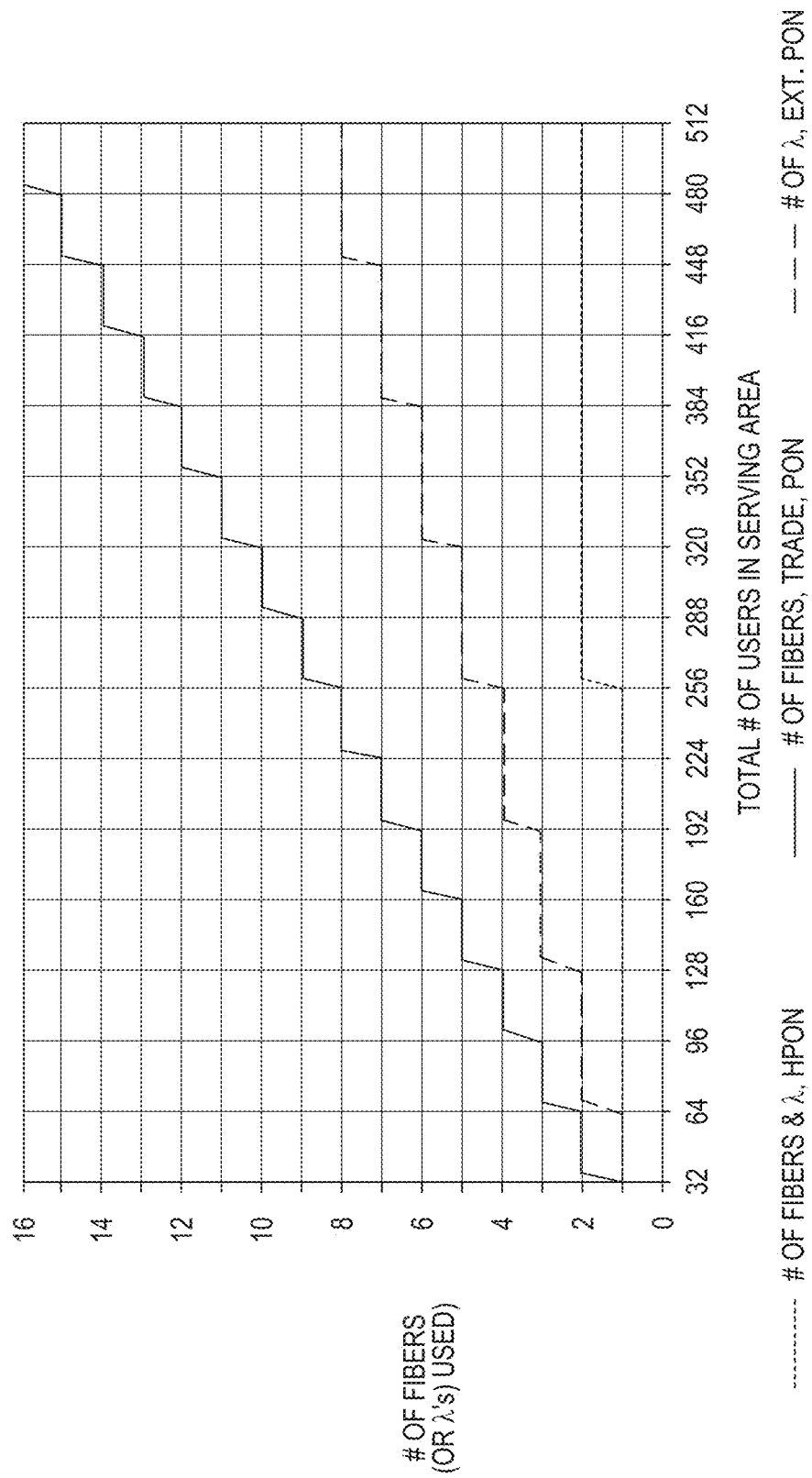
FIG. 32 shows a chart of the number of fiber trunks needed to serve specified numbers of users in a service area.

FIG. 32 plots the number of fiber trunks and/or wavelengths required doe specified numbers of users, which also corresponds to the number of OLT/CCAP ports that are needed. A traditional PON system at maximum 20 km distances would typically have 32 users per SG/OLT port. This service group size is often limited by the fiber loss budget. For every 32 users in a service group, another fiber trunk is needed as well as another OLT port. For 512 users in a serving area, the traditional PON system would need 16 fiber trunks and 16 OLT ports.

An alternative PON approach is to use a PON extender or Remote OLT technology. This will increase both the distance from the Head End as well as service group size. But the increasing service group size needs to be balanced against the capacity efficiency concerns discussed in the previous sections. FIG. 32 assumes the extended PON can support 64 users per service group. This means a 512 user serving area would have 8 service groups, need 8 wavelengths, and have 8 OLT ports.

DOCSIS 3.1 over HPON leverages the DOCSIS infrastructure and can support large service groups. It might only need 1 or 2 service groups for a serving area of 512 users. That means only 1 or 2 wavelengths and 1 or 2 CCAP ports are required. This saves the operator significant head end space and power compared to PON approaches. At a later time when additional capacity is needed, then the service groups can be split and additional CCAP ports and wavelengths added as needed.

HPON and Energy Considerations

Energy consumption is becoming increasingly more important. In reviewing the different architectures, power consumption is shifted between the head end and the outside plant (OSP). For traditional PON, 100% of the operator's power is in the head end, but in a distributed R-CCAP architecture, almost all of the power consumption is in the outside plant.

Figure 33:
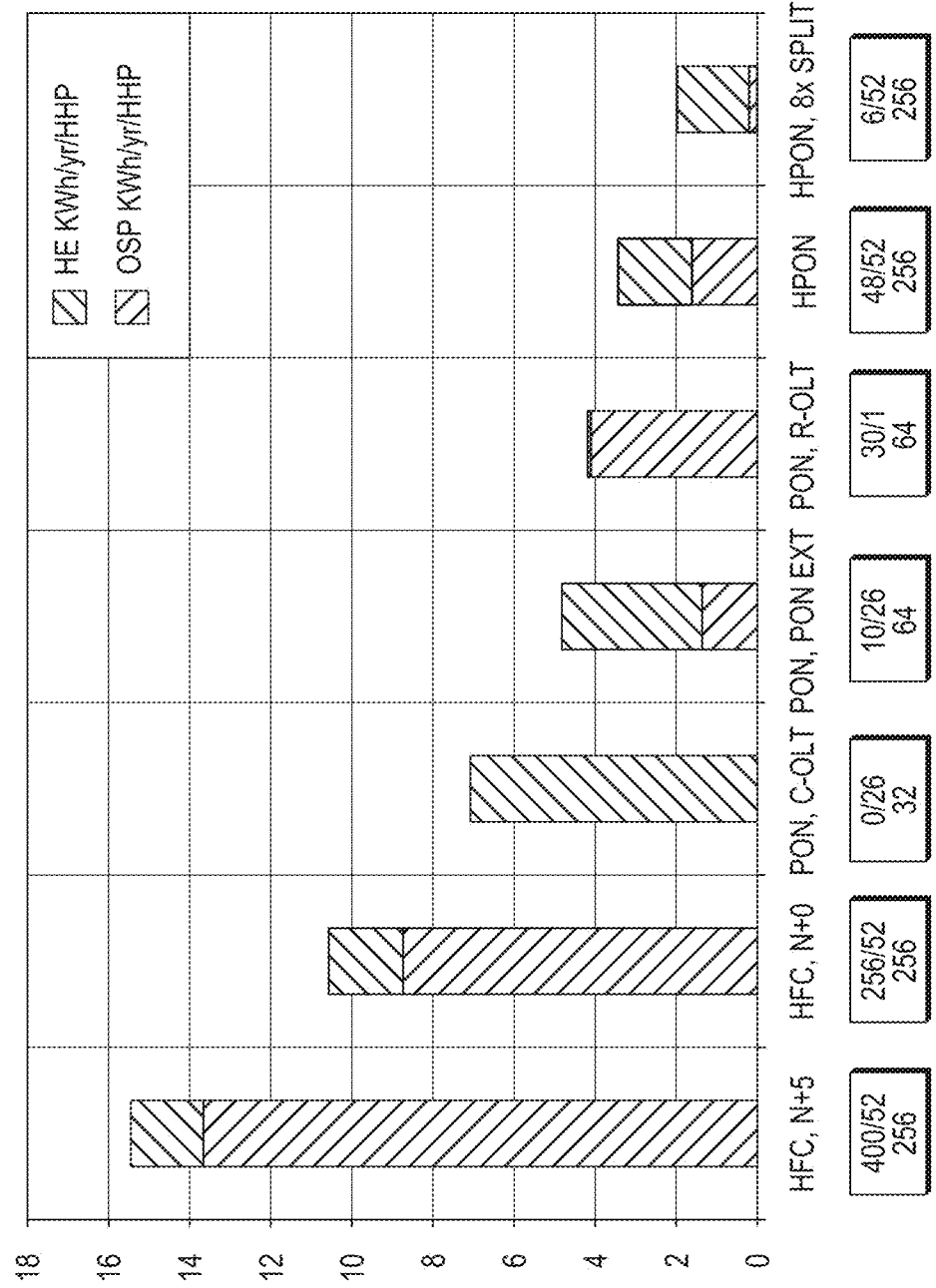
FIG. 33 shows relative energy costs for HFC, EPON and HPON systems.

To be able to compare these different architectures, it is important to consider the total energy consumption. This must include both outside plant and head end power impacts. FIG. 33 takes a look the relative power consumption of various HFC, PON, and HPON alternatives. The power consumption is normalized on an annual cost per Homes Passed. The upper portion 52 of the bars represents the head end power while the lower remaining portion of the bars represent power consumption in the outside plant.

HFC systems 54 are on the left in the figure. A typical N+5 system is the most power hungry of all the architectures. Most of the power is being consumed by amplifiers, actives and nodes in the outside plant. Next to that is the Fiber Deep N+0 HFC system 56. This reduces the N+5 power consumption by more than 25%, but is still high compared to the other alternatives.

The PON systems 58 are next on the chart. The traditional PON has 100% of its power consumption in the head end. It is about half of the H+5 HFC and 30% better than N+0. It is still relatively high because it is limited to 32 users per OLT port, requiring a large number of total OLT ports. A PON system 60 with an extender continues to make improvements. By doubling the SG size to 64, the OLT port count and head end power is cut in half. This is offset slightly with some additional OSP power for the PON extender. Finally, an estimate of a Remote OLT solution 62 appears to provide the best total power consumption of the PON systems, but just marginally better than an extended PON.

Finally, the D3.1/HPON system occupies the two bars 64 and 66 on the right. One is an HPON FTTP topology and the other is FTTC with 8 homes passed per ONU. The head end power is the same as HFC, and leverages the fact that each CCAP port supports 256 users. For HPON FTTP, the OSP power consumption is close to the same as head end power. Note that HPON FTTP power is less than 25% of the N+5 total power consumption and roughly half the total power consumption of a traditional PON system and better than Extended PON or Remote OLT systems.

The HPON FFTC solution is the most power efficient end-to-end (E2E) system. By sharing a single ONU across 8 homes, the OSP power consumption becomes negligible. The HPON FTTC system is the most cost effective from both a CAPEX and OPEX perspective. Note that this analysis does not include the power for the ONU since that will often be powered at the premise.

For existing plants, it has become clear that this is not a choice between HFC or FTTP. The transition will inevitably occur over many decades, hence managing this on-going transformation effectively is desirable. The disclosed Selective Subscriber Shedding method intelligently moves Top Tier subscribers to FTTP in a manner that can add decades to the life of HFC with 80% to 95% of all subscribers not needing migration during that time. It is also economically prudent, showing where and when is best to invest in outside plant. A key piece of this strategy is the use of DOCSIS 3.1 on HFC. This can increase DOCSIS capacity by tenfold over 3.0 data rates. This is a critical element to make sure HFC remains useful through the FTTP transition period.

For the FTTP transition, it has long been thought that traditional PON was the only option. The present inventors realized that HPON, which completely eliminates Optical Beat Interference (OBI), can simultaneously support traditional PON such as 10G EPON or GPON as well as OBI-Free DOCSIS 3.1 over HPON. This splitter based technology supports standard based components on either end of the network and is completely transparent. While EPON and GPON technologies are well known, the present disclosure describes this new DOCSIS 3.1 over HPON that will be of great benefit to operators.

HPON unleashes the capabilities of DOCSIS 3.1. Operating in a FTTP environment allows full use of the spectrum in both the upstream and downstream. Separate wavelengths allow spectrum overlap which enables the initial DOCSIS 3.1 modems to support 5 Gbps DS and 1.8 Gbps US, with higher data rates expected in the future. The downstream capacity of DOCSIS 3.1 over HPON is actually 33% more than 10G EPON. The 204 MHz upstream capacity is twice that of 1G EPON, 10/1 EPON and GPON. It enables operators to offer a true 1G upstream service which these other PON technologies do not.

By leveraging coax as a high performance drop cable, HPON also enables other fiber deep architectures besides FTTP. HPON supports Fiber to the Curb (or Tap), Fiber to the MDU (basement or floor) and even economical Fiber Deep nodes (N+0). An HPON architecture can also be used jointly with distributed architectures to provide the best of both worlds: a shared Remote Device to amortize cost and lowest cost and power Fiber Deep nodes.

Many of the advantages of using DOCSIS over HPON come from leveraging large service groups. Over the years, DOCSIS has been shown to scale nicely to many hundreds of modems and thousands of Service Flows. EPON efficiencies are very sensitive to the number of ONU, LLID and the Grant Cycle time. Given a reasonable number of LLID per ONU and Cycle times to support low latency applications, it will be difficult to push an EPON system beyond 128 ONU.

10G EPON supports a coexistence mode that can support 10/10 and 10/1 ONU. While desirable from an operational point of view, there are significant potential negative performance impacts. A scenario with 50% 10/10 ONU and 90% 10/10 ONU traffic will lose half its capacity to the slower 10/1 upstream. Another scenario with 10% 10/10 ONU and 50% ONU traffic gets less than 2 Gbps capacity, which is less than a 204 MHz D3.1/HPON system.

Economics and energy consumption are two key factors to be considered in determining the best solution path forward. In both cases, the HPON FTTC solution leads the way in both cost and power. An optimum solution for many operators is one that can simultaneously support a mix of both RFoG and PON over a shared Optical Distribution Network (ODN). This gives the operator total freedom to migrate subscribers between D3.1/RFoG and PON at their discretion as needs arise with minimal operational costs. The operator may always select the most appropriate technology.

HPON also enables other Fiber Deep topologies such as Fiber to the Curb (or Tap), Fiber to the MDU and even Fiber to the Deep Node (N+0). By leveraging the extremely high bandwidth of existing coax as the final drop cable, eliminating the costs of pulling fiber over the drop cable, and sharing ONU costs across multiple homes; these other Fiber Deep topologies with DOCSIS 3.1 (D3.1) over HPON provides operators with cost effective alternatives to pure FTTP. Finally, with DOCSIS 3.1 capabilities unleashed over HPON, the present disclosure informs those skilled in the art how to decide when it is best to use DOCSIS 3.1 over HPON or traditional PON technologies, or a combination of both over HPON.

The HPON approach also supports overlapping upstream and downstream spectrum that solves the issues around supporting legacy downstream services in the 54-258 MHz range. However, this FTTP can be much more costly than an HFC based approach. The challenge becomes how to have the HPON FTTP flexibility of upgrading individual homes or very small groups of homes to the extended US splits while being cost effective with traditional HFC systems with coax drops to the home.

Disclosed herein are techniques for leveraging the HPON architecture with support for overlapping US and DS spectrum. However, rather than a FTTP topology that pulls fiber all the way to the home, HPON is used in a fiber deep topology while still using coax as the final drop to the subscriber. This includes topologies such as Fiber to the Curb (FTTC), or Tap, or MDU (e.g. basement or floor) or Fiber deep node. The HPON architecture now becomes cost effective as fiber no longer needs to be installed all the way to the subscriber home (i.e. reuse existing coax drops) and the HPON ONU costs are shared across multiple homes (e.g. 4-8 coax drops per ONU for Fiber to the Tap).

Multiple Upstream Split Support

It is noted that prior art upgrades to HFC systems requires that all homes in the same service group share the same upstream split. So even if only a single subscriber needs the enhanced 204 MHz upstream, each and every home also needs to be upgraded at the same time. Alternatively, U.S. Pat. No. 8,537,861, titled "SYSTEM FOR STACKING SIGNALS IN AN EXPANDED FREQUENCY RANGE", describes a system for RF block conversion of the upstream spectrum at a particular location that passes this upstream frequency back up the coax plant above the existing downstream spectrum (e.g. move an 85 MHz US up to 1200-1285 MHz above existing 750/870/1,002 MHz downstream). However, this approach requires that every active component in the coax path be upgraded with a triplexer; and it also now limits downstream spectrum expansion that DOCSIS 3.1 may try to use in the future.

The present disclosure, however, takes HPON FTTC a step further by supporting a novel configuration where each coax leg from an HPON ONU may have its upstream split be individually selectable. That means that a single home on one coax leg of a service group can be upgraded to 204 MHz split over coax while the rest of the service group remains at the existing upstream split on the other coax legs.

FIGS. 34A and 34B, for example, illustrate a system capable of configuring service of individual subscribers to respectively different splits between upstream and downstream signals. Referring specifically to FIG. 34A, a single output Optical Network Unit (ONU) 100 may have an optical transmission line 102, which carries upstream signals to a head end from a subscriber and downstream signals from the head end to a subscriber, connected to a Bidirectional Optical Subassembly (BOSA) 104 that includes all elements (e.g. laser diodes, photodiodes, transceivers, etc.) necessary to both transmit and receive optical signals to and from the optical cable 102. In the downstream direction, the BOSA is connected to a downstream matching amplifier 106 that amplifies the downstream signal from the optical cable, and in the upstream direction the BOSA 104 is connected to a laser driver 108 that receives broadband upstream signals from a subscriber and uses those signals to modulate the laser in the BOSA 104.

As noted previously, in prior art architectures, all subscribers in the HFC service group served by an ONU need to send and receive signals utilizing the same split between upstream and downstream signal to prevent those signals from interfering with each other. Thus, should such a prior art system be upgraded to provide service to one subscriber in the service group so as to operate on a different, higher split to provide more bandwidth for the upstream and/or downstream signals, all subscribers in the service group would have to be upgraded to the new split, which would entail upgrading Customer Premises Equipment (CPE)— such as modems, cable boxes, etc—for every subscriber in the service group.

The ONUs shown in FIGS. 34A and 34B, however, are capable of customizing the connection to each subscriber 110 to its own split, independently of whatever splits other subscribers in service group are using. Specifically, the ONU 100 includes a split setting element 112 that is customized to the specific split used by the subscriber 110 connected to the port 114 of the ONU 110. In FIGS. 34A and 34B the split setting element 112 is shown as a diplexer, but the split setting element could also be any one of several devices, including a diplexer, a triplexer, and a directional coupler as explained below.

Generally speaking, two methods are available to separate upstream and downstream traffic, at a given split, on a cable to going to a subscriber 110 (or between amplifiers in a network as needed). First, referring to FIG. 35A, a directional coupler 120 (or a circulator) is a 3-port (or 4-port device) that has the property that signals are coupled between ports with a dependence on the direction of signal travel. The directional coupler 120 is schematically shown in this figure as a 4-port device. The subscriber coaxial cable 122 may be connected to port 2. For forward (downstream) signals into port 1 (direction of arrow) signals are coupled from port 1 to both to port 2 and port 4, but not to port 3. For reverse (upstream) signals into port 2 (direction of arrow) signals are coupled from port 2 to both port 1 and port 3, but not to port 4.

The output from amplifier A goes from port 1 to port 2 and is put out in downstream direction on the cable 122 connected to the subscriber 110. The upstream signals from the subscriber are going into port 2 and are put out at ports 1 and 3, where port 3 can amplify the signal as an upstream signal using amplifier B. Port 4 may not be implemented. The coupler operates independent of frequency. Therefore downstream and upstream frequency spectra can overlap and the signals can still be separated. Part of the upstream signal is also put out at port 1 and is not used by amplifier A; this causes a loss of signal energy. This can be solved by using a circulator, another directional RF device with slightly different properties, that couples all power into port 2 to port 3 (and all power into port 1 to port 2 and there is no port 4).

Unfortunately, with directional couplers there can be a reflection of the downstream signal, for instance at the dashed line 124. As a consequence, the downstream signal is reflected back to port 3 and in practice this power can be significant or even high compared to the power of the upstream signal intended to propagated from port 3. This causes a problem in most systems, especially systems that have no means to deal with the reflection. For this reason filter banks are commonly used.

Figure 35A:
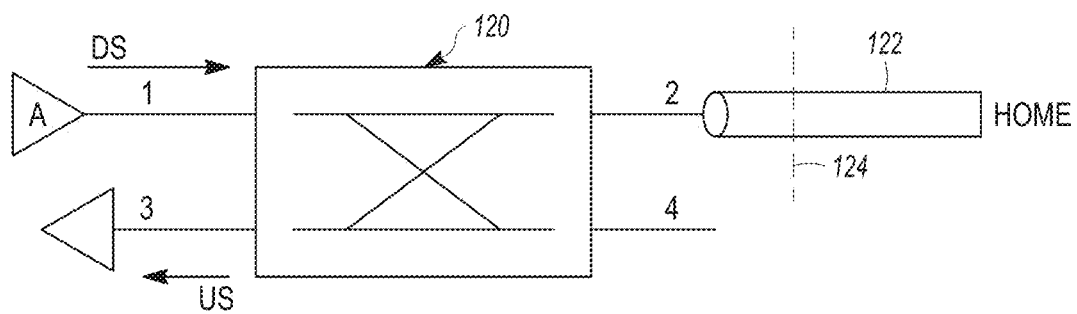
FIG. 35A shows an exemplary directional coupler capable of use in the ONUs of FIGS. 34A-34B.
Figure 35B:
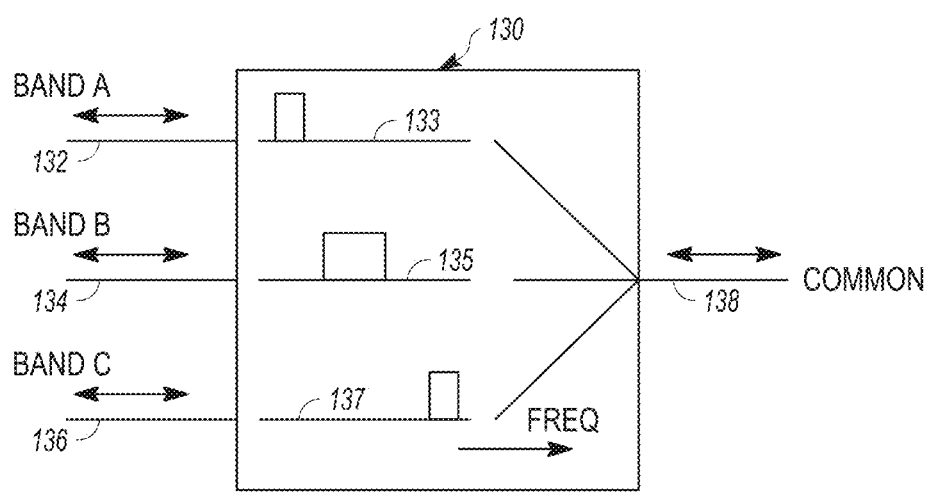
FIG. 35B shows an exemplary diplex filter capable of use in the ONUs of FIGS. 34A-34B.

FIG. 35B shows an exemplary filter bank 130 which in this example is a triplexer, but could also be a diplexer as further explained below. In this figure, three ports 132, 134, and 136, each with its own respective frequency band (A, B, C) are provided to filters 133, 135, and 137 each configured to pass a respective predetermined frequency band. The filters 133, 135, and 137 are all connected to a common port 138, to which a coaxial cable going to a subscriber can be connected. The filters 133, 135, and 137 are not sensitive to the direction the signal is traveling, but are highly effective at rejecting signals that are not in the frequency band passed by the filters. If a diplexer is used instead of the triplexer depicted, the port C does not exist.

The downstream signal amplifier output may be connected to port 134, where the filter 135 passes for instance 54-1200 MHz to the coaxial cable at the common port 138. The upstream signal into the common port (from the coaxial cable) is put out at port A after being filtered by the filter 133 which, for instance passes signals in the frequency band of 5-42 MHz. Note that upstream signals outside this frequency band, such as reflections of the downstream signal, are not put out at port A. Thus, this system is robust and applied in practice. In this system, upstream and downstream signals are selected and directed purely on the basis of filtering the frequency bands they occupy, not based on directivity of couplers.

Figure 35C:
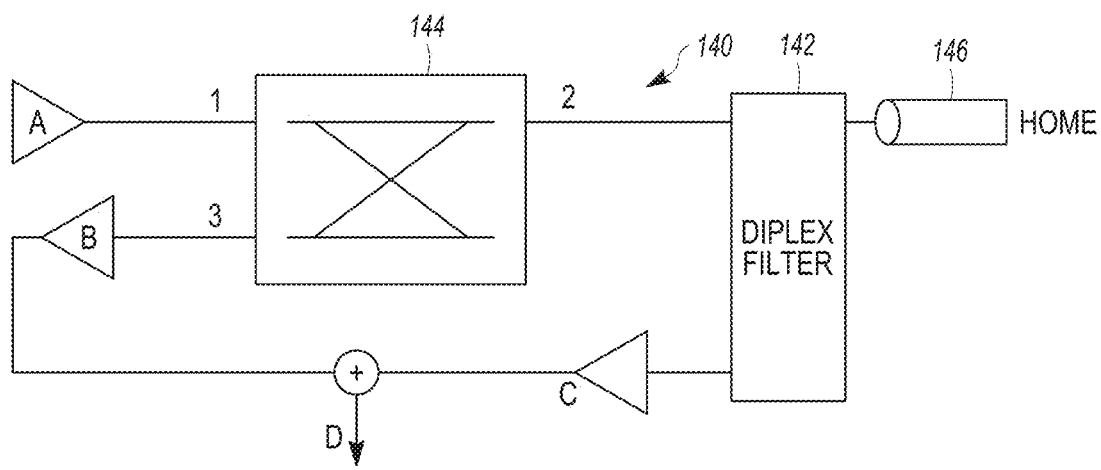
FIG. 35C shows an exemplary hybrid filter capable of use in the ONUs of FIGS. 34A-34B.

FIG. 35C shows a hybrid split setting element 140 having both a diplex filter 142 and a directional coupler 144. In this device, the directional coupler 144 may receive a downstream signal from amplifier A and provide it to the diplex filter 142 that passes the frequency band associated with the downstream signal (for instance 54-1200 MHz) to the coaxial cable 146 going to the home. Upstream signals from the home are output from the diplex filter 142 to amplifier C in the conventional upstream frequency band (for instance 5-42 MHz). In addition upstream signals from the home in the downstream frequency band (in the case that the downstream frequency band is used for bidirectional communication) are output the diplex filter 142 to the directional coupler (or circulator) and are output at port 3, which provides the upstream signal to amplifier B. The outputs of amplifiers B and C may be summed to a signal D that can be provided to an upstream transmitter. Thus, the upstream transmitter can transmit both the conventional upstream frequency band that only contains upstream communication signals and a frequency band that is used for bidirectional communication within that band. Of course, this band used for bidirectional communication also contains unwanted reflected downstream signals and it is assumed that either the level of these reflections is low enough or the output of the transmitter is provided to a system component that is able to handle the reflections, for instance using reflection cancellation algorithms in digital signal processing. In this manner, the upstream transmitter can handle both conventional upstream signals and also upstream signals in a frequency band for using bidirectional communication.

Referring back to FIG. 34A, the depicted single output ONU 100 may be used to customize the split used to service a single home 110, for example, in a FTTH architecture, using any one of the devices shown in FIGS. 35A-35C. Referring to FIG. 36A, and assuming that the split-setting device 112 is a diplexer, the single output ONU may fabricated to have two alternate ports 112a and 112b, each connected to a respective fixed diplexer integrated into the ONU assembly. For example, the port 112a may be connected to an integrated diplexer configured to implement a split having an upstream signal bounded at 204 MHz and the downstream signal occupying a frequency band above that, up to 1.2 GHz. Similarly, the port 112b may be connected to an integrated diplexer configured to pass upstream signals within the 5-42 MHz range, while passing downstream signals within the 54-1200 MHz range. The downstream matching amplifier 106 is connected to each of the ports 112a and 112b, and similarly the upstream laser driver 108 is connected to each of the ports 112a and 112b, so that regardless of the port used to connect the home 110 to the desired split, the ONU 100 will operate to implement that split. In this manner, different homes, even within the same service group, may be configured to their own unique splits. Furthermore, each home in the service groups can receive a signal propagated from a common fiber cable 102 because each home is connected to a diplexer at a selective one of ports 112a or 112b that simply filters the signals propagated to and from that fiber optic cable according to its own split. Those of ordinary skill in the art will appreciate that the number of ports may vary depending on the implementation, e.g. if it is desired to have options for three or more splits to be provided to a home.

Whereas FIG. 34A shows an ONU 100 suitable for use in a FTTH delivery system that is capable of customizing the split used by each home in a service group, FIG. 34B shows an alternate ONU 101 suitable for use in, for example, a Fiber-to-the-Curb (FTTC) or Multiple Dwelling Unit (MDU) delivery system. Specifically, the ONU 101 may have multiple ports 114a-114d, each of which may be used to connect to a respectively different subscriber 110a-110d, at that subscriber's own split, independently of the split used by other subscribers being connected to the ONU 101. Preferably, because different ones of the subscribers the ONU may decide to upgrade over time, and because different ones of the subscribers may utilize the same split as one or more other subscribers connected to the ONU 101, the ONU 101 preferably includes receptacles for plug-in diplexers rather than having diplexers integrated into the ONU. This is illustrated in FIG. 36B.

Referring to FIG. 36B, each port 114a-114b may comprise a receptacle (or other suitable interface) into which a diplexer may be selectively inserted as needed to configure a subscriber to a particular split as the need arises. FIG. 36b, for example, illustrates the port 114a having an diplexer inserted that implements a 2.4 GHz/1.2 GHz downstream/upstream split, the port 114b having a diplexer inserted that implements a 1.2 GHz/204 MHz downstream/upstream split, the port 114c having a diplexer inserted that implements a 1 GHz/85 MHz downstream/upstream split, and the port 114d having an diplexer inserted that implements a 750 MHz/42 MHz downstream/upstream split. Thus, as depicted, each of the homes 110a-110d shown in FIG. 34B would be configured to receive content at a different split than any of the other four homes connected to the ONU, despite the fact that each home is within the same service group and that all homes propagate their upstream and downstream signals over the same fiber optic line 102. Again, the downstream matching amplifier 106 is connected to each of the ports 114a-114d, and the upstream laser driver 108 is also connected to each of the ports 114a-114d, so that the ONU 100 will operate to implement the splits of every home.

Over time, however, one or more of the homes 110a-110c may want to upgrade service. At that time, the diplexer used to implement the split to that subscriber would simply be replaced with one implementing the new split. Those of ordinary skill in the art will appreciate that, although this feature is described with respect to the ONU 101, it could also be implemented on the ONU 100 if, for example, a CATV provided wanted to retain the ability to upgrade the ONU 100 to any one of many different splits. In such a circumstance, the ONU 100 may only need one port 112 rather than ports 112a and 112b.

The plug-in diplexer system just described is surprisingly cost-effective. Ordinarily, diplex filters commonly used in node and amplifier systems in CATV networks need to meet strict requirements. First, the amount of suppression of the unwanted frequency band in the diplex filter must be very high in order to obtain a usable upstream signal because the output from an amplifier is distributed over many homes and therefore has a very high output power level, as well as the fact that the input to the amplifier from upstream signals is very weak because there are many homes combined to an amplifier with splitters and combiners that cause a high loss; therefore, a high suppression is needed of the downstream frequency band. Second, the loss of the filter must be very low to avoid both the loss of the high downstream amplifier level and degradation of the already weak upstream signal. Third, the response of the filter as a function of frequency in the pass-band must be very flat because in a CATV system, many amplifiers are cascaded such that the signal passes through a large number of diplex filters, and the response ripple of the individual filters is therefore magnified. Fourth, amplifiers in the field are high-gain bidirectional amplifiers and diplex filters are used to prevent oscillation of these amplifiers.

In the systems shown in FIGS. 34A-36B, however, none of the foregoing restrictions are applicable. The downstream and upstream signal levels are similar at a location close to a home or at the coaxial cable going to a home, so high suppression of any frequency band is not needed. The downstream power level is low and the upstream signal level is high, a small amount of filter loss can be tolerated. The system contains only one diplex filter that the signal must pass through, response ripple is not compounded so the requirements for the individual filter response flatness is relaxed. Finally, the system uses O/E conversion, i.e. it is not a bidirectional RF to RF amplifier configuration, and there is no potential for oscillation. Because these restrictions on the diplexers may be relaxed, requiring fewer components, filter tuning may not be required in manufacturing leading to low manufacturing costs.

Those of ordinary skill in the art will appreciate several features of the system shown in FIGS. 34A-36B. First, a DOCSIS scheduler will ensure appropriate functioning of Customer Premises Equipment (CPE) in these systems. Furthermore, a 3 dB or even 6 dB reduction in power can be accommodated by an increase in RF gain, if necessary. Finally, the feature of using plug-in diplexers can also be utilized in Fiber-to-the-Last Amplifier (FTTLA) configurations.

FIGS. 37A and 37B show respective alternate embodiments where the ONUs 100 and 101, respectively, are each configured to optionally add a PON pass-through feature to the implementation. This feature may be useful, for example, in circumstances where one or more subscribers connected to the ONU are devoted to specific PON services such as 10/10 and 10/1 Gbps EPON, or other advanced data services. The PON services may be carried on different wavelengths on the main fiber trunk 102 and separated out at the BOSA 104 to go to the optional PON pass-through module 120. Specifically, the ONU 100 and the ONU 101 may each include a PON pass-through module 120 that directly interconnects the Bidirectional Optical Subassembly (BOSA) 104 with CPE equipment, such as an Optical Node Terminal (ONT) using a dedicated fiber connection.

Burst Mode Node

In a fiber deep architecture fiber may be drawn from existing node locations to the amplifier locations. The coaxial trunks providing RF signals to the amplifiers may lose their function, but the distribution coaxial networks to the homes remain in place. For such a fiber-to-the-last-active system the diplexer requirements may be relaxed because these are no longer needed for amplifier isolation, only for band separation, resulting in an increase in available bandwidth. Also for a fiber deep network, more bandwidth may be offered in general because only one RF active is in the signal chain. Finally, fiber deep architecture offers more options to segment traffic. For one node there may be as many as 32 amplifiers, or even higher; if each amplifier is operated as a node, then in the reverse direction the optical signals all need to be received at the original node location, RF added, and re-transmitted. An alternative implementation uses HPON architecture to receive and combine a large number of optical inputs with little loss in noise performance and bandwidth.

However, in either case, in the event that all the upstream transmitters are active at the same time, the summation of noise due to shot noise and laser noise of the individual transmitters is large, resulting in an overall SNR degradation that can be debilitating. In the example case of 32 upstream transmitters, for example, it can be as large as 10*log (32)=15 dB. In order to prevent such a large degradation, preferably the upstream transmitters are operated in a burst mode, active only if there is upstream traffic generated by users. This resembles operation of the upstream transmitter in an ONU that is active only when users generate traffic.

The present inventors discovered that it is advantageous to locate the upstream burst mode functionality of an ONU (that is normally located at the customer premises) at a location higher in the network, such as an existing amplifier location. The amplifier may be upgraded by re-placing the lid with an ONU functionality that is coupled to the amplifier forward and reverse gain module. This provides a relatively low cost method to upgrade a network to fiber-deep operation with enhanced bandwidth capabilities and as a stepping stone to driving fiber even deeper such as FTTC. It should be noted that as fiber is driven deeper, the number of reverse transmitters increases and the need to keep accumulated transmitter noise under control by operating transmitters in burst mode becomes more urgent.

FIG. 38 shows an amplifier upgrade 200 with an ONU "lid." In this system a coaxial cable 202 is connected to the input of system 200 and provides an RF signal in the 54-860 MHz range. Due to losses in the preceding coaxial network, the RF level is low. The downstream 54-860 MHz signal is separated by a diplex filter 204 and provided to a forward amplifier 206, which outputs the forward signal at a high level. The output of this amplifier 206 represents the downstream signal that is provided to a second diplex filter 208 that outputs that signal to an output coaxial cable 203 at high level which is sufficient for distribution to homes. In the upstream direction, modems at the customer premises send signals upstream that arrive at the output diplex filter 208 of the amplifier upgrade 200. The diplex filter 208 separates these upstream signals, for instance in the 5-42 MHz range and provides them to the reverse amplifier 207. The reverse amplifier 207 outputs these signals at high level to the diplex filter 204, which in turn outputs these signals in upstream direction on the incoming coax cable. The level is high enough to overcome losses in the upstream signal.

Referring to FIG. 39, the amplifier upgrade 210 may be modified to have an ONU functionality. In this figure, an optical fiber 212 is connected to the input of the ONU 214 and can provide an RF signal in the 54-5000 Hz range for instance at 1550 nm. The downstream signal or a bandwidth selection thereof is directly provided to the forward amplifier 216 outputting the forward signal at a high level. The output of this amplifier 214 represents the downstream signal that is provided to the diplex filter 218 that outputs that signal to an output coaxial cable 213 at high level, which is sufficient for distribution to homes. In the upstream direction modems at the customer premises send signals upstream that arrive at the diplex filter 218. The diplex filter 218 separates these upstream signals, for instance in the 5-204 MHz range and provides them to the reverse amplifier 217. The reverse amplifier 217 provides the signals at high level to the ONU 214. The ONU 214 outputs an optical signal modulated with the RF information for instance at 1610 nm.

Compared to the normal location of an ONU at the customer premises, the system shown in FIG. 39 has several advantages. First, the output level from the ONU can be low because the forward amplifier provides high gain. Also the input level to the ONU is high due to the presence of the reverse amplifier. Thus it becomes clear that when an ONU is placed inside the coaxial distribution network there will generally be excess gain and the ONU may be simplified to operate with low output level and high input levels.

An existing RF amplifier typically comprises three sections. A pre-amplifier stage for the downstream signal, a post amplifier stage of the downstream signal and an upstream signal amplification stage. When migrating to the disclosed architectures, in some embodiments the preamplifier stage and the reverse amplifier stage would be replaced with an ONU. A typical ONU may have very low dissipation and with the burst mode operation, limit the power further. In fact the ONU dissipation may be greatly reduced such that an existing amplifier housing may support the ONU operation with merely a lid upgrade and no significant increase of power usage. Furthermore, there are multiple avenues to amplify and/or attenuate the optical and RF levels to present to the CMTS port. This can be accomplished via an RF OMI adjust algorithm.

In an ONU, if implemented with high and low bias states (or even with the laser on all the time) rather than a laser off state, noise injected into the ONU below the turn-on threshold of the ONU would still be amplified and provided to the active laser such that this noise reaches the active combiner. Thus in such an ONU there is a need to reduce the gain for RF input below the turn-on threshold of the ONU. Control systems such as laser bias control, amplifier bias control and gain control can be used together, independently or in any combination to reduce that noise. Without loss of generality these techniques may be used for analog or for digital applications such as DOCSIS 3.0, 3.1, 1G/10G EPON or 1G/10G PON.

It is also known that the there is a finite turn-on time for the ONU. For example for RFoG, the turn on time should preferably be between 100 ns thru 1000 ns (or 1 us). A turn on time that is very fast creates a very high low frequency noise that decreases over the frequency range. Unfortunately, most of the currently deployable upstream signals are degraded by this low frequency noise phenomenon, which extends to 50 Mhz and beyond. To make matters worse, this noise is spiky in that the instantaneous noise burst could be much higher than what is commonly seen on a spectrum analyzer with moderate video bandwidth.

FIG. 40 shows a typical ONU upstream implementation, which generally illustrates a system 220 where an RF detector 222 detects whether an RF signal is present at its input 224. If a signal is detected, the RF detector 222 passes the signal through to an amplifier 226 and also signals a laser bias control module 228 to turn on at time t0 a laser 227, which has a turn-on time 229. The amplifier 226 amplifies the RF signal that is passed through from the RF detector circuit 222. The amplified signal drives the laser 227. The laser's output is propagated from the ONU on a fiber 221. The turn-on time 229 of the laser has a profound effect on the spectrum produced by the turn-on event FIGS. 41A and 41B show estimated spectra for a rise time of 100 ns and 1 us, respectively, with a typical intended signal at 40 MHz. For a short rise time the noise due to the ONU turn-on is of the same order of magnitude as the intended signal. With a slower laser turn on this effect can be mitigated. If there is just one ONU on at any given point in time, the effect of low frequency noise due to ONU turn-on is not felt, because the DOCSIS load is inset after the laser has fully turned on. However, when there are multiple ONUs that can turn on at any given point in time, the situation becomes more complex.

If there was an ONU already on, and another ONU turns on while the first one is transmitting data, then the high noise spikes—described above—occur across the frequency spectrum. Depending upon the relative RF levels of the signals and the noise spikes, the signal may experience pre- or even post-FEC errors (when measured at the CMTS for example). This issue becomes more and more pronounced as the numbers of ONUs that can turn on is increased, as is likely to happen with DOCSIS 3.1. While this effect has always existed, it is only apparent as a residual error floor when the OBI and its induced errors have been eliminated.

An additional impairment is caused by the application of the RF signal before the laser has fully turned on and has stabilized. This can occur for example if the laser turn-on time is slower than the DOCSIS Preamble, which may be applied before the laser has reached steady state. In this case, the DOCSIS Preamble is a QPSK signal and can be higher than the regular RF signal to follow (for example it may be 6 to 10 dB higher depending upon the conditions). In this case, the laser is over-driven while still in a low power state and experiences very large clipping events that will spread throughout the RF spectrum and degrade other signals that may exist at the same time. While this effect always occurs, it is more obvious with the elimination of the OBI, since the OBI induced errors are removed from the system.

FIG. 42 illustrates this problem showing a bias around which a laser is modulated with a sine wave signal. During the time that the laser bias is insufficient the output signal is clipped. For slower laser turn-on the duration of the clipping is increased. While one may want to reduce the low frequency RF spikes across the board by having a slower turn on time, the higher clipping effects described above may limit those gains. This disclosure provides an innovative approach to take both of these effects into account.

Referring to FIG. 43, a system 230 includes an RF detector 232 that detects whether an RF signal is present at its input. If a signal is detected, the RF detector 232 passes the signal through to an amplifier 234 and also signals a laser bias control module 236 to turn on at time t0 a laser 237, which has a turn-on time 238. The laser bias control module 236 preferably modulates the bias of the laser 237 to achieve a full turn-on of the laser 237 over a turn-on time 238 that is preferably as slow as possible, e.g. the slowest turn-on time allowed by the RFoG standard, or in some embodiments even longer. Preferably, the laser bias control module 236 will ramp up the RF gain in proportion to the laser turn on, or delay the RF turn on until the laser is sufficiently turned on to experience negligible laser clipping. This may be done for example if the RF amplifier gain is adjusted in proportion to the laser bias, thus fundamentally preventing the over shoot and clipping events. With an RF gain factor proportional to the laser bias the clipping no longer occurs as shown in the FIG. 44. In some embodiments, the turn-on time of the laser 237 could be up to 500 ns, or longer. This may greatly reduce the low frequency noise. The turn-on time for the laser may be linear, as shown in FIG. 43, or may implement a transition along any other desired curve, such as a polynomial curve, an exponential curve, a logarithmic curve, or any other desired response However the variation in RF level during the laser turn-on may potentially cause an issue in the burst receiver that may expect a near constant RF level during the laser turn-on. In case that is required, the RF turn-on may be delayed and apply a faster time constant than the optical power turn on. This is illustrated in FIG. 45. FIG. 46 illustrates a ONU that implements such a delay, and the most important signals therein. Specifically, a novel ONU upstream architecture 240 includes an RF detector 242 that detects whether an RF signal is present at its input. If a signal is detected, the RF detector 242 passes the signal through to an amplifier 244 and also signals a laser/amplifier bias control module 246 to turn on at time t0 a laser 247, which has a turn-on time 248. The laser/amplifier bias control module 246 preferably modulates the bias of the laser 247 to achieve a full turn-on of the laser 247 over a turn-on time 248 that is preferably as slow as possible, e.g. the slowest turn-on time allowed by the RFoG standard, or in some embodiments even longer. In some embodiments, the turn-on time of the laser 247 could be up to 500 ns, or longer. This may greatly reduce the low frequency noise. The turn-on time for the laser may be linear, as shown in FIG. 45, or may implement a transition along any other desired curve, such as a polynomial curve, an exponential curve, a logarithmic curve, or any other desired response.

The amplifier 244 amplifies the RF signal that is passed through from the RF detector 242. The amplified signal drives the laser 247. Preferably, when amplifying the RF signal from the RF detector 242, the laser/amplifier bias control module 246 includes a circuit that modulates the amplifier gain to be proportional to the laser bias, but with a delay 249 relative to the time $t_0$ that the laser 247 begins to turn on. In other words, the bias control module 246 detects an RF input signal at t0 and turns on the laser slowly in a time t_on_1. At a second time t1, optionally delayed with respect to t0, it starts to turn on the RF gain with a rise time t_on_gain. Preferably, the rise time of the amplifier gain is faster than the rise time of the laser turn-on. In some embodiments, the laser/amplifier bias control module 246 simply switches on the RF gain, i.e. t_on_gain is set to a very short value.

The ability to simultaneously slow the laser turn on and to provide an RF gain to the input in proportion to the laser turn on, or delayed with respect to the laser turn on is an innovative feature that has great potential in all applications, and without loss of generality these techniques may be used for any analog application such as DOCISIS 3.0 or DOCSIS 3.1.

There may be benefits, at times, where/when these "modified ONU-amps", or mini-nodes are better used in the continuous mode. Therefore, preferably the burst mode operation is selectable or controls itself automatically or can be remotely controlled in the following manner. First, the modified amp/mini node is operated in the burst mode by default. Second, a sensing circuit is included in the unit, which will switch into "always on" mode. In a first embodiment, the switch can happen on a "trigger sequence" received from a downstream pattern, injected into the service group traffic of a given CMTS. In a second embodiment, the switch can happen on a "trigger sequence" coming from an upstream pattern. In a third embodiment, the switch may be triggered by strong upstream traffic; above a certain percentage of detected upstream traffic, such as 75%, the switch may trigger to an "on" state and if it drops below a certain percentage, such as 50%, it may drop back to burst mode operation. In a fourth embodiment, the device may operate with a fast turn-on when upstream traffic is initiated combined with a slow turn-off, both in terms of turn-off delay and in terms of turn-off transition time. Preferably, the node is also capable to operate the laser in continuous mode while still operating the RF switch such that input noise to the node is suppressed when the RF switch is off during times that no upstream signal to transmit is provided to the node.

Full Duplex Bidirectional Transmission

HFC to Fiber to the Last Active to Fiber (FTLA) to Fiber to the Curb (FTTC) are all different way stations along the way to (Fiber to the Home) FTTH networks. Due to the finite build capacity, it will likely take decades to effectively migrate all networks to fiber to the home. Therefore, it becomes more and more attractive to be able to maximize capacity over systems that are Fiber Deep (FD) such as FTLA and FTTC as the networks migrate towards FTTH.

While this may be accomplished by D3.1 in combination with other techniques such as spectrum enhancement, the issue of upstream transmission remains complicated. Today bi-directionality on coax cable is effected by means of diplex filters, such that non-overlapping lower frequency band (5-204 MHz for example) is used as the upstream and the higher frequency (258 MHz to 1218 MHz) band is used for the downstream transmission.

Since total bandwidth in general is limited, an increase in the upstream bandwidth necessarily limits downstream capacity. However as networks go fiber deep, the upper bandwidth can be increased significantly. For example, the present inventors have discovered that an effective bandwidth is upwards of 2.5 GHz. However, note that increasing upstream bandwidth even in this case, takes away from the downstream bandwidth, and furthermore, as the frequency split becomes higher and higher, more and more spectrum is wasted in effecting proper filtering needed to isolate forward and reverse signals.

These are resolved in FTTH systems; Since duplexing is done optically—there being two wavelengths, one for the forward direction (1550 nm for example) and one for the reverse direction (1610 nm for example)—there can be completely overlapping forward and reverse signals, thus increasing capacity in both directions. Furthermore, the ability to increase capacity in this way also has the major benefit of being able to support existing CPEs that typically have bandwidths as indicated earlier.

The inability of having full duplex bi-directional transport of signals over coaxial cable is therefore serious limitation, one that limits capacity. Though one way to overcome this limitation is by migrating to FTTH, but that is an expensive and time consuming activity due to limited build capacity at most MSOs.

Disclosed is an elegant way of achieving full-duplex bi-directional transmission (FDB) in FTTC. Generally, FDB cannot happen in coax because of the presence of significant reflections. And unlike optical attenuators, RF attenuators do not have sufficient isolation to prevent reflections and preserve isolation. Therefore, it is paramount to mitigate reflections, enhance isolation. In addition, there is a need to have meaningful echo cancellation in the system to clear out the residual reflections.

In this solution, since it supposes FDB on FTTC systems, there is merely a piece of coax roughly 150 ft to 200 ft between an ONU (optical network unit), split between 4 to 8 ways and between 2 to 4 subscribers. There could be other combinations as well. The disclosed solution applies actively amplified splitters on each splitter leg in the ONU, thus effectively preventing large reflections from the ports of the ONU. Furthermore, the CPE is now able to know when and what it has last transmitted. Even if stray reflections arrive at it, it is able to echo cancel these. Similar, the CMTS will be able to echo cancel reflections.

As an example, if the downstream is 100 MHz to 2.5 GHz wide and the upstream is 5 MHz to 1.2 GHz wide, the downstream transmission is generally not burst mode and is continuously available to all the ONUs and to all the CPEs. The upstream transmission is in burst mode and is available only when the CPE has an RF that needs to reach the ONU. Since a large number of subscribers subscribe to popular tiers, these are all likely to be below 42 MHz, 85 MHz or 204 MHz as the case may be. There are very few subscribers in general who would subscribe to the very high tiers that would require 1.2 GHz upstream (these would be the ones taking 10 Gbps tier in the US). These subscribers will have high end CPEs that will have echo cancellation. During most of the time, the upstream is below a set limit (as indicated above 204, 85 or 42 MHz) and the upstream is above it, and for most of the subscribers owning standard equipment, there is no need to be affected, one way or another. The CMTS behaves normally also, since the RF frequencies are naturally segregated.

When a premium customer bursts, in the upstream, the signal travels to the ONU; due to the active port, it reflects very little to itself and to other subscribers in its vicinity thus not affecting the performance in any meaningful way. This signal travels to the CMTS. At the CMTS, the port accepts upstream signal; there the signal is digitized and sent to processing into the CMTS core. If there is a reflection of the downstream signal that is sent along with the upstream signal due to finite reflection from the CPE, it would be echo cancelled at the CMTS. Thus, the entire process of echo cancellation is now subjected only to rather limited echo cancellation requirements with this novel design.

FIG. 47 shows a multiport ONU 300 connected to user cable modems (CM) 302 via drop cables 303 to the left and to an upstream device (or headend) via fiber 304 to the right. Those of ordinary skill in the art will appreciate that a cable modem may also represent a home gateway device, for instance high end customers may have a gateway at the home.

The cable modems are differentiated between hi-user cable modems that use extended spectrum operation and lo-user cable modems that only use the standard spectrum range. The downstream signals with a power P_fwd to the cable modems are indicates with arrows 306, where solid arrows represent intended downstream signals and dashed arrows represent unintended reflections with power R_fwd of the downstream signals. Similarly, the upstream signals with power P_rev are indicated with arrows 308, where the intended signal is solid and the unintended reflections of upstream signals with power R_rev are indicated with dashed lines. On the drop cables 303, the arrows representing the signals could be interpreted as an amount of spectrum covered by the signals, see for instance the second cable modem connection from the top that has a frequency axis drawn under the drop cable such that the arrows are "mapped" to that frequency axis such that the upstream signals cover 5-100 MHz and the downstream signals cover 100-1200 MHz. For low-end users the spectra of upstream and downstream signals do not overlap and therefore upstream and downstream signals do not interfere. For the high end user however the upstream signal can use an extended bandwidth range, partially overlapping with the upstream signal.

The drops 303 are connected to an active ONU that includes isolation amplifiers 310 and 312 to drive forward signals to the cable modems and amplify upstream signals received from the cable modems. The downstream isolation amplifiers 310 strongly attenuate upstream signals such that these do not reach the 1:N splitter 314 used to distribute the forward signals over the ports. This relaxes the isolation requirement for the 1:N splitter 314; if this splitter had limited isolation then upstream signals from a first port could be put out at a second port and if the upstream signal would overlap with the downstream signal spectrum for that port it would cause interference. However, through the use of isolation amplifiers this problem is avoided.

A directional coupler 316 with loss of cplr_dB is used to provide upstream signals to a reverse isolation amplifier 312 that puts out signals to a 1:N combiner via an optional switchable filter. The amplifier 312 is provided enough isolation such that the reverse signals of the different ports are isolated from each other. Finally the downstream signal splitter 314 is connected to a downstream signal receiver 320 and the upstream signal combiner 318 is connected to an upstream transmitter 322. The receiver 320 and transmitter 322 are connected to a fiber link 324 that goes upstream, generally via a WDM.

In this architecture the reflected downstream signal will pass through the isolation amplifier 312 and is combined on the 1:N combiner 318. The optional filters 326 may be used to limit the bandwidth of the upstream signal such that the reflected downstream signals are rejected at low frequencies; that is the frequency range used by most low-end users. For a high end user that uses an extended frequency band however such a filter 326 would need to be turned off or set to another appropriate bandwidth as will be discussed later. The filter 326 could be controlled from a head end site. This implies that some of the downstream signal will be reflected and the spectrum of the reflection can (in part) overlap with the spectrum of upstream signals that are used by a high-end user. A high end user may use spectrum up to 1200 MHz or even beyond.

A reflection of the upstream signal, for instance from the multiport ONU to the cable modem of the high end user, causes problems for downstream signal reception by the high end user when the spectrum of the upstream signal overlaps with that of the downstream signals. Note that this causes a problem only for the high end user due to the use of isolation amplifiers 312 in the multiport ONU 300.

Thus, there are two reflections that cause problems in this type of system, both affecting a high end user only. Firstly a reflection of the downstream signal ends up in the upstream signal and is transmitter to the CMTS in the head end. Secondly a reflection of the upstream signal can overlap with the spectrum of the downstream signal at the high-end user cable modem. In both cases echo cancellation may be used to compensate for the interference caused by these reflections. The CMTS may correlate the reflected downstream signal received at an upstream port to the downstream signals that were sent by that CMTS and use this to compensate a signal received at an upstream port such that (in the digital domain) the reflected downstream signal components are cancelled out. The cable modem may correlate the reflected upstream signal to signals it transmitted and use this to compensate a signal received in the downstream direction such that (in the digital domain) the reflected upstream signal components are cancelled out. This may be a relatively straightforward task for a cable modem sharing upstream and downstream ports or with those ports in close proximity and with reflections that have a delay not more than the roundtrip time of the drop cable. For the CMTS however in many instances upstream and downstream ports may not be shared and the roundtrip delay for the reflections to be cancelled can equate to more than 100 km of transmission line length. Therefore, reflection cancellation at the CMTS side may be challenging.

Since the downstream signal reflection towards the CMTS is expected to be the most difficult to handle, this reflection is discussed first. At the outset, for existing connections for average users (up to 99% of actual users) overlapping spectrum may not be used. The addition of a switchable filter in the upstream path as shown in FIG. 47 permits elimination of reflected downstream spectrum for most customers, but does require a control path for that filter, such as control by the head end or control via an upstream control path from the cable modem or home gateway. Furthermore, the switchable filter may also include RF on/off switching; upstream signal detection is needed in any event to control the upstream laser transmission of the multiport ONU. In case upstream signals are detected per port, then reflected downstream signals can effectively be suppressed for ports without upstream transmissions. Reflections in the plant can be expected to be on the order of −20 dB. In case an SNR of 40 dB (due to reflection) is targeted, then a level differential of 20 dB between upstream and downstream signals may be appropriate such that combined with −20 dB of reflected signal level, the wanted to unwanted signal ratio is 40 dB. This means that in FIG. 47 P_rev may be set 20 dB higher than P_fwd. This also ensures that upstream signal transmission may be detected with a good discrimination from downstream signal transmissions to control any optional RF switches that may be present. Of course, a drawback to this approach may be that the reflected upstream signal to the cable modem may then be of similar magnitude as the downstream signal to the cable modem, complicating the echo cancellation of the cable modem that would need to attain 40 dB of reflection cancellation or more.

The SNR required for upstream transmission may be deliberately limited in exchange for more bandwidth; for every 3 dB of reduction in SNR the same transmission power can provide a doubling in available bandwidth such that the total throughput may be the same or higher. For instance in case an SNR of 24 dB would be sufficient for the upstream signal then the upstream signal level may not be raised much above the downstream signal level facilitating easier reflection cancellation at the modem.

It should also be considered that for moderate reverse spectrum growth to for instance, a 204 MHz split the high-end user that utilizes this spectrum may not require the 108-204 MHz downstream spectrum and the cable modem or home gateway may simply discard that downstream spectrum and transmit upstream with sufficient power to provide enough SNR for the upstream spectrum.

The drop cable can support spectrum to very high frequencies such as 6 GHz; another alternative places the upstream signal spectrum in a frequency range not used for downstream signals; statically or dynamically. The upstream transmitter in the multiport node may be bandwidth limited such that it may include a down-converter to place high frequency upstream signal spectrum in a lower frequency band that may overlap with the downstream signal spectrum; once in the optical domain the upstream and downstream signals are separated and no crosstalk or reflection of one into the other can occur. Alternatively, high frequency upstream signals may be limited to one octave such that second order distortions from the upstream link can be ignored; such distortions generally occur when using a low cost directly modulated laser in the upstream direction unless a low dispersion window of the fiber is used. In such a scheme the 5-100 MHz upstream signal may be up-converted to a high frequency, for instance 2 GHz such that the cable modem can complement that signal with further signals in the 2-4 GHz range. The 2-4 GHz range may then be allocated by the CMTS in a half-duplex mode such that high peak up- and downstream rates up to several 10 Gbs can be achieved without reflection cancellation methods. At the receiver side the 5-100 MHz signals would be down-converted to connect to regular CMTS ports while the high frequency signals may pass directly to extended bandwidth CMTS ports. This should suffice for the next couple of decades of bandwidth growth.

Finally, it should be considered that ultimately a small fraction of customers may need extremely high peak rate transmissions with full duplex capability (such as 40 Gbps downstream and 20 Gbps upstream simultaneously). At that time, for such customers a fiber may be provided to the home in this architecture or a Siamese cable including a coaxial connection and a fiber connection or with two coaxial connections. When this is provided, the upstream traffic can be separated from the downstream traffic and full duplex bidirectional operation is enabled. Such connections can be added within the proposed architecture that already offers both half duplex operation for high peak rates and conventional DOCSIS operation for normal peak rates.

Therefore, in some embodiments, the complexity of echo cancellation may not be necessary so long as a flexible allocation of upstream and downstream transmit frequencies is permitted. Diplex filters should generally be avoided to ensure this flexibility. Upstream transmission levels should generally be set high enough that reflected downstream signals do not significantly alter the power budget of the upstream transmitter. Reflected upstream signals are limited to the drop cables of individual users and, due to the multiport ONU design with isolation amplifiers these do not propagate further in the system such that there is a high tolerance to such reflections.

Up until now, bidirectional transmission in the same frequency band was not considered in CATV networks, in favor of the use of diplex filters that are needed to provide isolation in CATV amplifier chains. FTTH enables overlapping FDB transmission and therefore enabling FDB has direct and specific benefit in FTTC environment thus increasing available capacity and decreasing overall build cost and improving timely response to capacity needs.

Use of 10 Gbps in G.Fast twisted pair is only eliminates crosstalk, which is not equivalent to eliminating reflections. On CAT6 cables however, 10 GbE implementations do provide both crosstalk and reflection cancellation, illustrating that such techniques are cost effective FIG. 48 illustrates an exemplary cable system 400 that may implement all the systems and methods disclosed in the present application. The system 400 includes a head end facility (HEF) 410, a plurality of hubs 420(1)-420(m), and associated with each hub, a plurality of nodes 430(1)-430(n) and a plurality of customers 460(1)-460(p). The HEF 410 or hubs 420 may have a cable modem termination system (CMTS). Each of the nodes 430 has one or more corresponding access points, and each of the customers 460 has one or more corresponding network elements 462, shown in FIG. 48 as a cable modem.

A single node 430 may be connected to hundreds of network elements. Described herein are techniques related to a cable modem network element 462; however it should be understood that the cable modem is used by way of example as the concepts apply to other network elements. Examples of network elements include cable modems (as shown in FIG. 4), set top boxes, televisions equipped with set top boxes, data over cable service interface specification (DOCSIS) terminal devices, media terminal adapters (MTA), and the like. Thus, where reference is made to a cable modem, the concepts also apply more broadly to a network element.

A cable system 400 provides one or more of commercial TV services, Internet data services, and voice services, e.g., Voice-over-Internet Protocol (VoIP) to one or more customer locations 460 (i.e., end users) in a given geographic area. To provide these services, the HEF 410 in the example cable system 400 in FIG. 48 is shown coupled via a content delivery network 415 to a plurality of content providers 405, an IPTV server 416, and a public switched telephone network (PSTN) 417.

The content delivery network 415 may be a cable data network such as an all coaxial or a hybrid-fiber/coax (HFC) network. Of course, other broadband access networks such as xDSL (e.g., ADSL, ADLS2, ADSL2+, VDSL, and VDSL2) and satellite systems may also be employed. In embodiments, the content delivery network 415 comprises, for example, a packet-switched network that is capable of delivering IP packets from an IPTV Server 416 to clients 460(1)-460(p), using, for example, a cable data network, PON, or the like. Examples of a content delivery network 415 include networks comprising, for example, managed origin and edge servers or edge cache/streaming servers.

The content delivery servers 415 deliver content via one or more wired and/or wireless telecommunication networks to users 460(1)-460(p). In an illustrative example, content delivery network 415 comprises communication links 450 connecting each distribution node and/or content delivery server to one or more client devices, e.g., for exchanging data with and delivering content downstream to the connected client devices 460(1)-460(p). The communication links may include, for example, a transmission medium such as an optical fiber, a coaxial cable, or other suitable transmission media or wireless telecommunications.

FIG. 48 illustrates a hybrid fiber-coaxial (HFC) cable network system 400. A typical HFC network uses optical fiber for communications between the headend and the nodes and coaxial cable for communications between the nodes and the end user network elements. Downstream (also referred to as forward path) optical communications over the optical fiber are typically converted at the nodes to RF communications for transmission over the coaxial cable. Conversely, upstream (also referred to as return path) RF communications from the network elements are provided over the coaxial cables and are typically converted at the nodes to optical communications for transmission over the optical fiber. The return path optical link (the optical components in the HFC network, e.g. the transmission lasers, optical receivers, and optical fibers) contribute to the performance of the HFC network. In this HFC network example embodiment, the nodes 430 communicate via optical fibers with the hubs 420 and via coaxial cable to customer premises 460.

The HEF 410 and/or the hubs 420 may be coupled to the IPTV server 416 and PSTN 417 via CDN 415, e.g., the Internet, for providing Internet and telephony services (e.g., to and from customer 460(1)-460(p)) via the CMTS. The CMTS 425, in an embodiment, is a general-purpose computing device or application-specific integrated circuit (ASIC) that converts downstream digital data to a modulated RF signal, which is carried over the fiber and coaxial lines in the HFC network 450 to one or more customer locations 460. A communication interface may connect the CMTS 425 to the content delivery network 415 for routing traffic between the HFC network 450 and the internet network, the IP network 415, a PSTN, and/or the content providers 405. The various content providers, 405 for example, may be the source of media content (e.g., movies, television channels, etc.).

It should be noted that there are multiple embodiments of a CMTS architecture, such as a CMTS with an integrated physical (PHY) layer, a CMTS with a distributed PHY, or a Converged Cable Access Platform (CCAP) architecture in which the QAM is placed in an edge QAM. In FIG. 4, the edge QAM 412 is shown in the headend, but the edge QAM 412 may be located downstream from the CMTS 425. The CMTS 425 may host downstream and upstream ports and may use separate F connectors for downstream and for upstream communication for flexibility. In embodiments, a communication interface utilizing downstream channels 1-4 connects the CMTS 425 to a portion of the HFC network 450 for communicating over the HFC network 450.

By way of example, embodiments below describe a cable modem network element at the customer's premises for receipt of the modulated signals from the HEF and/or CMTS. A cable modem is a type of network bridge and modem that provides bi-directional data communication via radio frequency channels on a cable network, such as a hybrid fiber-coaxial plant (HFC) or RFoG infrastructure. For example, a cable modem can be added to or integrated with a set-top box that provides a TV set with channels for Internet access. Cable modems may deliver broadband Internet access in the form of cable Internet, taking advantage of the high bandwidth of an HFC or RFoG network. Cable modems can also deliver video services using Internet Protocol (IP). For example, the cable modem 462 may be connected to IPTV receivers or other items of CPE. A customer PC or laptop as well as other associated devices such as tablets, smartphones or home routers are termed customer premises equipment (CPE).

The network element, e.g., cable modem, 462 is connected through the network 450 to the CMTS 425. The cable modem converts signals received from the CMTS 425 carried over fiber and/or coaxial lines in the network. Cable modems 462 convert the digital data to a modulated RF signal for upstream transmission and convert downstream RF signal to digital form. Thus, the conversion is done at a subscriber's facility. The cable modem 462 demodulates the downstream RF signal and feeds the digital data to a CPE or an IPTV, for example. On the return path, digital data is fed to the cable modem (from an associated PC in the CPE, for example), which converts it to a modulated RF signal. Once the CMTS 425 receives the upstream RF signal, it demodulates it and transmits the digital data to its eventual destination. Cable modems 462 are therefore useful in transforming the cable system into a provider of video, voice and data telecommunications services to users.

The cable network 400 may implement the disclosed load balancing techniques using a Data Over Cable Service Interface Specification (DOCSIS) protocol. DOCSIS is an international telecommunications standard that permits the addition of high speed data transfer to an existing cable television (CATV) network, such as cable network 400. The DOCSIS protocol is the protocol used to send digital video and data between a hub or headend facility and cable modem. DOCSIS is used to convey Internet or other packet based networking information, as well as packetized digital video between CMTSs and CMs. DOCSIS is employed by many cable operators to provide Internet access over their existing network infrastructures, e.g., hybrid fiber-coaxial (HFC) infrastructure, PON architectures, etc. While embodiments are disclosed with reference to DOCSIS, the load balancing implementations may apply to other networks or systems.

A typical DOCSIS architecture includes a cable modem (CM) located at the customer premises, and a cable modem termination system (CMTS) located at the CATV headend, as in the example cable network 400 depicted in FIG. 48. In an embodiment, a memory in the headend, such a memory of the CMTS 430 or edge device, may include a DOCSIS program that implements the DOCSIS specification.

DOCSIS provides a variety in options available at Open Systems Interconnection (OSI) layers 1 and 2, the physical layer, and the data link layer. A DOCSIS physical layer may include the basic networking hardware transmission technologies of a network. A DOCSIS physical layer defines the means of transmitting raw bits rather than logical data packets over a physical link connecting network nodes. The bit stream may be grouped into code words or symbols and converted to a physical signal that is transmitted over a hardware transmission medium. The modulation scheme to use and similar low-level parameters are defined by the DOCSIS scheme.

In one or more examples, the functions described herein may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

As described with respect to FIG. 48, a communication interface may connect the edge device 440 to the IP network 420 and HFC network 450. A bus is a communication medium that may connect a processor, e.g., CMTS processor, a data storage device, communication interface, DOCSIS external physical interface (DEPI), and memory (such as Random Access Memory (RAM), Dynamic RAM (DRAM), non-volatile computer memory, flash memory, or the like). In embodiments the communication interface utilizes downstream channels (e.g., channels 5-8) to communicate with the HFC network 450. The DEPI may connect the edge device 440 to the CMTS 430. In embodiments, on the edge device 440 is an application-specific integrated circuit (ASIC).

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In an embodiment, a computer-readable storage medium has stored thereon instructions that, when executed, cause a processor to communicate with a cable modem via a first channel or a first channel set; transmit, from a cable modem termination system (CMTS), a change request directing movement of a cable modem to a second channel or a second channel set, wherein the change request indicates an initialization technique for the cable modem to perform once synchronized to the second channel or the second channel set; determine whether the initialization technique was performed successfully by the cable modem; and transmit a retry request indicating an initialization technique if it is determined that the initialization technique in the change request was unsuccessfully performed by the cable modem, wherein the CMTS is configured to iteratively transmit subsequent retry requests based on a list of initialization techniques.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of inter-operative hardware units, including one or more processors as described above, in conjunction with suitable software and/or firmware.

The terms and expressions that have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims that follow.

What is claimed is:

1. A method for delivering broadband service to a plurality of subscribers each within a common service group, the method comprising the steps of:
    Delivering broadband service to a first one of the plurality of subscribers using a first coaxial length from an Optical Network Unit (ONU) associated with the first subscriber, and over a first temporal interval;
    delivering broadband service to a second one of the plurality of subscribers using a second coaxial length from an ONU associated with the second subscriber, and over the first temporal interval; and
    delivering at least one of Fiber-to-the-Last-Amplifier (FT-TLA), Fiber-to-the-Curb (FTTC), and Fiber-to-the-Home (FTTH) to the first one of the plurality of subscribers over a second temporal interval subsequent to the first temporal interval by replacing at least a portion of the first coaxial length with a fiber optic connection; where
    during the second temporal interval, the second one of the plurality of subscribers continues to be delivered broadband service over the second coaxial length via a coaxial connection from the ONU associated with the second subscriber; where
    during the second temporal interval, the first one of the plurality of subscribers receives upstream service in a frequency range that overlaps with that of downstream service provided to the second one of the plurality of subscribers; and where the FTTH connection delivers Data over Cable Service Internet Specification (DOCSIS) 3.1 content and the coaxial connection delivers DOCSIS 3.0 content.

2. The method of claim 1 where the first one of the plurality of subscribers receives upstream service and downstream service at a first frequency split, and the second one of the plurality of subscribers receives upstream and downstream service at a second frequency split different than the first split.

3. The method of claim 2 where the ONU associated with the first subscriber is the same ONU associated with the second subscriber, and the first frequency split and the second frequency split are both configured at the ONU.

4. The method of claim 2 where the first and second subscribers receive broadband service from different ONUs and the first frequency split is configured at the ONU associated with the first subscriber and the second frequency split is configured at the ONU associated with the second subscriber.

5. A method for delivering Data over Cable Service Internet Specification (DOCSIS) content to a plurality of subscribers each within a common service group, the method comprising the steps of:
    delivering content to a first one of the plurality of subscribers using a first coaxial length from an Optical Network Unit (ONU) associated with the first subscriber, and over a first temporal interval;
    delivering content to a second one of the plurality of subscribers using a second coaxial length from an ONU associated with the second subscriber, and over the first temporal interval; and
    delivering Fiber-to-the-Home (FTTH) service to the first one of the plurality of subscribers over a second temporal interval subsequent to the first temporal interval by replacing at least a portion of the first coaxial length with a fiber optic connection; where
    during the second temporal interval, the second one of the plurality of subscribers continues to be delivered content over the second coaxial length from the ONU associated with the second subscriber via a coaxial connection, and the fiber optic connection delivers DOC SIS 3.1 content while the coaxial connection delivers DOC SIS 3.0 content.

* * * * *